United States Patent
Shishido et al.

(10) Patent No.: US 10,139,663 B2
(45) Date of Patent: Nov. 27, 2018

(54) INPUT/OUTPUT DEVICE AND ELECTRONIC DEVICE

(71) Applicant: Semiconductor Energy Laboratory Co., Ltd., Atsugi-shi, Kanagawa-ken (JP)

(72) Inventors: Hideaki Shishido, Atsugi (JP); Koji Kusunoki, Kawasaki (JP); Kouhei Toyotaka, Atsugi (JP); Kazunori Watanabe, Machida (JP); Makoto Kaneyasu, Fukuoka (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/153,077

(22) Filed: May 12, 2016

(65) Prior Publication Data
US 2016/0349557 A1 Dec. 1, 2016

(30) Foreign Application Priority Data
May 29, 2015 (JP) .................................. 2015-110612

(51) Int. Cl.
*G02F 1/1335* (2006.01)
*G02F 1/1333* (2006.01)
(Continued)

(52) U.S. Cl.
CPC .......... *G02F 1/13338* (2013.01); *G06F 3/044* (2013.01); *G06F 3/0412* (2013.01);
(Continued)

(58) Field of Classification Search
CPC .......... G02F 1/13338; G02F 1/134363; G02F 1/13624; G02F 2001/134345; G06F 3/044; G06F 3/0412; G06F 2203/04108
See application file for complete search history.

(56) References Cited

U.S. PATENT DOCUMENTS 5,585,951 A * 12/1996 Noda ................ G02F 1/136227
349/122
5,731,856 A 3/1998 Kim et al.
(Continued)

FOREIGN PATENT DOCUMENTS

CN 101825966 A 9/2010
CN 101944506 A 1/2011
(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
(Continued)

*Primary Examiner* — Donald Raleigh
(74) *Attorney, Agent, or Firm* — Robinson Intellectual Property Law Office; Eric J. Robinson

(57) ABSTRACT

An input/output device is provided. The input/output device includes a first pixel electrode, a second pixel electrode, a first common electrode, a second common electrode, a liquid crystal, a first insulating film, a second insulating film, and a transistor. The first common electrode can serve as one electrode of a sensor element. The second common electrode can serve as the other electrode of the sensor element. The transistor includes a first gate, a second gate, and a semiconductor layer. The pixel electrode, the common electrodes, and the second gate are positioned on different planes. The second gate contains one or more kinds of metal elements included in the semiconductor layer. The second gate, the pixel electrode, and the common electrodes preferably contain one or more kinds of metal elements included in the semiconductor layer.

19 Claims, 35 Drawing Sheets

(51) Int. Cl.
*G06F 3/041* (2006.01)
*G06F 3/044* (2006.01)
*G02F 1/1362* (2006.01)
*G02F 1/1343* (2006.01)

(52) U.S. Cl.
CPC .... *G02F 1/13624* (2013.01); *G02F 1/134363* (2013.01); *G02F 2001/134345* (2013.01); *G06F 2203/04108* (2013.01)

(56) References Cited

U.S. PATENT DOCUMENTS

| | | |
|---|---|---|
| 5,744,864 A | 4/1998 | Cillessen et al. |
| 6,294,274 B1 | 9/2001 | Kawazoe et al. |
| 6,369,867 B1* | 4/2002 | Ge .................. G02F 1/133305 349/122 |
| 6,469,765 B1* | 10/2002 | Matsuyama ...... G02F 1/134363 349/141 |
| 6,563,174 B2 | 5/2003 | Kawasaki et al. |
| 6,727,522 B1 | 4/2004 | Kawasaki et al. |
| 6,853,405 B2* | 2/2005 | Lee .................. H01L 27/1288 257/E27.111 |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,920,129 B2 | 4/2011 | Hotelling et al. |
| 8,780,078 B2* | 7/2014 | Kim ................. G06F 3/0412 345/173 |
| 8,786,557 B2 | 7/2014 | Noguchi et al. |
| 9,134,560 B2 | 9/2015 | Hotelling et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0030461 A1 | 2/2005 | Ono et al. |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/1018776 | 8/2007 | Furuta et al. |
| 2007/1019437 | 8/2007 | Hosono et al. |
| 2007/0236640 A1* | 10/2007 | Kimura .............. G02F 1/134363 349/141 |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0158183 A1 | 7/2008 | Hotelling et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0033848 A1* | 2/2009 | Oka .................. G02F 1/134363 349/114 |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065840 A1* | 3/2010 | Yamazaki ........... G02F 1/1368 257/43 |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0194697 A1 | 8/2010 | Hotelling et al. |
| 2013/0342801 A1 | 12/2013 | Hamada et al. |
| 2014/0055412 A1 | 2/2014 | Teramoto |
| 2014/0184559 A1* | 7/2014 | Han ................... G06F 3/0412 345/174 |
| 2014/0209901 A1 | 7/2014 | Sakata et al. |
| 2014/0267159 A1 | 9/2014 | Miyazaki et al. |
| 2015/0029431 A1* | 1/2015 | Fukai ................ G02F 1/134363 349/43 |
| 2015/0268759 A1* | 9/2015 | Ludden ................ G06F 3/044 345/174 |

FOREIGN PATENT DOCUMENTS

| | | |
|---|---|---|
| CN | 103403612 A | 11/2013 |
| EP | 1737044 A | 12/2006 |
| EP | 2214084 A | 8/2010 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |

(56) References Cited

FOREIGN PATENT DOCUMENTS

| | | |
|---|---|---|
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-096055 A | 4/2007 |
| JP | 2007-123861 A | 5/2007 |
| JP | 2010-231773 A | 10/2010 |
| JP | 2011-197685 A | 10/2011 |
| JP | 2014-044537 A | 3/2014 |
| JP | 2014-064011 A | 4/2014 |
| JP | 2014-178847 A | 9/2014 |
| JP | 2015-028666 A | 2/2015 |
| KR | 2007-0046986 A | 5/2007 |
| KR | 2011-0003265 A | 1/2011 |
| KR | 2011-0122727 A | 11/2011 |
| TW | I285780 | 8/2007 |
| TW | 201031961 | 9/2010 |
| TW | 201110243 | 3/2011 |
| WO | WO-2004/114391 | 12/2004 |
| WO | WO-2012/118038 | 9/2012 |

OTHER PUBLICATIONS

Asaoka.Y et al., "29.1:Polarizer-Free Reflective LCD Combined With Ultra Low-Power Driving Technology", SID Digest '09: SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Backplane", SID Digest '09 : SID International Symposium Digest of Technical Papers, May 31, 2009, pp. 280-283.

Clarks et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YBFE2O4, and YB2FE3O7 Types of Structures for Compounds in the In2O3 and Sc2O3—A2O3—Bo Systems [A; Fe, Ga, or Al; B: Mg, Mn, Fe, Ni, Cu, or Zn] at Temperatures over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits, 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 SID International Symposium Digest of Technical Papers, May 20, 2008, vol. 39, pp. 625-628.

(56) References Cited

OTHER PUBLICATIONS

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "Suftla Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White TAMDEM OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 IN. QVGA AMOLED Display Using In—Ga—Zn—Oxide TFTs With a Novel Passivation Layer", SID Digest '09 : SID International Symposium Digest of Technical Papers, May 31, 2009, pp. 284-287.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-IN. AMOLED Display With Driver Circuit Using Amorphous In—Ga—Zn—Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

International Search Report (Application No. PCT/IB2016/052927) dated Aug. 16, 2016.

Written Opinion (Application No. PCT/IB2016/052927) dated Aug. 16, 2016.

\* cited by examiner

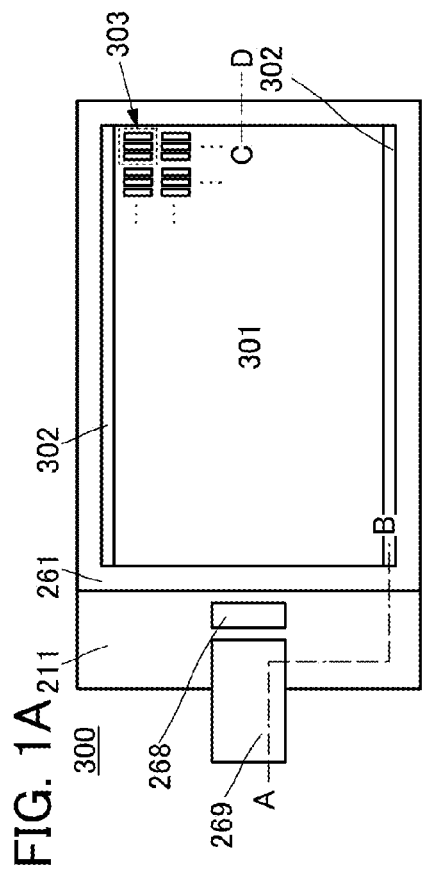
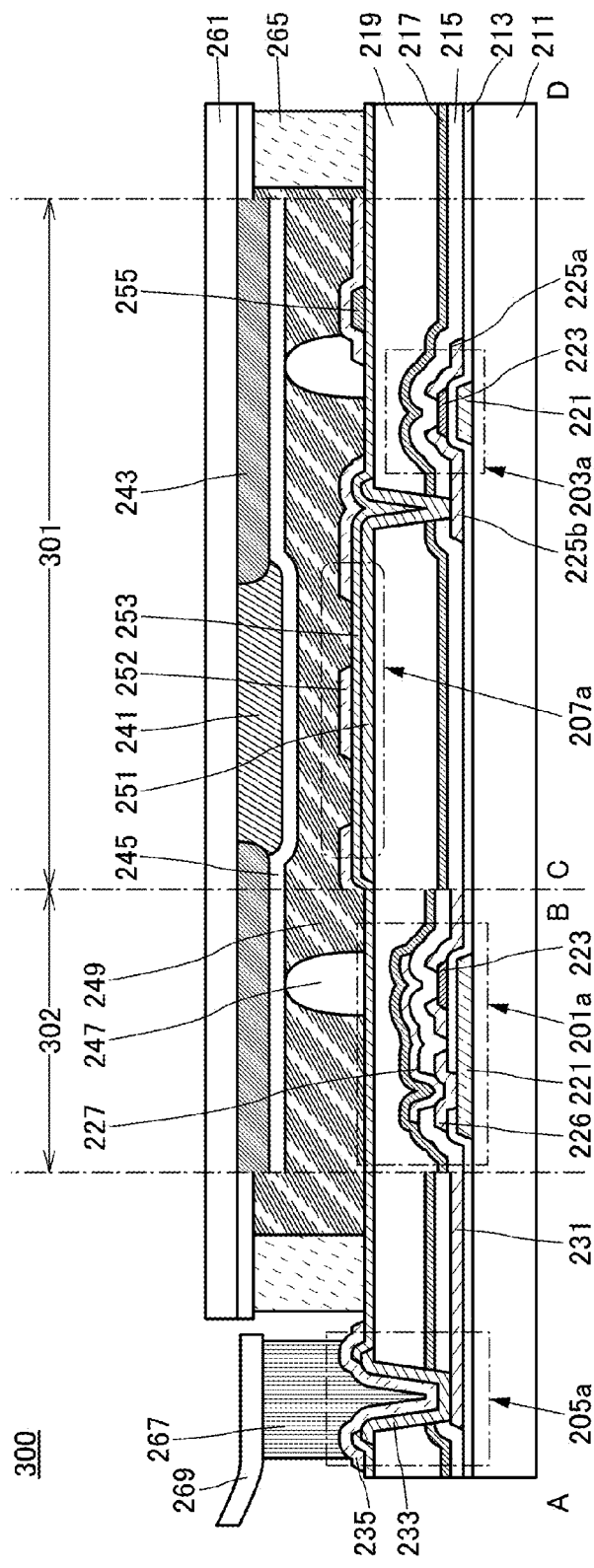

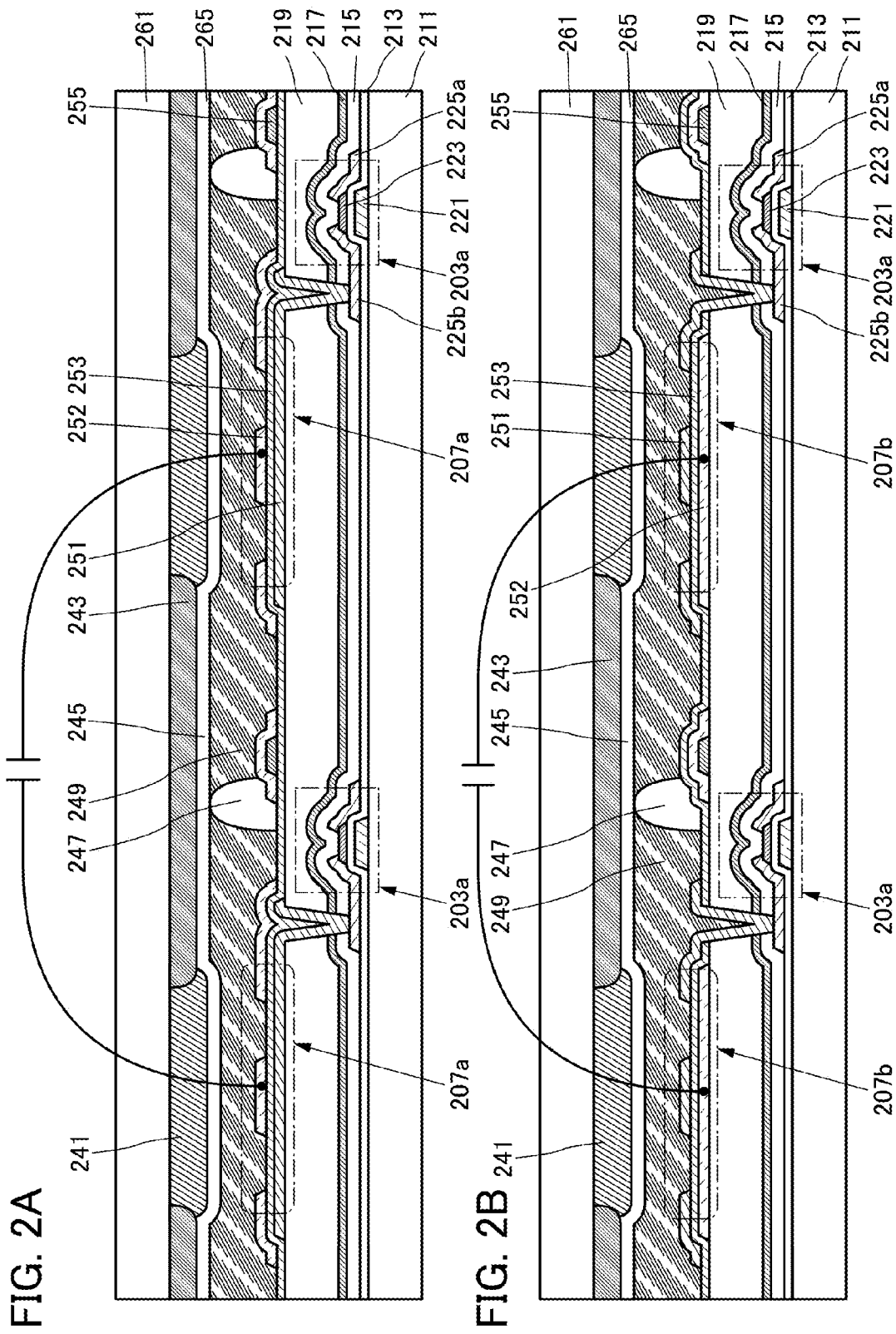

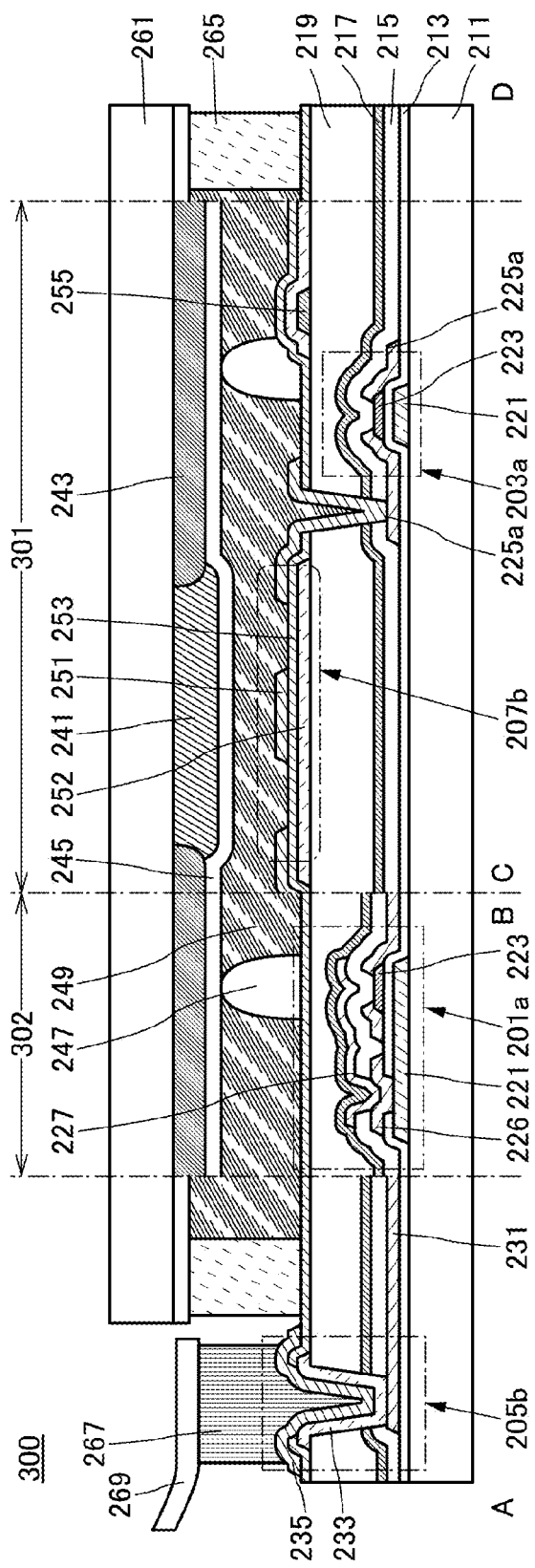

FIG. 8A
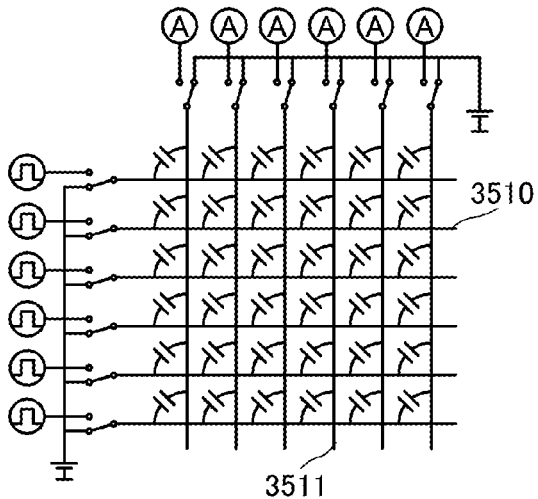
FIG. 8B
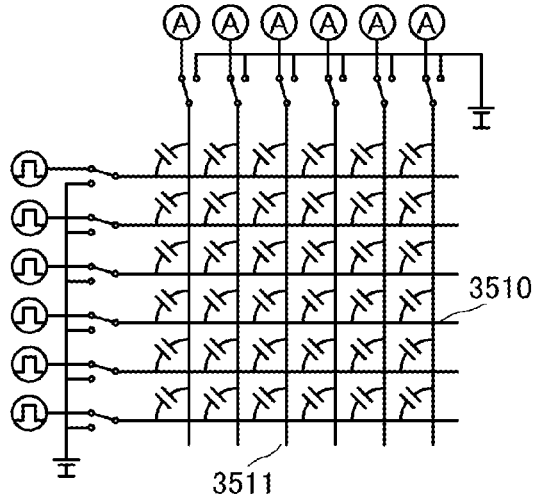
FIG. 8C
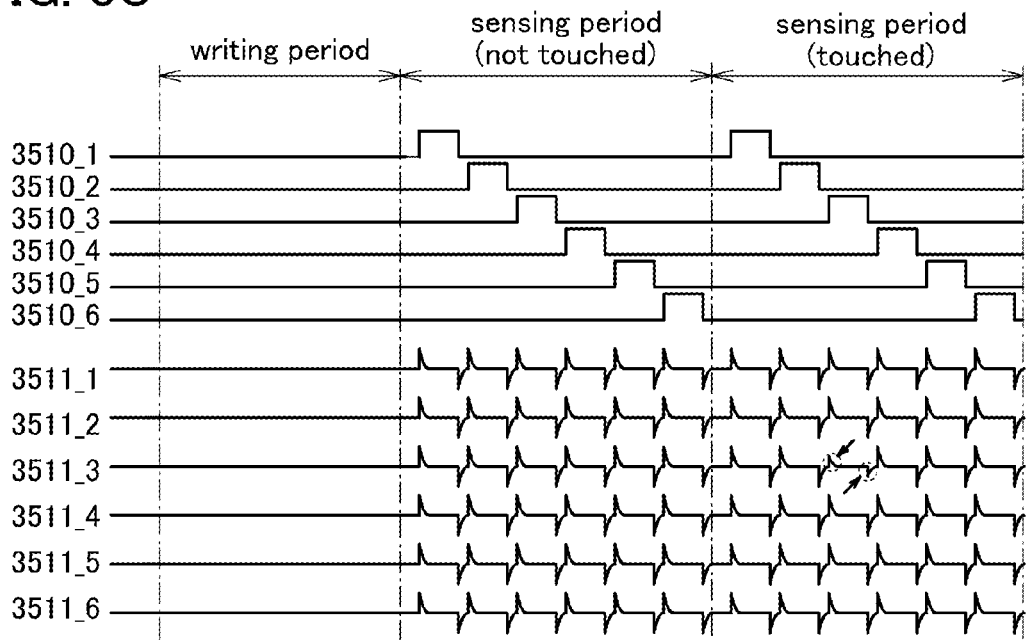
FIG. 8D
| writing period | sensing period |
|---|---|
| one frame period ||
FIG. 8E
| writing period | sensing period | sensing period |
|---|---|---|
| one frame period |||

270A

270A

270B

270B

270B

A1  A2
508b 508c
508

270B

B1  B2
508b 508c
508

512a 514    519 512b

A1  A2
508b 508c
508

508
514 508b 508c 519

B1  B2

FIG. 29A
FIG. 29B
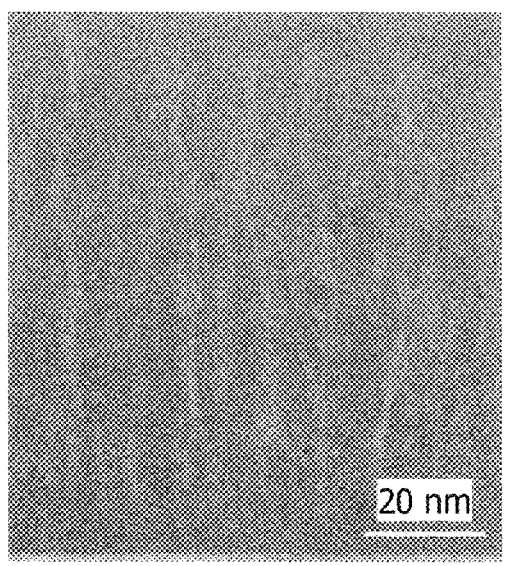
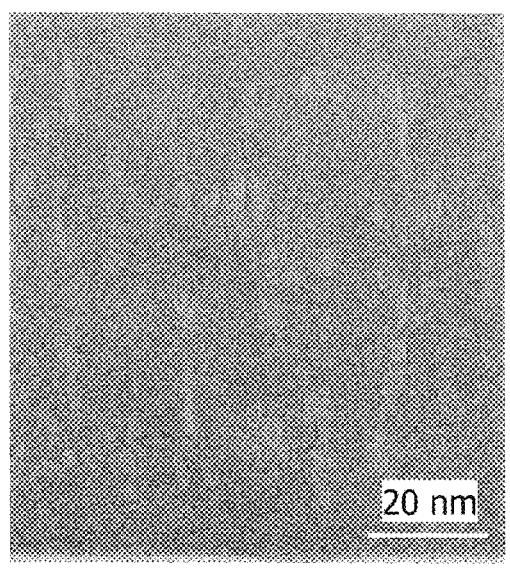

INPUT/OUTPUT DEVICE AND ELECTRONIC DEVICE

BACKGROUND OF THE INVENTION

1. Field of the Invention

One embodiment of the present invention relates to an input/output device and an electronic device.

Note that one embodiment of the present invention is not limited to the above technical field. Specifically, examples of the technical field of one embodiment of the present invention disclosed in this specification and the like include a semiconductor device, a display device, a light-emitting device, a power storage device, a memory device, an electronic device, a lighting device, an input device (e.g., a touch sensor), an output device, an input/output device (e.g., a touch panel), a method for driving any of them, and a method for manufacturing any of them.

2. Description of the Related Art

Transistors used for most flat panel displays typified by a liquid crystal display device and a light-emitting display device are formed using silicon semiconductors such as amorphous silicon, single crystal silicon, and polycrystalline silicon provided over glass substrates. Furthermore, such a transistor employing such a silicon semiconductor is used in integrated circuits (ICs) and the like.

In recent years, attention has been drawn to a technique in which, instead of a silicon semiconductor, a metal oxide exhibiting semiconductor characteristics is used in transistors. Note that in this specification, a metal oxide exhibiting semiconductor characteristics is referred to as an oxide semiconductor. For example, in Patent Documents 1 and 2, a technique is disclosed in which a transistor is manufactured using zinc oxide or an In—Ga—Zn-based oxide as an oxide semiconductor and the transistor is used as a switching element or the like of a pixel of a display device.

What is desirable is a touch panel in which a display device is provided with a function of inputting data with a finger or the like touching a screen as a user interface.

A display device provided with a touch sensor or a display module provided with a touch sensor is called a touch panel, a touch screen, or the like. Furthermore, a device that has a touch sensor and does not have a display element is called a touch panel in some cases. Thus, a display device provided with a touch sensor or a display module provided with a touch sensor is called a display device having a touch sensor, a display device having a touch panel, a touch sensor having a display device, or a touch panel having a display device in some cases. Note that a display device provided with a touch sensor is referred to as a touch panel.

For example, Patent Documents 3 to 6 each disclose a touch panel using a liquid crystal element as a display element.

REFERENCE

Patent Document

[Patent Document 1] Japanese Published Patent Application No. 2007-123861
[Patent Document 2] Japanese Published Patent Application No. 2007-096055
[Patent Document 3] Japanese Published Patent Application No. 2011-197685
[Patent Document 4] Japanese Published Patent Application No. 2014-44537
[Patent Document 5] Japanese Published Patent Application No. 2014-178847
[Patent Document 6] United States Patent Application Publication No. 2008/0158183

SUMMARY OF THE INVENTION

An object of one embodiment of the present invention is to provide a thin input/output device. Another object of one embodiment of the present invention is to provide a lightweight input/output device. Another object of one embodiment of the present invention is to provide an input/output device with a small number of components.

Another object of one embodiment of the present invention is to provide a highly reliable input/output device. Another object of one embodiment of the present invention is to provide an input/output device with high detection sensitivity. Another object of one embodiment of the present invention is to provide a novel input/output device.

Note that the descriptions of these objects do not disturb the existence of other objects. In one embodiment of the present invention, there is no need to achieve all the objects. Other objects can be derived from the description of the specification, the drawings, the claims, and the like.

One embodiment of the present invention is an input/output device including a first pixel electrode, a second pixel electrode, a first common electrode, a second common electrode, a liquid crystal, a first insulating film, a second insulating film, and a transistor. The first common electrode can serve as one electrode of a sensor element. The second common electrode can serve as the other electrode of the sensor element. The transistor includes a first gate, a second gate, and a semiconductor layer. The semiconductor layer includes an oxide semiconductor in a channel formation region. The second gate includes an oxide conductor. The oxide conductor contains one or more kinds of metal elements included in the oxide semiconductor. The semiconductor layer is over the first gate. The second gate is over the semiconductor layer. The first insulating film is over the second gate. The first pixel electrode, the second pixel electrode, the first common electrode, and the second common electrode are over the first insulating film. The first pixel electrode partly overlaps with the first common electrode with the second insulating film interposed therebetween. The second pixel electrode partly overlaps with the second common electrode with the second insulating film interposed therebetween. The liquid crystal is over the first pixel electrode, the second pixel electrode, the first common electrode, and the second common electrode. The first pixel electrode is apart from the second pixel electrode on one plane. The first common electrode is apart from the second common electrode on one plane.

The transistor is included in at least one of a display portion or a driver circuit portion. For example, an input/output device of one embodiment of the present invention includes two transistors that are each the above transistor. A source or a drain of one of the two transistors may be electrically connected to the first pixel electrode. A source or a drain of the other of the two transistors may be electrically connected to the second pixel electrode. Alternatively, the transistor may be positioned in the driver circuit portion.

In each of the above structures, the second gate may be electrically connected to the first gate.

In each of the above structures, the second insulating film may be over the first pixel electrode and the second pixel electrode, and the first common electrode and the second common electrode may be over the second insulating film.

In each of the above structures, the second insulating film may be over the first common electrode and the second common electrode, and the first pixel electrode and the second pixel electrode may be over the second insulating film.

In each of the above structures, the first pixel electrode and the second pixel electrode may each include at least one metal element contained in the oxide semiconductor. Furthermore, the first common electrode and the second common electrode may each include at least one metal element contained in the oxide semiconductor.

In each of the above structures, the oxide semiconductor and the oxide conductor may each include an oxide containing indium. Furthermore, the first pixel electrode and the second pixel electrode may each include an oxide containing indium. Furthermore, the first common electrode and the second common electrode may each include an oxide containing indium.

In each of the above structures, the oxide semiconductor and the oxide conductor may each include an $In-M_1-Zn$ oxide ($M_1$ is Al, Ti, Ga, Y, Zr, La, Ce, Nd, Sn, or Hf). Furthermore, the first pixel electrode and the second pixel electrode may each include the $In-M_1-Zn$ oxide. Furthermore, the first common electrode and the second common electrode may each include the $In-M_1-Zn$ oxide.

In each of the above structures, the first pixel electrode, the second pixel electrode, the first common electrode, and the second common electrode may each have a function of transmitting visible light.

In each of the above structures, a first conductive film may be positioned between the first insulating film and the first common electrode. The first conductive film may have a lower resistivity than the first common electrode and may be electrically connected to the first common electrode. Furthermore, a second conductive film may be positioned between the first insulating film and the second common electrode. The second conductive film may have a lower resistivity than the second common electrode and may be electrically connected to the second common electrode. The first conductive film may be apart from the second conductive film on one plane.

In each of the above structures, a light-blocking film may be provided. The light-blocking film may include a region overlapping with at least one of the first conductive film and the second conductive film with the liquid crystal positioned therebetween.

Another embodiment of the present invention is a module such as a module in which a connector such as a flexible printed circuit (FPC) or a tape carrier package (TCP) is attached to the input/output device or a module in which an IC is mounted on the input/output device by a chip on glass (COG) method, a chip on film (COF) method, or the like.

Another embodiment of the present invention is an electronic device including the module and at least one of an antenna, a battery, a housing, a speaker, a microphone, an operation switch, and an operation button.

According to one embodiment of the present invention, a thin input/output device can be provided. According to another embodiment of the present invention, a lightweight input/output device can be provided. According to another embodiment of the present invention, an input/output device with a small number of components can be provided.

According to one embodiment of the present invention, a highly reliable input/output device can be provided. According to another embodiment of the present invention, an input/output device with high detection sensitivity can be provided. According to another embodiment of the present invention, a novel input/output device or the like can be provided.

Note that the description of these effects does not disturb the existence of other effects. One embodiment of the present invention does not necessarily achieve all the effects listed above. Other effects can be derived from the description of the specification, the drawings, the claims, and the like.

BRIEF DESCRIPTION OF THE DRAWINGS

FIGS. 1A and 1B are a top view and a cross-sectional view illustrating an example of an input/output device.

FIGS. 2A and 2B are cross-sectional views illustrating examples of an input/output device.

FIGS. 3A to 3F are cross-sectional views illustrating examples of an input/output device.

FIGS. 8A to 8E illustrate examples of operation of a sensor element and a pixel.

FIGS. 17A to 17D are cross-sectional views illustrating an example of a method for manufacturing a transistor and the like.

FIGS. 18A to 18C are cross-sectional views illustrating an example of a method for manufacturing a transistor and the like.

FIGS. 19A to 19C are cross-sectional views illustrating an example of a method for manufacturing a transistor and the like.

FIG. 20 is a cross-sectional view of an example illustrating a method for manufacturing a transistor and the like.

FIGS. 29A and 29B show cross-sectional TEM images of an a-like OS.

DETAILED DESCRIPTION OF THE INVENTION

Figure 4:
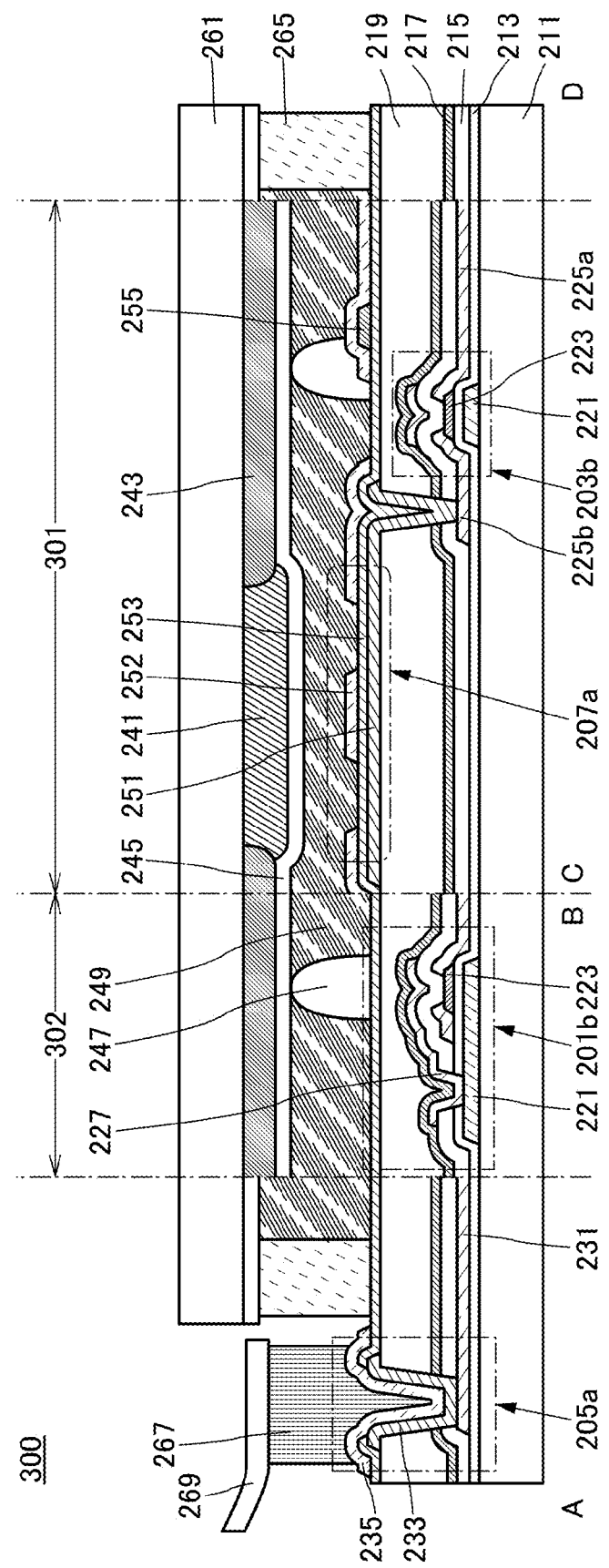
FIG. 4 is a cross-sectional view illustrating an example of an input/output device.

Embodiments are described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

In addition, the position, size, range, or the like of each structure illustrated in drawings and the like is not accurately represented in some cases for easy understanding. Therefore, the disclosed invention is not necessarily limited to the position, the size, the range, or the like disclosed in the drawings and the like.

Note that the terms "film" and "layer" can be interchanged with each other depending on the case or circumstances. For example, the term "conductive film" can be changed into the term "conductive layer" in some cases. Also, the term "insulating layer" can be changed into the term "insulating film" in some cases.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. In addition, the term "perpendicular" indicates that the angle formed between two straight lines is greater than or equal to 80° and less than or equal to 100°, and accordingly also includes the case where the angle is greater than or equal to 85° and less than or equal to 95°. A term "substantially perpendicular" indicates that the angle formed between two straight lines is greater than or equal to 60° and less than or equal to 120°.

In this specification, trigonal and rhombohedral crystal systems are included in a hexagonal crystal system.

Embodiment 1

In this embodiment, an input/output device of one embodiment of the present invention is described with reference to FIGS. 1A and 1B, FIGS. 2A and 2B, FIGS. 3A to 3F, FIG. 4, FIG. 5, FIG. 6, FIGS. 7A and 7B, FIGS. 8A to 8E, FIGS. 9A and 9B, FIG. 10, FIGS. 1A and 11B, FIG. 12, FIG. 13, FIGS. 14A and 14B, FIG. 15, and FIGS. 16A to 16C.

The input/output device of one embodiment of the present invention is an in-cell touch panel that has a function of displaying an image and serves as a touch sensor.

There is no particular limitation on a display element included in the input/output device of one embodiment of the present invention. As the display element, a variety of display elements including a liquid crystal element, an optical element that utilizes micro electro mechanical systems (MEMS), a light-emitting element such as an organic electroluminescent (EL) element or a light-emitting diode (LED), and an electrophoretic element can be used.

In this embodiment, a transmissive liquid crystal display device using a liquid crystal element in a horizontal electric field mode is described as an example.

There is no particular limitation on a sensor element included in the input/output device of one embodiment of the present invention. Note that a variety of sensors that can sense proximity or touch of a sensing target such as a finger or a stylus can be used as the sensor element.

For example, a variety of types such as a capacitive type, a resistive type, a surface acoustic wave type, an infrared type, an optical type, and a pressure-sensitive type can be used for the sensor.

In this embodiment, an input/output device including a capacitive sensor element is described as an example.

Examples of the capacitive sensor element are a surface capacitive sensor element and a projected capacitive sensor element. Examples of the projected capacitive sensor element include a self-capacitive sensor element and a mutual capacitive sensor element. The use of a mutual capacitive sensor element is preferable because multiple points can be sensed simultaneously.

In the input/output device of one embodiment of the present invention, an electrode or the like included in a sensor element is provided only on a substrate supporting a display element. The input/output device of one embodiment of the present invention is a full-in-cell touch panel. As an example of a structure of an in-cell touch panel, a structure in which an electrode and the like included in a sensor element are provided on both a substrate supporting a display element and a counter substrate or on only the counter substrate is given. As compared with the structure, the full-in-cell touch panel is preferable because the structure of the counter substrate can be simplified.

The input/output device of one embodiment of the present invention is preferable because an electrode included in the display element also serves as an electrode included in the sensor element and thus the manufacturing process can be simplified and the manufacturing cost can be reduced.

One embodiment of the present invention can reduce the thickness or weight of the input/output device or the number of components of the input/output device as compared with a structure in which a display panel and a sensor element separately formed are attached to each other or a structure in which a sensor element is formed on a counter substrate side.

In the input/output device of one embodiment of the present invention, both an FPC for supplying a signal for driving a pixel and an FPC for supplying a signal for driving a sensor element are on one substrate side. With this structure, the touch panel can be easily incorporated into an electronic device, and the number of components can be reduced. Note that the signal for driving a pixel and the signal for driving a sensor element may be supplied by one FPC.

The structure of the input/output device of one embodiment of the present invention is described below.

[Cross-Sectional Structure Example 1 of Input/Output Device]

FIG. 1A is a top view of an input/output device 300. FIG. 1B is a cross-sectional view taken along dashed-dotted lines A-B and C-D in FIG. 1A.

As illustrated in FIG. 1A, the input/output device 300 includes a display portion 301 and scan line driver circuits 302. The display portion 301 includes a plurality of pixels 303, a plurality of signal lines, and a plurality of scan lines, and has a function of displaying an image. Moreover, the display portion 301 also serves as an input portion. That is, the display portion 301 includes a plurality of sensor elements that can sense touch or proximity of a sensing target to the input/output device 300 and thus serves as a touch sensor. The scan line driver circuit 302 has a function of outputting a scan signal to the scan lines included in the display portion 301. The pixel 303 includes a plurality of subpixels. Although FIG. 1A illustrates an example in which the pixel 303 includes three subpixels, one embodiment of the present invention is not limited to this example.

Although FIG. 1A illustrates an example in which the input/output device 300 includes the scan line driver circuits, one embodiment of the present invention is not limited to this example. The input/output device 300 that does not include any of a scan line driver circuit, a signal line driver circuit, and a sensor driver circuit may be employed, or the input/output device 300 that includes any one or more of a scan line driver circuit, a signal line driver circuit, and a sensor driver circuit may be employed.

In the input/output device 300, an IC 268 is mounted on a substrate 211 by a COG method or the like. The IC 268 includes, for example, any one or more of a signal line driver circuit, a scan line driver circuit, and a sensor driver circuit.

An FPC 269 is electrically connected to the input/output device 300. The IC 268 and a scan line driver circuit are supplied with a signal from the outside via the FPC 269. Furthermore, a signal can be output from the IC 268 to the outside via the FPC 269.

An IC may be mounted on the FPC 269. For example, an IC including any one or more of a signal line driver circuit, a scan line driver circuit, and a sensor driver circuit may be mounted on the FPC 269. For example, the IC may be mounted on the FPC 269 by a COF method or a tape automated bonding (TAB) method.

For example, the IC 268 may include a signal line driver circuit and a sensor driver circuit. Alternatively, for example, the IC 268 may include a signal line driver circuit and the IC mounted on the FPC 269 may include a sensor driver circuit.

As illustrated in FIG. 1B, the input/output device 300 includes a transistor 201a, a transistor 203a, a connection portion 205a, a liquid crystal element 207a, and the like over the substrate 211.

FIG. 1B illustrates the cross section of one subpixel as an example of the display portion 301. For example, a subpixel exhibiting a red color, a subpixel exhibiting a green color, and a subpixel exhibiting a blue color form one pixel, and thus full-color display can be achieved in the display portion 301. Note that the color exhibited by subpixels is not limited to red, green, and blue. For example, a subpixel exhibiting white, yellow, magenta, cyan, or the like may be used for a pixel.

The transistors 201a and 203a include a gate electrode 221, an insulating film 213, an oxide semiconductor film 223, a source electrode 225a, and a drain electrode 225b. The transistor 201a further includes a conductive film 226, an insulating film 215, and an oxide conductor film 227. Note that the insulating film 215 can also be regarded as a component of the transistor 203a.

The gate electrode 221 and the oxide conductor film 227 can each serve as a gate. The transistor 201a has a structure in which an oxide semiconductor film where a channel is formed is sandwiched between two gates. The gate electrode 221 is electrically connected to the oxide conductor film 227 through the conductive film 226. Transistors having such a structure in which two gates are electrically connected to each other can have a higher field-effect mobility and thus have higher on-state current than other transistors. Consequently, a circuit capable of high-speed operation can be obtained. Furthermore, the area occupied by a circuit portion can be reduced. The use of a transistor having high on-state current can reduce signal delay in wirings and can suppress display unevenness even in an input/output device in which the number of wirings is increased in accordance with the increase in size or resolution. Moreover, with such a structure, a highly reliable transistor can be formed.

The transistors 201a and 203a may have the same structure or different structures. That is, a transistor included in a driver circuit portion and a transistor included in a display portion may have the same structure or different structures. The driver circuit portion may include transistors having a plurality of structures. The display portion may include transistors having a plurality of structures. For example, a transistor having a structure in which two gates are electrically connected to each other is preferably used for one or more of a shift register circuit, a buffer circuit, and a protection circuit included in a scan line driver circuit.

The transistors 201a and 203a are covered with an insulating film 217 and an insulating film 219. Note that the insulating films 217 and 219 can be regarded as the components of the transistors 201a and 203a. The insulating film 217 preferably has an effect of suppressing diffusion of impurities into a semiconductor included in a transistor. For example, for the insulating film 217, a material through which impurities such as water and hydrogen are hardly diffused is preferably used. As the insulating film 219, an insulating film having a planarization function is preferably selected in order to reduce surface unevenness due to the transistor.

In the transistor 201a, the oxide semiconductor film 223 is used as a semiconductor layer, and the oxide conductor film 227 is used as a gate. In that case, it is preferable that the oxide semiconductor film 223 and the oxide conductor film 227 be formed using an oxide semiconductor.

The resistivity of an oxide semiconductor can be easily controlled in a manufacturing process of the input/output device; thus, an oxide semiconductor can be favorably used as a material of a semiconductor film and a conductive film. When two or more layers included in the input/output device are formed using oxide semiconductors containing the same metal element, the same manufacturing apparatus (e.g., deposition apparatus or processing apparatus) can be used in two or more steps and manufacturing cost can thus be reduced.

An oxide semiconductor is a material that transmits visible light and can therefore be favorably used for an element that transmits visible light.

Forming the oxide semiconductor film 223 and the oxide conductor film 227 using the same metal element can reduce the manufacturing cost. For example, when metal oxide targets with the same metal composition are used, the manufacturing cost can be reduced and the same etching gas or the same etchant can be used in processing the oxide semiconductor films. Even when the oxide semiconductor film 223 and the oxide conductor film 227 contain the same metal element, they have different compositions in some cases. For example, a metal element in a film is released during the manufacturing process of the input/output device, which might result in different metal compositions.

The transistors 201a and 203a preferably include the oxide semiconductor film 223 that is highly purified to reduce the formation of oxygen vacancies. Accordingly, the current in an off state (off-state current) of the transistors can be made small. Thus, an electrical signal such as an image signal can be held for a longer period, and a writing interval can be set longer in an on state. Accordingly, frequency of refresh operation can be reduced, which leads to an effect of reducing power consumption.

In the transistors 201a and 203a, relatively high field-effect mobility can be obtained, whereby high-speed operation is possible. When such a transistor that can operate at high speed is used for the input/output device, a transistor in a display portion and a transistor in a driver circuit portion can be formed over one substrate. That is, since a semiconductor device formed of a silicon wafer or the like is not additionally needed as a driver circuit, the number of components of the input/output device can be reduced. In addition, the transistor that can operate at high speed can be used also in the display portion, whereby a high-quality image can be provided.

The liquid crystal element 207a is a liquid crystal element having a fringe field switching (FFS) mode. The liquid crystal element 207a includes a conductive film 251, a conductive film 252, and a liquid crystal 249. Orientation of the liquid crystal 249 can be controlled with an electric field generated between the conductive films 251 and 252. The conductive film 251 can serve as a pixel electrode. The conductive film 252 can serve as a common electrode.

When a conductive material that transmits visible light is used for the conductive films 251 and 252, the input/output device 300 can serve as a transmissive liquid crystal display device. When a conductive material that reflects visible light is used for the conductive film 251 and a conductive material that transmits visible light is used for the conductive film 252, the input/output device 300 can serve as a reflective liquid crystal display device.

For example, a material containing one of indium (In), zinc (Zn), and tin (Sn) is preferably used for the conductive material that transmits visible light. Specifically, indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide to which silicon oxide is added, zinc oxide, and zinc oxide to which gallium is added are given, for example. Note that a film including graphene can be used as well. The film including graphene can be formed, for example, by reducing a film containing graphene oxide.

An oxide conductor film is preferably used as the conductive film 251. Furthermore, an oxide conductor film is preferably used as the conductive film 252. The oxide conductor film preferably contains one or more kinds of metal elements included in the oxide semiconductor film 223. For example, the conductor film 251 preferably contains indium and is further preferably an In-M-Zn oxide (M is Al, Ti, Ga, Ge, Y, Zr, La, Ce, Sn, Mg, Nd, or Hf) film. Similarly, the conductive film 252 preferably contains indium and is further preferably the In-M-Zn oxide film.

Note that at least one of the conductive films 251 and 252 may be formed using an oxide semiconductor. As described above, when two or more layers included in the input/output device are formed using oxide semiconductors containing the same metal element, the same manufacturing apparatus (e.g., deposition apparatus or processing apparatus) can be used in two or more steps and manufacturing cost can thus be reduced.

For example, when a silicon nitride film containing hydrogen is used as an insulating film 253 and an oxide semiconductor is used for the conductive film 251, the conductivity of the oxide semiconductor can be increased owing to hydrogen supplied from the insulating film 253.

Examples of a conductive material that reflects visible light include aluminum, silver, and an alloy including any of these metal elements.

The conductive film 251 serving as a pixel electrode is electrically connected to a source or a drain of the transistor 203a. Here, the conductive film 251 is electrically connected to the drain electrode 225b.

The conductive film 252 has a comb-like top surface shape or a top surface shape provided with a slit (a top surface shape is also referred to as a planar surface shape). The insulating film 253 is provided between the conductive films 251 and 252. The conductive film 251 partly overlaps with the conductive film 252 with the insulating film 253 interposed therebetween. In a region where a coloring film 241 overlaps with the conductive film 251, there is a portion where the conductive film 252 is not provided over the conductive film 251.

A conductive film 255 is provided over the insulating film 253. The conductive film 255 is electrically connected to the conductive film 252 and can serve as an auxiliary wiring of the conductive film 252. With the auxiliary wiring electrically connected to the common electrode, voltage drop due to the resistance of the common electrode can be suppressed. In that case, a stacked structure of a conductive film including a metal oxide and a conductive film including a metal is preferably used because these conductive films can be formed by a patterning technique using a half tone mask and thus the process can be simplified.

The conductive film 255 has a lower resistivity than the conductive film 252. For example, the conductive film 255 can be formed to have a single-layer structure or a stacked-layer structure using any of metal materials such as molybdenum, titanium, chromium, tantalum, tungsten, aluminum, copper, silver, neodymium, and scandium, and an alloy material containing any of these elements.

To prevent the conductive film 255 from being perceived by the user of the input/output device, the conductive film 255 is preferably provided in a position overlapping with a light-blocking film 243 and the like.

The connection portion 205a is electrically connected to an external input terminal through which a signal (e.g., a video signal, a clock signal, a start signal, and a reset signal)

or a potential from the outside is transmitted to the scan line driver circuit 302. An example in which the FPC 269 is provided as an external input terminal is shown here.

The connection portion 205a includes a conductive film 231 over the insulating film 213, a conductive film 233 over the conductive film 231, and a conductive film 235 over the conductive film 233. The conductive film 231 is electrically connected to the conductive film 235 via the conductive film 233. The conductive film 235 is electrically connected to the FPC 269 via a connector 267.

The conductive film 231 can be formed using the same material and the same step as those of the source electrode 225a and the drain electrode 225b included in the transistors 201a and 203a. The conductive film 233 can be formed using the same material and the same step as those of the conductive film 251 included in the liquid crystal element 207a. The conductive film 235 can be formed using the same material and the same step as those of the conductive film 252 included in the liquid crystal element 207a. It is preferable to form the conductive films included in the connection portion 205a using the same materials and the same steps as an electrode or a wiring used for a display portion or a driver circuit portion in such a manner because an increase in number of steps can be prevented.

A substrate 261 is provided with the coloring film 241, the light-blocking film 243, and an insulating film 245. FIG. 1B illustrates an example in which the substrate 261 has a smaller thickness than the substrate 211; however, one embodiment of the present invention is not limited to this example. One of the substrates 261 and 211 may be thinner than the other, or the substrates 261 and 211 may have the same thickness. It is preferable to make the substrate on the display surface side (the side near a sensing target) thin because the detection sensitivity of a sensor element can be increased.

The coloring film 241 partly overlaps with the liquid crystal element 207a. The light-blocking film 243 partly overlaps with at least one of the transistors 201a and 203a.

The insulating film 245 preferably has a function of an overcoat preventing impurities contained in the coloring film 241, the light-blocking film 243, and the like from diffusing into the liquid crystal 249. The insulating film 245 is not necessarily provided.

Note that an alignment film in contact with the liquid crystal 249 may be provided. The alignment film can control the alignment of the liquid crystal 249. For example, in FIG. 1B, an alignment film may be formed to cover the conductive film 252 or may be formed between the insulating film 245 and the liquid crystal 249. The insulating film 245 may serve as an alignment film and an overcoat.

The input/output device 300 includes a spacer 247. The spacer 247 has a function of preventing the distance between the substrate 211 and the substrate 261 from being shorter than or equal to a certain distance.

FIG. 1B illustrates an example in which the spacer 247 is provided over the insulating film 253 and the conductive film 252; however, one embodiment of the present invention is not limited thereto. The spacer 247 may be provided on the substrate 211 side or on the substrate 261 side. For example, the spacer 247 may be formed on the insulating film 245. Moreover, although FIG. 1B illustrates an example in which the spacer 247 is in contact with the insulating films 253 and 245, the spacer 247 is not necessarily in contact with a component provided on the substrate 211 side or on the substrate 261 side.

A particulate spacer may be used as the spacer 247. Although a material such as silica can be used for the particulate spacer, an elastic material such as a resin or rubber is preferably used. In that case, the particulate spacer may be vertically crushed.

The substrates 211 and 261 are attached to each other with a bonding layer 265. A region surrounded by the substrate 211, the substrate 261, and the bonding layer 265 is filled with the liquid crystal 249.

Note that when the input/output device 300 serves as a transmissive liquid crystal display device, two polarizing plates are provided so that a display portion is sandwiched between the two polarizing plates. Light from a backlight provided outside the polarizing plate enters through the polarizing plate. At this time, the alignment of the liquid crystal 249 is controlled with a voltage applied between the conductive films 251 and 252, whereby optical modulation of light can be controlled. In other words, the intensity of light emitted through the polarizing plate can be controlled. Light excluding light in a particular wavelength range is absorbed by the coloring film 241, so that red, blue, or green light is emitted.

In addition to the polarizing plate, a circularly polarizing plate can be used, for example. As the circularly polarizing plate, for example, a stack including a linear polarizing plate and a quarter-wave retardation plate can be used. With the circularly polarizing plate, the viewing angle dependence of display of the input/output device can be reduced.

Note that the liquid crystal element 207a is an element using an FFS mode here; however, one embodiment of the present invention is not limited thereto, and a liquid crystal element using any of a variety of modes can be used. For example, a liquid crystal element using a vertical alignment (VA) mode, a twisted nematic (TN) mode, an in-plane switching (IPS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode, may be used as the input/output device 300. As a vertical alignment mode, a multi-domain vertical alignment (MVA) mode, a patterned vertical alignment (PVA) mode, or an ASV mode can be employed, for example.

Note that the liquid crystal element is an element that controls transmission or non-transmission of light by utilizing an optical modulation action of liquid crystal. Note that optical modulation action of a liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As the liquid crystal material, a positive liquid crystal or a negative liquid crystal may be used, and an appropriate liquid crystal material can be used depending on the mode and design to be used.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 weight % or more of a chiral material is mixed is used for the liquid crystal 249 in order to increase the temperature range. The liquid crystal composition that includes liquid crystal exhibiting a blue phase and a chiral material has a short response time and has optical isotropy. In addition, the liquid crystal composition that includes liquid crystal exhibiting a blue phase and a chiral material does not need alignment treatment and has a small viewing angle dependence. In addition, since an alignment film does not need to be provided and rubbing treatment is unnecessary, electrostatic discharge damage caused by the rubbing treatment can be prevented and defects or damage of the liquid crystal display device in the manufacturing process can be reduced.

A substrate with which a sensing target, such as a finger or a stylus, is to be in contact may be provided above the substrate 261. In that case, a polarizing plate or a circularly polarizing plate is preferably provided between the substrate 261 and the above substrate. In that case, a protective layer (such as a ceramic coat) is preferably provided over the above substrate. The protective layer can be formed using an inorganic insulating material such as silicon oxide, aluminum oxide, yttrium oxide, or yttria-stabilized zirconia (YSZ). Alternatively, tempered glass may be used for the substrate. Physical or chemical processing by an ion exchange method, a wind tempering method, or the like is performed on the tempered glass, so that compressive stress is applied on the surface.

FIG. 2A is a cross-sectional view of two adjacent pixels. Two subpixels illustrated in FIG. 2A are included in respective pixels.

In the input/output device of FIG. 2A, capacitance formed between the conductive film 252 in the left subpixel and the conductive film 252 in the right subpixel is utilized to sense proximity, touch, or the like of a sensing target. That is, in the input/output device of one embodiment of the present invention, the conductive film 252 serves as a common electrode of the liquid crystal element and an electrode of the sensor element.

As described above, an electrode included in the liquid crystal element also serves as an electrode included in the sensor element in the input/output device of one embodiment of the present invention; thus, the manufacturing process can be simplified and the manufacturing cost can be reduced. In addition, the thickness and weight of the input/output device can be reduced.

The conductive film 252 is electrically connected to the conductive film 255 serving as an auxiliary wiring. With the conductive film 255, the resistance of the electrode of the sensor element can be lowered. With the lowered resistance of the electrode of the sensor element, the time constant of the electrode of the sensor element can be small. The smaller the time constant of the electrode of the sensor element is, the higher the detection sensitivity and the detection accuracy are.

When the capacitance between the electrode of the sensor element and a signal line is too large, the time constant of the electrode of the sensor element becomes too large in some cases. Thus, an insulating film having a planarizing function is preferably provided between the electrode of the sensor element and the transistors to reduce the capacitance between the electrode of the sensor element and the signal line. For example, in FIG. 2A, as the insulating film having a planarizing function, the insulating film 219 is provided.

With the insulating film 219, the capacitance between the conductive film 252 and the signal line can be small. Accordingly, the time constant of the electrode of the sensor element can be small. As described above, the smaller the time constant of the electrode of the sensor element is, the higher the detection sensitivity and the detection accuracy are.

For example, the time constant of the electrode of the sensor element is greater than 0 seconds and smaller than or equal to $1 \times 10^{-4}$ seconds, preferably greater than 0 seconds and smaller than or equal to $5 \times 10^{-5}$ seconds, more preferably greater than 0 seconds and smaller than or equal to $5 \times 10^{6}$ seconds, more preferably greater than 0 seconds and smaller than or equal to $5 \times 10^{-7}$ seconds, more preferably greater than 0 seconds and smaller than or equal to $2 \times 10^{-7}$ seconds. In particular, when the time constant is smaller than or equal to $1 \times 10^{-6}$ seconds, high detection sensitivity can be achieved while the influence of noise is reduced.

[Cross-Sectional Structure Example 2 of Input/Output Device]

FIG. 2B is a cross-sectional view of two adjacent pixels that are different from those in FIG. 2A. Two subpixels illustrated in FIG. 2B are included in respective pixels. FIG. 3A is a cross-sectional view of this case taken along dashed-dotted lines A-B and C-D in FIG. 1A.

Structure example 2 illustrated in FIG. 2B and FIG. 3A differs from Structure example 1 illustrated in FIGS. 1B and 2A in the stacking order of the conductive film 251, the conductive film 252, the insulating film 253, and the conductive film 255. Note that in Structure example 2, the above description can be referred to for portions similar to Structure example 1.

Specifically, in Structure example 2, the conductive film 255 is over the insulating film 219, the conductive film 252 is over the conductive film 255, the insulating film 253 is over the conductive film 252, and the conductive film 251 is over the insulating film 253.

As illustrated in a liquid crystal element 207b of FIG. 2B, the conductive film 251 which is provided on the upper side and whose top surface shape is a comb-like shape or has a slit may serve as a pixel electrode, and the conductive film 252 provided on the lower side may serve as a common electrode. The conductive film 251 is electrically connected to the source or the drain of the transistor 203a.

In FIG. 2B, capacitance formed between the conductive film 252 in the left subpixel and the conductive film 252 in the right subpixel is utilized to sense proximity, touch, or the like of a sensing target. That is, in the input/output device of one embodiment of the present invention, the conductive film 252 serves as the common electrode of the liquid crystal element and the electrode of the sensor element.

Note that in Structure example 1 (FIGS. 1B and 2A), the conductive film 252 serving as the electrode of the sensor element and the common electrode is closer to the display surface side (the side near a sensing target) than the conductive film 251 serving as the pixel electrode is. Thus, in some cases, the detection sensitivity of Structure example 1 is higher than that of Structure example 2 in which the conductive film 251 is closer to the display surface side than the conductive film 252 is.

Moreover, the connection portion of Structure example 2 also differs from that of Structure example 1 because the stacking order of the conductive film 251, the conductive film 252, the insulating film 253, and the conductive film 255 of Structure example 2 is different from that of Structure example 1.

A connection portion 205b illustrated in FIG. 3A includes the conductive film 231 over the insulating film 213, the conductive film 233 over the conductive film 231, and the conductive film 235 over the conductive film 233. The conductive film 233 can be formed using the same material and the same step as those of the conductive film 252 included in the liquid crystal element 207b. The conductive film 235 can be formed using the same material and the same step as those of the conductive film 251 included in the liquid crystal element 207b.

FIGS. 3B and 3C illustrate other structure examples of the transistor included in the input/output device of one embodiment of the present invention. As illustrated in a transistor having two gates of FIG. 3B, the two gates are not necessarily electrically connected to each other. As illustrated in FIG. 3C, a top-gate transistor may be included in at least one of the driver circuit portion and the display portion.

FIGS. 3D to 3F illustrate other structure examples of the liquid crystal element included in the input/output device of one embodiment of the present invention. Both of the conductive films 251 and 252 may have a comb-like top surface shape or a top surface shape provided with a slit (a top surface shape is also referred to as a planar surface shape).

For example, when seen from the top, an end portion of a slit of one conductive film may overlap with an end portion of a slit of the other conductive film. A cross-sectional view of this case is illustrated in FIG. 3D.

Alternatively, when seen from the top, a portion where the conductive films 251 and 252 are not provided may exist. A cross-sectional view of this case is illustrated in FIG. 3E.

Further alternatively, when seen from the top, the conductive films 251 and 252 may overlap with each other partly. A cross-sectional view of this case is illustrated in FIG. 3F.

[Cross-Sectional Structure Example 3 of Input/Output Device]

FIG. 4 is a cross-sectional view taken along dashed-dotted lines A-B and C-D in FIG. 1A that is different from the cross-sectional views of FIG. 1B and FIG. 3A.

The structures of the transistors included in the display portion 301 and in the scan line driver circuit 302 of Structure example 3 in FIG. 4 differ from those of Structure example 1 in FIGS. 1B and 2A. Note that in Structure example 3, the above description can be referred to for portions similar to Structure example 1.

A transistor 201b has a structure in which an oxide semiconductor film where a channel is formed is sandwiched between two gates. The transistor 201b differs from the transistor 201a in that the gate electrode 221 is directly in contact with the oxide conductor film 227. Like this, two gates may be electrically connected to each other with no layer interposed therebetween.

Like the transistor 201b, a transistor 203b has a structure in which the oxide semiconductor film 223 where a channel is formed is sandwiched between two gates. Like this, a transistor having two gates may be applied not only in the driver circuit portion but also in the display portion. Note that although not illustrated, also in the transistor 203b, the gate electrode 221 is preferably electrically connected to the oxide conductor film 227.

Note that the shorter the distance between the oxide conductor film 227 and the electrode of the sensor element is, the more a problem of changing the potential of the electrode of the sensor element due to an influence of the oxide conductor film 227 is caused. In one embodiment of the present invention, the oxide conductor film 227 and the electrode of the sensor element are formed in different layers. This is preferable because the electrode of the sensor element is not easily affected by the oxide conductor film 227.

[Cross-Sectional Structure Example 4 of Input/Output Device]

Figure 5:
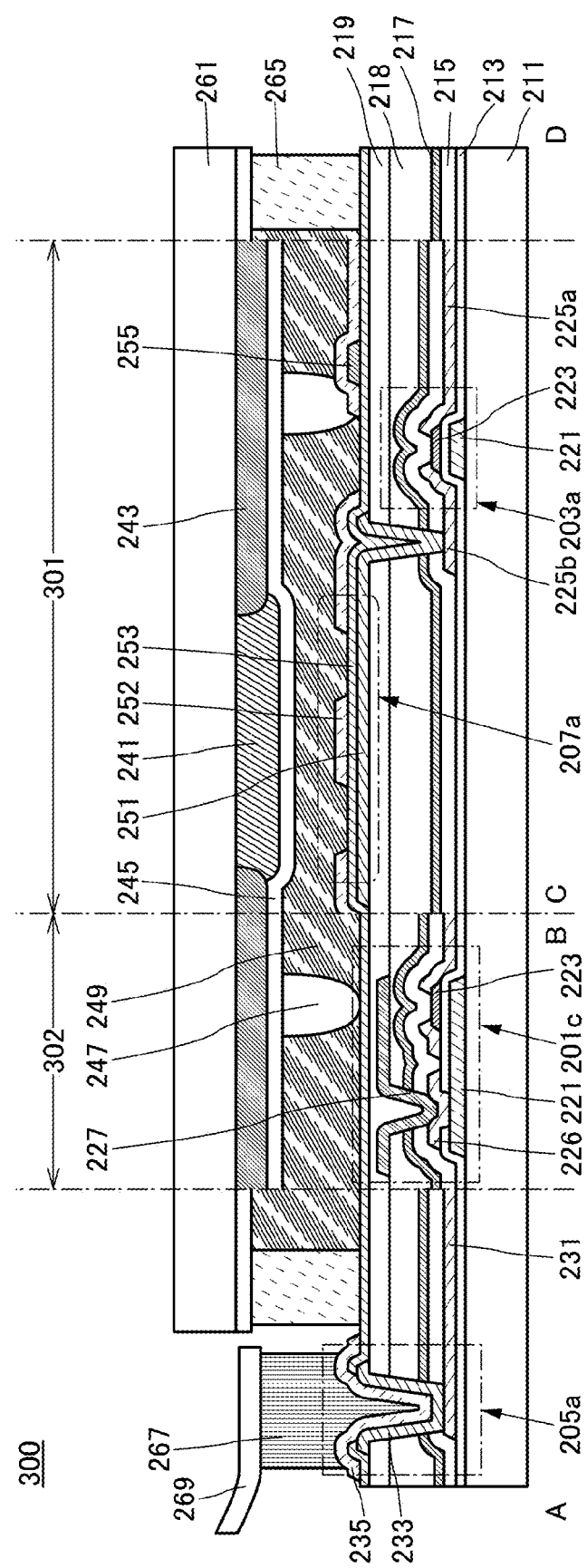
FIG. 5 is a cross-sectional view illustrating an example of an input/output device.

FIG. 5 is a cross-sectional view taken along dashed-dotted lines A-B and C-D in FIG. 1A that is different from the cross-sectional views of FIG. 1B, FIG. 3A, and FIG. 4.

Structure example 4 in FIG. 5 differs from Structure example 1 in FIGS. 1B and 2A in the structure of the transistor in the scan line driver circuit 302 and in the substrate provided with the spacer 247. Note that in Structure example 4, the above description can be referred to for portions similar to Structure example 1.

A transistor 201c has a structure in which an oxide semiconductor film where a channel is formed is sandwiched between two gates. The transistor 201c differs from the transistor 201a in the formation position of the oxide conductor film 227. Specifically, the insulating film 217 is over the insulating film 215, an insulating film 218 having a planarizing function is over the insulating film 217, and the oxide conductor film 227 is over the insulating film 218. As described above, the oxide conductor film 227 may be formed over an insulating film having a planarizing function. The transistor 201c is covered with the insulating film 219 having a planarizing function. Note that FIG. 5 illustrates an example in which the oxide conductor film 227 is electrically connected to the gate electrode 221 via the conductive film 226; however, as illustrated in FIG. 4, the oxide conductor film 227 may be directly in contact with the gate electrode 221.

Furthermore, FIG. 5 illustrates an example in which the spacer 247 is provided on the insulating film 245. Like this, the spacer 247 may be arranged on the substrate 261 side.

[Cross-Sectional Structure Example 5 of Input/Output Device]

Figure 6:
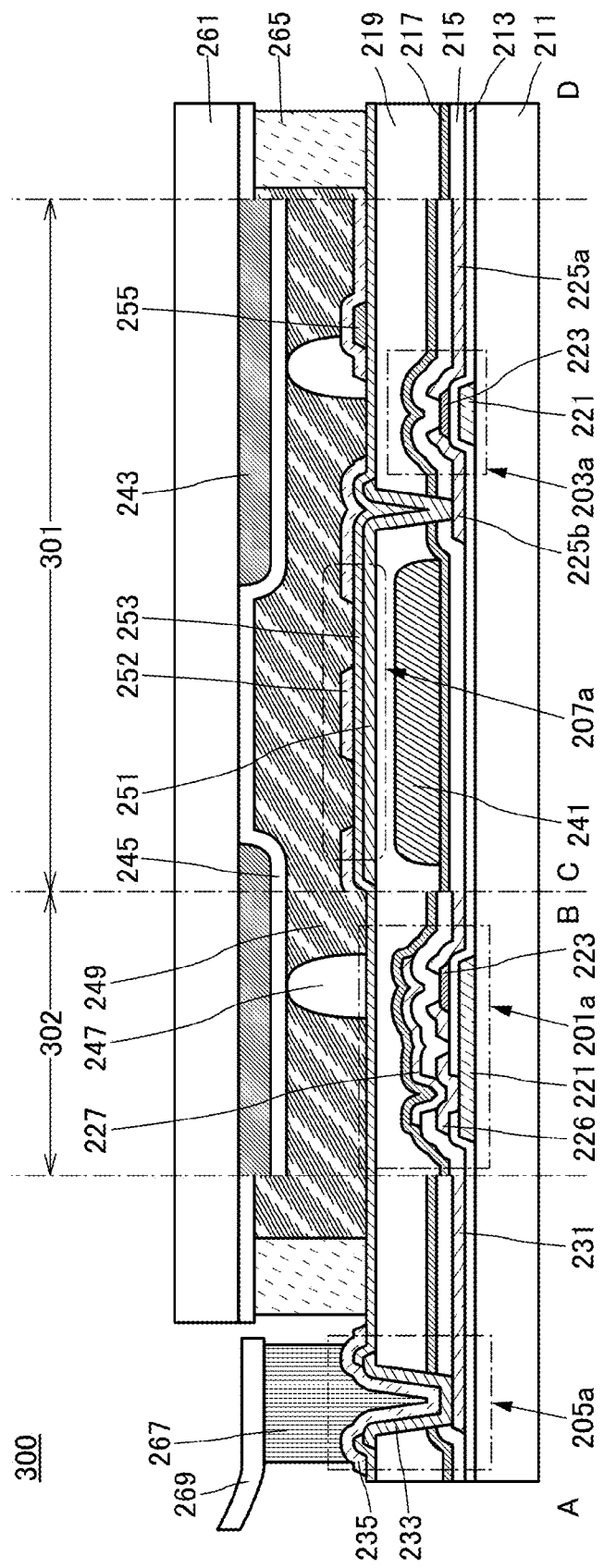
FIG. 6 is a cross-sectional view illustrating an example of an input/output device.

FIG. 6 is a cross-sectional view taken along dashed-dotted lines A-B and C-D in FIG. 1A that is different from the cross-sectional views of FIG. 1B, FIG. 3A, FIG. 4, and FIG. 5.

Structure example 5 in FIG. 6 differs from Structure example 1 in FIGS. 1B and 2A in the position of the coloring film 241. Note that in Structure example 5, the above description can be referred to for portions similar to Structure example 1.

The coloring film 241 is not necessarily formed on the counter substrate (the substrate 261) side. As illustrated in FIG. 6, the coloring film 241 may be formed over the substrate 211 provided with the transistors and the like. Accordingly, a decrease in yield and display quality caused by a decrease in alignment accuracy of the substrates 211 and 261 due to an increase in resolution of the display of the input/output device can be suppressed.

[Cross-Sectional Structure Example 6 of Input/Output Device]

Figure 34:
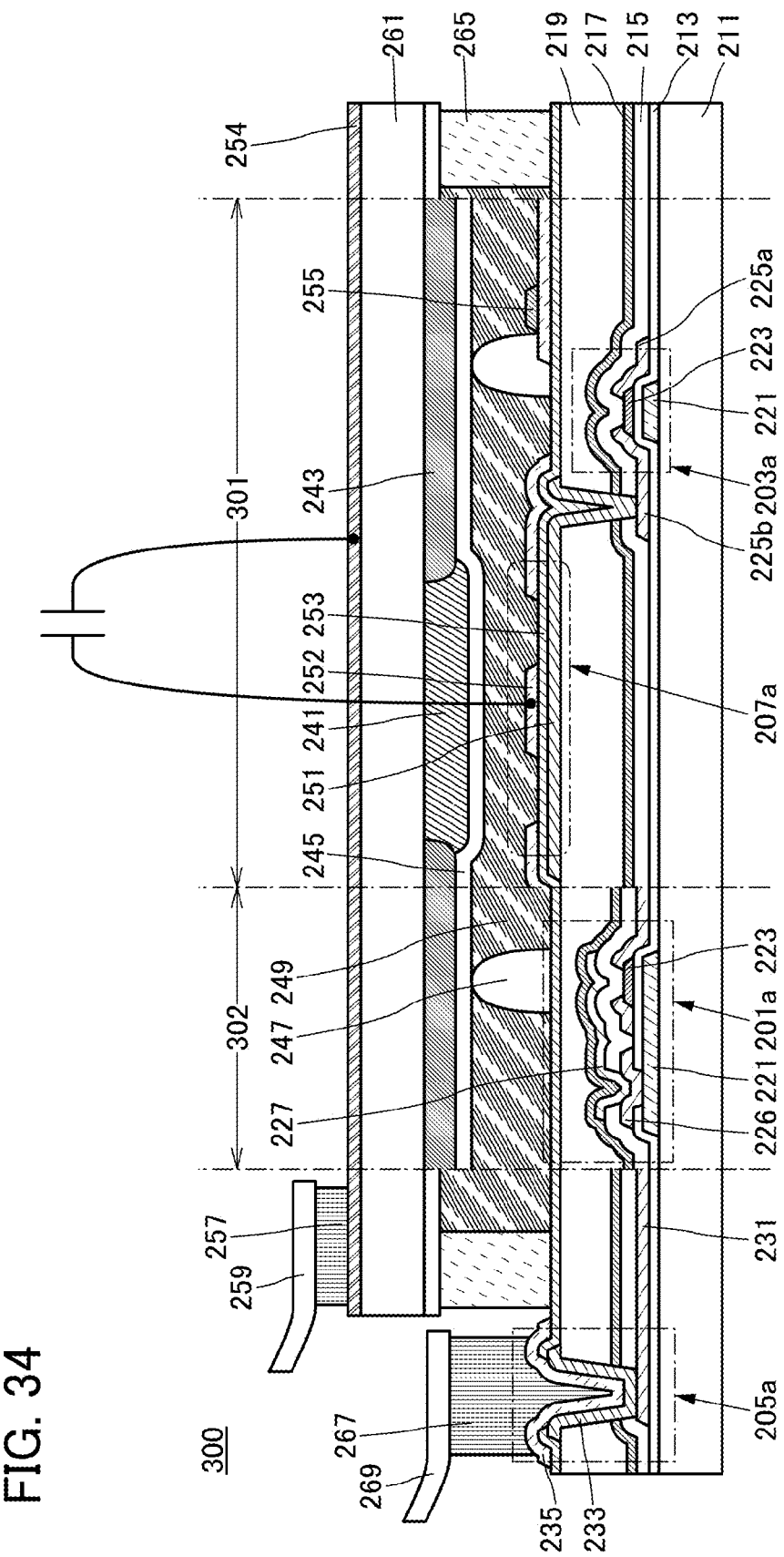
FIG. 34 is a cross-sectional view illustrating an example of an input/output device.

FIG. 34 is a cross-sectional view of an input/output device that is different from the input/output devices in the above-described structure examples. The input/output device of one embodiment of the present invention is not limited to a full-in-cell touch panel in which an electrode and the like included in a sensor element are provided only over a substrate supporting a display element. As illustrated in the input/output device of FIG. 34, an electrode included in a sensor element may be provided on a counter substrate side.

FIG. 34 illustrates an example in which a conductive film 254 is formed over a surface of the substrate 261 that is opposite to a surface on which the coloring film 241 and the like are formed. The conductive film 254 is electrically connected to an FPC 259 via a connector 257. In the input/output device 300 of FIG. 34, capacitance formed between the conductive film 252 and the conductive film 254 is utilized to sense proximity, touch, or the like of a sensing target. That is, in the input/output device of one embodiment of the present invention, the conductive film 252 serves as the common electrode of the liquid crystal element and one electrode of the sensor element. In this manner, the common electrode of the liquid crystal element may serve as the one electrode or a pair of electrodes of the sensor element.

Furthermore, FIG. 34 illustrates an example in which the conductive film 255 is formed over the conductive film 252. The electrode of the liquid crystal element may be over or under a conductive film that can serve as an auxiliary wiring of the electrode.

Next, the details of the materials and the like that can be used for components of the input/output device of this embodiment are described. Note that description on the components already described is omitted in some cases. The materials described below can be used for the input/output device described in a later embodiment and its components.

<<Substrate>>

There is no particular limitation on a material and the like of the substrates included in the input/output device 300 as long as the material has heat resistance high enough to withstand at least heat treatment performed later. For example, a glass substrate, a ceramic substrate, a quartz substrate, a sapphire substrate, or the like may be used as the substrates. Alternatively, a single crystal semiconductor substrate or a polycrystalline semiconductor substrate made of silicon or silicon carbide, a compound semiconductor substrate made of silicon germanium or the like, an SOI substrate, or the like may be used. Still alternatively, any of these substrates provided with a semiconductor element may be used as the substrate. Furthermore, any of these substrates further provided with a semiconductor element may be used as the substrate. In the case where a glass substrate is used as the substrate, a glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured. Alternatively, a flexible substrate may be used as the substrate 211, and the transistor, the capacitor, and the like may be formed directly on the flexible substrate.

The weight and thickness of the input/output device can be reduced by using a thin substrate. Furthermore, a flexible input/output device can be obtained by using a substrate that is thin enough to have flexibility.

Other than the above, a transistor can be formed using various substrates as the substrates 211 and 261. The type of a substrate is not limited to a certain type. Examples of the substrate include a plastic substrate, a metal substrate, a stainless steel substrate, a substrate including stainless steel foil, a tungsten substrate, a substrate including tungsten foil, a flexible substrate, an attachment film, paper including a fibrous material, and a base film. As an example of a glass substrate, a barium borosilicate glass substrate, an aluminoborosilicate glass substrate, a soda lime glass substrate, or the like can be given. Examples of a flexible substrate include a flexible synthetic resin such as plastics typified by polyethylene terephthalate (PET), polyethylene naphthalate (PEN), and polyether sulfone (PES), and acrylic. Examples of an attachment film are attachment films formed using polypropylene, polyester, polyvinyl fluoride, polyvinyl chloride, and the like. Examples of the material for the base film include polyester, polyamide, polyimide, inorganic vapor deposition film, and paper. Specifically, the use of semiconductor substrates, single crystal substrates, SOI substrates, or the like enables the manufacture of small-sized transistors with a small variation in characteristics, size, shape, or the like and with high current capability. A circuit using such transistors achieves lower power consumption of the circuit or higher integration of the circuit.

Note that a transistor may be formed using one substrate, and then the transistor may be transferred to another substrate. Examples of a substrate to which a transistor is transferred include, in addition to the above substrate over which the transistor can be formed, a paper substrate, a cellophane substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), and the like), a leather substrate, and a rubber substrate. When such a substrate is used, a transistor with excellent properties or a transistor with low power consumption can be formed, a device with high durability or high heat resistance can be provided, or reduction in weight or thickness can be achieved.

<<Transistor>>

The structure of the transistors in the input/output device of one embodiment of the present invention is not particularly limited. For example, a planar transistor, a staggered transistor, or an inverted staggered transistor may be used. A top-gate transistor or a bottom-gate transistor may be used. Gate electrodes may be provided above and below a channel. A semiconductor material used for the transistor is not particularly limited, and for example, an oxide semiconductor, silicon, or germanium can be used.

There is no particular limitation on the crystallinity of a semiconductor material used for the transistor either, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material for the semiconductor layer of the transistor, an element of Group 14, a compound semiconductor, or an oxide semiconductor can be used, for example. Typically, a semiconductor containing silicon, a semiconductor containing gallium arsenide, an oxide semiconductor containing indium, or the like can be used.

An oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because the off-state current of the transistor can be reduced.

For example, it is preferable that the oxide semiconductor contain at least indium (In) or zinc (Zn). It is further preferable that the oxide semiconductor contains an oxide represented by an In-M-Zn oxide (M is a metal such as Al, Ti, Ga, Ge, Y, Zr, La, Ce, Sn, Mg, Nd, or Hf).

As the semiconductor layer, it is particularly preferable to use an oxide semiconductor film including a plurality of crystal parts whose c-axes are aligned substantially perpendicular to a surface on which the semiconductor layer is formed or the top surface of the semiconductor layer and having no grain boundary between adjacent crystal parts.

There is no grain boundary in such an oxide semiconductor; therefore, generation of a crack in an oxide semiconductor film that is caused by stress when a display panel is bent is prevented. Therefore, such an oxide semiconductor can be preferably used for a flexible input/output device that is used in a bent state, or the like.

Moreover, the use of such an oxide semiconductor for the semiconductor layer makes it possible to provide a highly reliable transistor in which a variation in electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed in each display region is maintained. As a result, a display device with an extremely low power consumption can be obtained.

<<Oxide Semiconductor Film>>

It is preferable that the oxide semiconductor film 223 includes a film represented by an In-M-Zn oxide that contains, for example, at least indium (In), zinc (Zn), and M (a metal such as Al, Ti, Ga, Ge, Y, Zr, La, Ce, Sn, Mg, Nd, or Hf). In order to reduce variations in electrical characteristics of the transistor including the oxide semiconductor, the oxide semiconductor preferably contains a stabilizer in addition to the above elements.

Examples of the stabilizer, including metals that can be used as M, are gallium (Ga), tin (Sn), hafnium (Hf), aluminum (Al), and zirconium (Zr). Other examples of the stabilizer are lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As an oxide semiconductor included in the oxide semiconductor film 223, any of the following oxides can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

Note that in the case where the oxide semiconductor film 223 includes an In-M-Zn oxide, when the summation of In and M is assumed to be 100 atomic %, the atomic proportions of In and M are preferably higher than 25 atomic % and lower than 75 atomic %, respectively, more preferably higher than 34 atomic % and lower than 66 atomic %, respectively.

The energy gap of the oxide semiconductor film 223 is 2 eV or more, preferably 2.5 eV or more, more preferably 3 eV or more. In this manner, the off-state current of the transistor can be reduced by using an oxide semiconductor having a wide energy gap.

The thickness of the oxide semiconductor film 223 is greater than or equal to 3 nm and less than or equal to 200 nm, preferably greater than or equal to 3 nm and less than or equal to 100 nm, more preferably greater than or equal to 3 nm and less than or equal to 50 nm.

In the case where the oxide semiconductor film 223 includes an In-M-Zn oxide (M is Al, Ti, Ga, Ge, Y, Zr, La, Ce, Sn, Mg, Nd, or Hf), it is preferable that the atomic ratio of metal elements of a sputtering target used for forming a film of the In-M-Zn oxide satisfy In≥M and Zn≥M. As the atomic ratio of the metal elements of such a sputtering target, In:M:Zn=1:1:1, In:M:Zn=1:1:1.2, In:M:Zn=3:1:2, In:M:Zn=1:3:4, In:M:Zn=1:3:6, and the like are given. Note that the atomic ratio of metal elements in the formed oxide semiconductor film 223 varies from the above atomic ratio of metal elements of the sputtering target within a range of ±40% as an error.

An oxide semiconductor film with a low carrier density is used as the oxide semiconductor film 223. For example, an oxide semiconductor film whose carrier density is lower than or equal to $1\times10^{17}/cm^3$, preferably lower than or equal to $1\times10^{15}/cm^3$, more preferably lower than or equal to $1\times10^{13}/cm^3$, more preferably lower than or equal to $1\times10^{11}/cm^3$ is used as the oxide semiconductor film 223.

Note that, without limitation to those described above, a material with an appropriate composition can be used depending on required semiconductor characteristics and electrical characteristics (e.g., field-effect mobility and threshold voltage) of the transistor. Furthermore, to obtain required semiconductor characteristics of the transistor, it is preferable that the carrier density, the impurity concentration, the defect density, the atomic ratio of a metal element to oxygen, the interatomic distance, the density, and the like of the oxide semiconductor film 223 be set to be appropriate.

When silicon or carbon that is one of elements belonging to Group 14 is contained in the oxide semiconductor film 223, oxygen vacancies are increased, and the oxide semiconductor film 223 has n-type conductivity. Thus, the concentration of silicon or carbon (measured by secondary ion mass spectrometry (SIMS)) of the oxide semiconductor film 223 is lower than or equal to $2\times10^{18}$ atoms/cm$^3$, preferably lower than or equal to $2\times10^{17}$ atoms/cm$^3$.

Furthermore, the concentration of alkali metal or alkaline earth metal in the oxide semiconductor film 223, which is measured by SIMS, is lower than or equal to $1\times10^{18}$ atoms/cm$^3$, preferably lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal in the oxide semiconductor film 223.

When nitrogen is contained in the oxide semiconductor film 223, electrons serving as carriers are generated to increase the carrier density, so that the oxide semiconductor film 223 easily has n-type conductivity. Thus, a transistor including an oxide semiconductor that contains nitrogen is likely to be normally on. For this reason, nitrogen in the oxide semiconductor film is preferably reduced as much as possible; the concentration of nitrogen that is measured by SIMS is preferably set to, for example, lower than or equal to $5\times10^{18}$ atoms/cm$^3$.

The oxide semiconductor film 223 may have a non-single-crystal structure, for example. The non-single-crystal structure includes a c-axis aligned crystalline oxide semiconductor (CAAC-OS) that is described later, a polycrystalline structure, a microcrystalline structure that is described later, or an amorphous structure, for example. Among the non-single-crystal structures, an amorphous structure has the highest density of defect states, whereas CAAC-OS has the lowest density of defect states.

The oxide semiconductor film 223 may have an amorphous structure, for example. An oxide semiconductor film having an amorphous structure has disordered atomic arrangement and no crystalline component, for example. Alternatively, an oxide film having an amorphous structure has, for example, an absolutely amorphous structure and no crystal part.

Note that the oxide semiconductor film 223 may be a mixed film including two or more of the following: a region having an amorphous structure, a region having a microcrystalline structure, a region having a polycrystalline structure, a region of CAAC-OS, and a region having a single-crystal structure. The mixed film has a single-layer structure including, for example, two or more of a region having an amorphous structure, a region having a microcrystalline structure, a region having a polycrystalline structure, a CAAC-OS region, and a region having a single-crystal structure in some cases. Furthermore, the mixed film has a stacked-layer structure of two or more of the following in some cases: the region having an amorphous structure, the region having a microcrystalline structure, the region having a polycrystalline structure, the region of CAAC-OS, and the region having a single-crystal structure.

Alternatively, silicon is preferably used as a semiconductor in which a channel of the transistor is formed. Although amorphous silicon may be used as silicon, silicon having crystallinity is particularly preferable. For example, microcrystalline silicon, polycrystalline silicon, single crystal silicon, or the like is preferably used. In particular, polycrystalline silicon can be formed at a lower temperature than single crystal silicon and has a higher field-effect mobility and a higher reliability than amorphous silicon. When such a polycrystalline semiconductor is used for a pixel, the aperture ratio of the pixel can be improved. Even in the case where an extremely high resolution input/output device is manufactured, a gate driver circuit and a source driver circuit can be formed over a substrate over which the pixels are formed, and the number of components of an electronic device can be reduced.

<<Method for Controlling Resistivity of Oxide Semiconductor>>

An oxide semiconductor is a semiconductor material whose resistance can be controlled by oxygen vacancies in the film and/or the concentration of impurities such as hydrogen or water in the film. Thus, the resistivity of the oxide conductor film can be controlled by selecting treatment for increasing oxygen vacancies and/or impurity concentration on the oxide semiconductor film or treatment for reducing oxygen vacancies and/or impurity concentration on the oxide semiconductor film.

Note that such an oxide conductor film formed using an oxide semiconductor film can be referred to as an oxide semiconductor film having a high carrier density and a low resistance, an oxide semiconductor film having conductivity, or an oxide semiconductor film having high conductivity.

Specifically, plasma treatment is performed on an oxide semiconductor film to be the oxide conductor film 227 serving as a gate to increase oxygen vacancies and/or impurities such as hydrogen or water in the oxide semiconductor film; accordingly, the oxide semiconductor film can have a high carrier density and a low resistance. Alternatively, the insulating film 217 containing hydrogen is formed in contact with the oxide semiconductor film to diffuse hydrogen from the insulating film 217 containing hydrogen to the oxide semiconductor film, so that the oxide semiconductor film can have a high carrier density and a low resistance.

The insulating film 215 is formed over the oxide semiconductor film 223 so that the oxide semiconductor film 223 is not subjected to the above plasma treatment. Since the insulating film 215 is provided, the oxide semiconductor film 223 is not in contact with the insulating film 217 containing hydrogen. The insulating film 215 can be formed using an insulating film capable of releasing oxygen, in which case oxygen can be supplied to the oxide semiconductor film 223. The oxide semiconductor film 223 to which oxygen is supplied is an oxide semiconductor in which oxygen vacancies in the film or at the interface are reduced and which has a high resistance. Note that as the insulating film capable of releasing oxygen, a silicon oxide film or a silicon oxynitride film can be used, for example.

To obtain an oxide semiconductor film having a low resistivity, hydrogen, boron, phosphorus, or nitrogen may be introduced into the oxide semiconductor film by an ion implantation method, an ion doping method, a plasma immersion ion implantation method, or the like.

As the plasma treatment to be performed on the oxide conductor film 227, plasma treatment using a gas containing one of a rare gas (He, Ne, Ar, Kr, or Xe), phosphorus, boron, hydrogen, and nitrogen is typical. Specifically, plasma treatment in an Ar atmosphere, plasma treatment in a mixed gas atmosphere of Ar and hydrogen, plasma treatment in an ammonia atmosphere, plasma treatment in a mixed gas atmosphere of Ar and ammonia, plasma treatment in a nitrogen atmosphere, or the like can be employed.

By the plasma treatment, an oxygen vacancy is formed in a lattice from which oxygen is released (or in a portion from which oxygen is released) in the oxide conductor film 227. This oxygen vacancy can cause carrier generation. Furthermore, when hydrogen is supplied from an insulating film that is in the vicinity of the oxide conductor film 227, specifically, that is in contact with the lower surface or the upper surface of the oxide conductor film 227, and hydrogen enters the oxygen vacancy, an electron serving as a carrier might be generated. Accordingly, the oxide conductor film 227 whose oxygen vacancies are increased by the plasma treatment has a higher carrier density than the oxide semiconductor film 223.

The oxide semiconductor film 223 in which oxygen vacancies are reduced and the hydrogen concentration is reduced can be referred to as a highly purified intrinsic or substantially highly purified intrinsic oxide semiconductor film. The term "substantially intrinsic" refers to the state where an oxide semiconductor has a carrier density lower than $1\times10^{17}/cm^3$, preferably lower than $1\times10^{15}/cm^3$, further preferably lower than $1\times10^{13}/cm^3$. Furthermore, the state in which an impurity concentration is low and the density of defect states is low (the amount of oxygen vacancies is small) is referred to as "highly purified intrinsic" or "substantially highly purified intrinsic". A highly purified intrinsic or substantially highly purified intrinsic oxide semiconductor has few carrier generation sources, and thus has a low carrier density in some cases. Thus, a transistor including the oxide semiconductor film in which a channel region is formed is likely to have positive threshold voltage (normally-off characteristics). The highly purified intrinsic or substantially highly purified intrinsic oxide semiconductor film 223 has a low density of defect states and accordingly can have a low density of trap states.

Furthermore, the highly purified intrinsic or substantially highly purified intrinsic oxide semiconductor film 223 has an extremely low off-state current; even when an element has a channel width of $1\times10^6$ μm and a channel length of 10 μm, the off-state current can be less than or equal to the measurement limit of a semiconductor parameter analyzer, i.e., less than or equal to $1\times10^{-13}$ A, at a voltage (drain voltage) between a source electrode and a drain electrode of from 1 V to 10 V. Thus, the transistor whose channel region is formed in the oxide semiconductor film 223 has a small variation in electrical characteristics and high reliability.

For example, an insulating film containing hydrogen, that is, an insulating film capable of releasing hydrogen, typically, a silicon nitride film, is used as the insulating film 217, whereby hydrogen can be supplied to the oxide conductor film 227. The insulating film capable of releasing hydrogen preferably has a hydrogen concentration of $1\times10^{22}$ atoms/cm$^3$ or higher. Such an insulating film is formed in contact with the oxide conductor film 227, whereby hydrogen can be effectively contained in the oxide conductor film 227. In this manner, the above-described plasma treatment is performed and the structure of the insulating film in contact with the oxide semiconductor film (or the oxide conductor film) is changed, whereby the resistance of the oxide semiconductor film (or the oxide conductor film) can be appropriately adjusted.

Hydrogen contained in the oxide conductor film 227 reacts with oxygen bonded to a metal atom to be water, and in addition, an oxygen vacancy is formed in a lattice from which oxygen is released (or a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Thus, the oxide conductor film 227 containing hydrogen has a higher carrier density than the oxide semiconductor film 223.

Hydrogen in the oxide semiconductor film 223 of the transistor in which a channel region is formed is preferably reduced as much as possible. Specifically, in the oxide semiconductor film 223, the concentration of hydrogen that is measured by SIMS is set to $2\times10^{20}$ atoms/cm$^3$ or lower, preferably $5\times10^{19}$ atoms/cm$^3$ or lower, more preferably $1\times10^{19}$ atoms/cm$^3$ or lower, more preferably $5\times10^{18}$ atoms/cm$^3$ or lower, preferably $1\times10^{18}$ atoms/cm$^3$ or lower, more preferably $5\times10^{17}$ atoms/cm$^3$ or lower, still more preferably $1\times10^{16}$ atoms/cm$^3$ or lower.

On the other hand, the oxide conductor film 227 serving as a gate is a low-resistance oxide conductor film having a high hydrogen concentration and/or a large amount of oxygen vacancies as compared to the oxide semiconductor film 223.

A material that can be used for the oxide semiconductor film 223 and a method for forming the oxide semiconductor film 223 can be applied to those for the oxide conductor film 227. Note that the oxide semiconductor film 223 and the oxide conductor film 227 have a light-transmitting property.

Note that a material that can be used for the oxide conductor film 227 and a method for forming the oxide conductor film 227 can be applied to those for the conductive films 251 and 252.

<<Insulating Film>>

An organic insulating material or an inorganic insulating material can be used as an insulating material that can be used for the insulating film, the overcoat, the spacer, or the like included in the input/output device. Examples of a resin include an acrylic resin, an epoxy resin, a polyimide resin, a polyamide resin, a polyamide-imide resin, a siloxane resin, a benzocyclobutene-based resin, and a phenol resin. Examples of an inorganic insulating film include a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, and a neodymium oxide film.

<<Conductive Film>>

For the conductive film such as the gate, the source, and the drain of a transistor and the wiring, the electrode, and the like of the input/output device, a single-layer structure or a stacked structure using any of metals such as aluminum, titanium, chromium, nickel, copper, yttrium, zirconium, molybdenum, silver, tantalum, and tungsten, or an alloy containing any of these metals as its main component can be used. For example, a two-layer structure in which a titanium film is stacked over an aluminum film, a two-layer structure in which a titanium film is stacked over a tungsten film, a two-layer structure in which a copper film is stacked over a molybdenum film, a two-layer structure in which a copper film is stacked over an alloy film containing molybdenum and tungsten, a two-layer structure in which a copper film is stacked over a copper-magnesium-aluminum alloy film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. For example, in the case where the source electrode 225a and the drain electrode 225b have a three-layer structure, it is preferable that each of the first and third layers be a film formed of titanium, titanium nitride, molybdenum, tungsten, an alloy containing molybdenum and tungsten, an alloy containing molybdenum and zirconium, or molybdenum nitride, and that the second layer be a film formed of a low-resistance material such as copper, aluminum, gold, silver, or an alloy containing copper and manganese. A light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added may be used.

Note that the conductive film may be formed using the above-described method for controlling the resistivity of an oxide semiconductor.

<<Bonding Layer>>

A curable resin such as a thermosetting resin, a photo-curable resin, or a two-liquid mixing type curable resin can be used for the bonding layer 265. For example, an acrylic resin, a urethane resin, an epoxy resin, or a resin having a siloxane bond can be used.

<<Connector>>

As the connector, anisotropic conductive films (ACF), anisotropic conductive pastes (ACP), and the like can be used for example.

<<Coloring Film>>

The coloring film is a colored layer that transmits light in a specific wavelength range. Examples of a material that can be used for the coloring film include a metal material, a resin material, and a resin material containing a pigment or dye.

<<Light-Blocking Film>>

The light-blocking film is provided between adjacent coloring films. For the light-blocking film, for example, a black matrix can be formed using a metal material or a resin material containing pigment or dye. Note that it is preferable to provide the light-blocking film also in a region other than the display portion, such as a driver circuit portion, in which case undesired leakage of guided light or the like can be inhibited.

[Operation Example of Input/Output Device]

Next, an operation example and the like of the input/output device of one embodiment of the present invention are described.

Figure 7A:
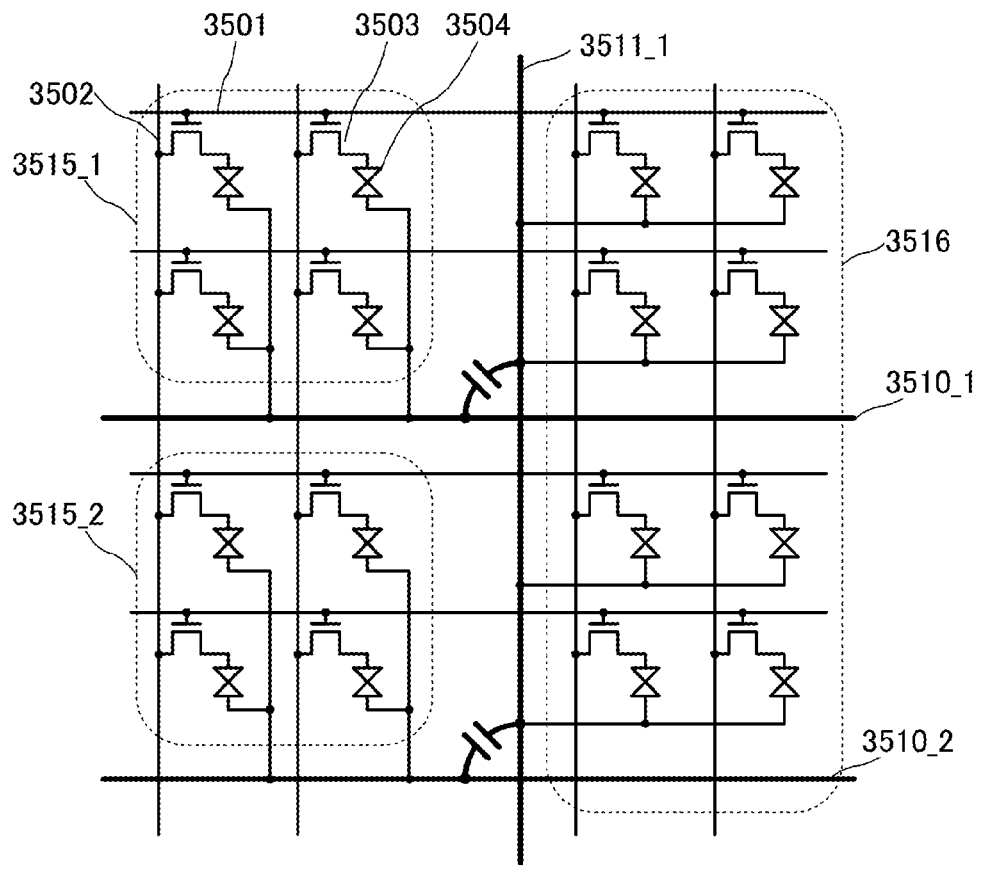
FIGS. 7A and 7B illustrate examples of a sensor element and a pixel.

FIG. 7A is an equivalent circuit diagram of a pixel circuit provided in the display portion of the input/output device of one embodiment of the present invention.

Each pixel includes at least a transistor 3503 and a liquid crystal element 3504. A gate of the transistor 3503 is electrically connected to a wiring 3501. One of a source and a drain of the transistor 3503 is electrically connected to a wiring 3502.

The pixel circuit includes a plurality of wirings extending in the X direction (e.g., a wiring 3510_1 and a wiring 3510_2) and a plurality of wirings extending in the Y direction (e.g., a wiring 3511_1). They are provided to intersect with each other, and capacitance is formed therebetween.

Among the pixels provided in the pixel circuit, electrodes on one side of the liquid crystal elements of some pixels adjacent to each other are electrically connected to each other to form one block. The block is classified into two types: an island-shaped block (e.g., a block 3515_1 or a block 3515_2) and a linear block extending in the X direction or the Y direction (e.g., a block 3516 extending in the Y direction). Note that only part of the pixel circuit is illustrated in FIG. 7A, and actually, these two kinds of blocks are repeatedly arranged in the X direction and the Y direction. An electrode on one side of the liquid crystal element is, for example, a common electrode. An electrode on the other side of the liquid crystal element is, for example, a pixel electrode.

The wiring 3510_1 (or 3510_2) extending in the X direction is electrically connected to the island-shaped block 3515_1 (or the block 3515_2). Although not illustrated, the wiring 3510_1 extending in the X direction is electrically connected to a plurality of island-shaped blocks 3515_1 that are provided discontinuously along the X direction with the linear blocks therebetween. Furthermore, the wiring 3511_1 extending in the Y direction is electrically connected to the linear block 3516.

Figure 7B:
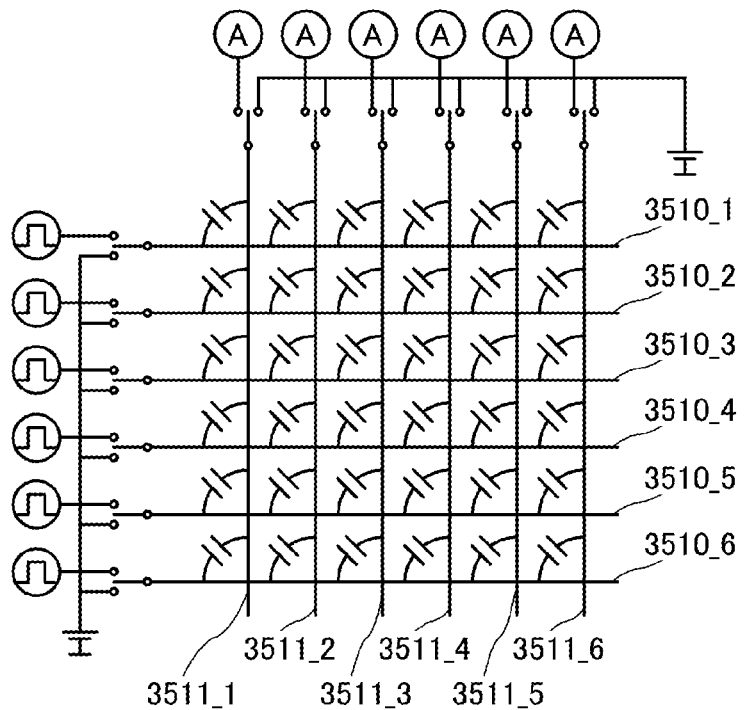

FIG. 7B is an equivalent circuit diagram illustrating the connection relation between a plurality of wirings extending in the X direction (the wirings 3510_1 to 3510_6 are collectively called a wiring 3510 in some cases) and a plurality of wirings extending in the Y direction (wirings 3511_1 to 3511_6 are collectively called a wiring 3511 in some cases). A common potential can be input to each of the wirings 3510 extending in the X direction and each of the wirings 3511 extending in the Y direction. A pulse voltage can be input to each of the wirings 3510 extending in the X direction from a pulse voltage output circuit. Furthermore, each of the wirings 3511 extending in the Y direction can be electrically connected to the detection circuit. Note that the wiring 3510 and the wiring 3511 can be replaced with each other.

An operation example of the input/output device of one embodiment of the present invention is described with reference to FIGS. 8A and 8B.

Here, one frame period is divided into a writing period and a sensing period. The writing period is a period in which image data is written to a pixel, and the wirings 3501 (also referred to as gate lines or scan lines) are sequentially selected. The sensing period is a period during which sensing is performed by the sensor element.

FIG. 8A is an equivalent circuit diagram in the writing period. In the wiring period, a common potential is input to both the wiring 3510 extending in the X direction and the wiring 3511 extending in the Y direction.

FIG. 8B is an equivalent circuit diagram in the sensing period. In the sensing period, each of the wirings 3511 extending in the Y direction is electrically connected to the detection circuit. Furthermore, a pulse voltage is input to the wirings 3510 extending in the X direction from a pulse voltage output circuit.

FIG. 8C illustrates an example of a timing chart of the input and output waveforms of a mutual capacitive sensor element.

In FIG. 8C, sensing of a sensing target is performed in all rows and columns in one frame period. FIG. 8C shows two cases in the sensing period: a case in which a sensing target is not sensed (not touched) and a case in which a sensing target is sensed (touched).

A pulse voltage is supplied to the wirings 3510_1 to 3510_6 from the pulse voltage output circuit. When the pulse voltage is applied to the wirings 3510_1 to 3510_6, an electric field is generated between a pair of electrodes forming a capacitor, and current flows in the capacitor. The electric field generated between the electrodes is changed by being blocked by the touch of a finger or a stylus. That is, the capacitance value of the capacitor is changed by touch or the like. By utilizing this, proximity or touch of a sensing target can be sensed.

The wirings 3511_1 to 3511_6 are connected to the detection circuit for detecting the change in current in the wirings 3511_1 to 3511_6 caused by the change in capacitance value of the capacitor. The current value detected in the wirings 3511_1 to 3511_6 is not changed when there is no proximity or touch of a sensing target, and is decreased when the capacitance value is decreased because of the proximity or touch of a sensing target. In order to detect a change in current, the total amount of current may be detected. In that case, an integrator circuit or the like may be used to detect the total amount of current. Alternatively, the peak value of current may be detected. In that case, current may be converted into voltage, and the peak value of voltage may be detected.

Note that the waveforms of the wirings 3511_1 to 3511_6 in FIG. 8C show voltage values corresponding to the detected current values. As shown in FIG. 8C, the timing of the display operation is preferably in synchronization with the timing of the sensing operation.

The waveforms of the wirings 3511_1 to 3511_6 change in accordance with pulse voltages applied to the wirings 3510_1 to 3510_6. When there is no proximity or touch of a sensing target, the waveforms of the wirings 3511_1 to 3511_6 uniformly change in accordance with changes in the voltages of the wirings 3510_1 to 3510_6. The current value is decreased at the point of proximity or touch of a sensing target and accordingly the waveform of the voltage value also changes.

By detecting a change in capacitance in this manner, proximity or touch of a sensing target can be sensed. Even when a sensing target such as a finger or a stylus does not touch but only approaches the input/output device, a signal may be detected in some cases.

Note that FIG. 8C shows an example in which a common potential supplied in the writing period is equal to a low potential supplied in the sensing period in the wiring 3510; however, one embodiment of the present invention is not limited thereto. The common potential may be different from the low potential.

It is preferable that, as an example, the pulse voltage output circuit and the detection circuit be formed in one IC. For example, the IC is preferably mounted on input/output device or a substrate in a housing of an electronic device. In the case where the input/output device has flexibility, parasitic capacitance might be increased in a bent portion of the input/output device, and the influence of noise might be increased. In view of this, it is preferable to use an IC to which a driving method less influenced by noise is applied. For example, it is preferable to use an IC to which a driving method capable of increasing a signal-noise ratio (S/N ratio) is applied.

It is preferable that a period in which an image is written and a period in which sensing is performed by a sensor element be separately provided as described above. Thus, a decrease in sensitivity of the sensor element caused by noise generated when data is written to a pixel can be suppressed.

In one embodiment of the present invention, as shown in FIG. 8D, one frame period includes one writing period and one sensing period. Alternatively, as shown in FIG. 8E, two sensing periods may be included in one frame period. When a plurality of sensing periods are included in one frame period, the detection sensitivity can be further increased. For example, two to four sensing periods may be included in one frame period.

[Top Structure Example of Sensor Element]

Next, top structure examples of the sensor element of the input/output device of one embodiment of the present invention are described with reference to FIGS. 9A and 9B, FIG. 10, and FIGS. 11A and 11B.

Figure 9A:
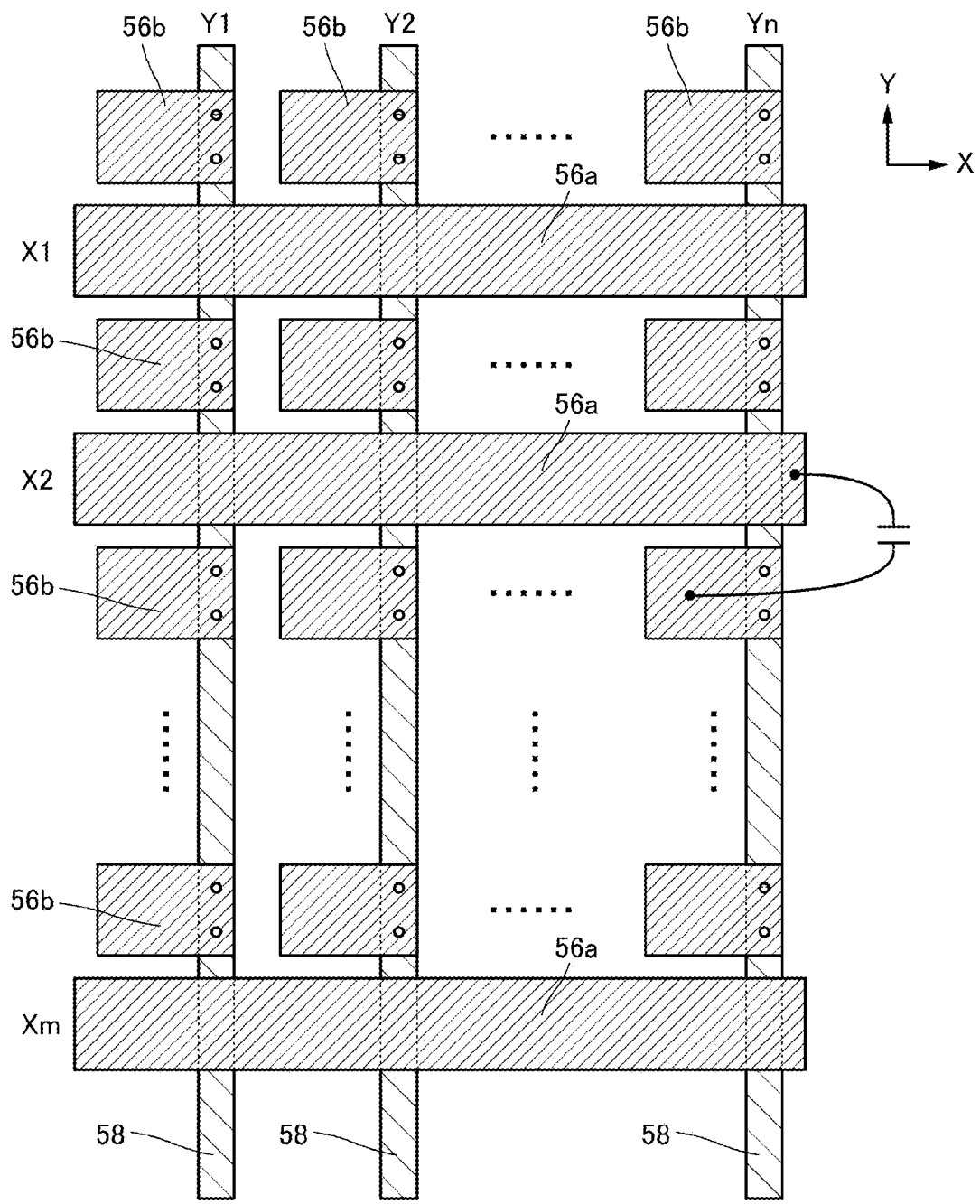
FIGS. 9A and 9B are top views illustrating examples of a sensor element and a pixel.

FIG. 9A illustrates a top view of the sensor element. The sensor element includes a conductive film 56a and a conductive film 56b. The conductive film 56a serves as one electrode of the sensor element. The conductive film 56b serves as the other electrode of the sensor element. The sensor element can sense proximity, touch, or the like of a sensing target by utilizing capacitance formed between the conductive films 56a and 56b. Although not illustrated, the conductive films 56a and 56b have a comb-like top surface shape or a top surface shape provided with a slit in some cases.

In one embodiment of the present invention, the conductive films 56a and 56b also serve as the common electrode of the liquid crystal element.

A plurality of conductive films 56a are provided in the Y direction and extend in the X direction. A plurality of conductive films 56b provided in the Y direction are electrically connected to each other via a conductive film 58 extending in the Y direction. FIG. 9A illustrates an example in which m conductive films 56a and n conductive films 58 are provided.

Note that the plurality of conductive films 56a may be provided in the X direction and in that case, may extend in the Y direction. The plurality of conductive films 56b provided in the X direction may be electrically connected to each other via the conductive film 58 extending in the X direction.

Figure 9B:
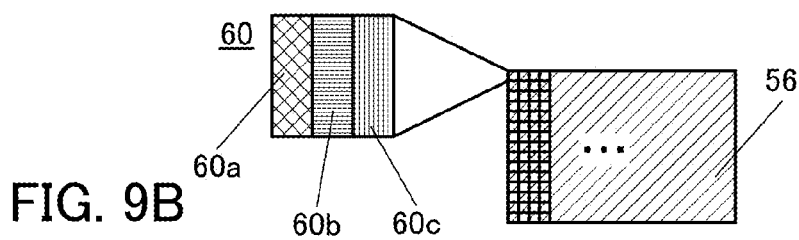

As illustrated in FIG. 9B, a conductive film 56 serving as an electrode of the sensor element is provided over a plurality of pixels 60. The conductive film 56 corresponds to each of the conductive films 56a and 56b in FIG. 9A. The pixel 60 is formed of a plurality of subpixels exhibiting different colors. FIG. 9B shows an example in which the pixel 60 is formed of three subpixels, subpixels 60a, 60b, and 60c.

Figure 10:
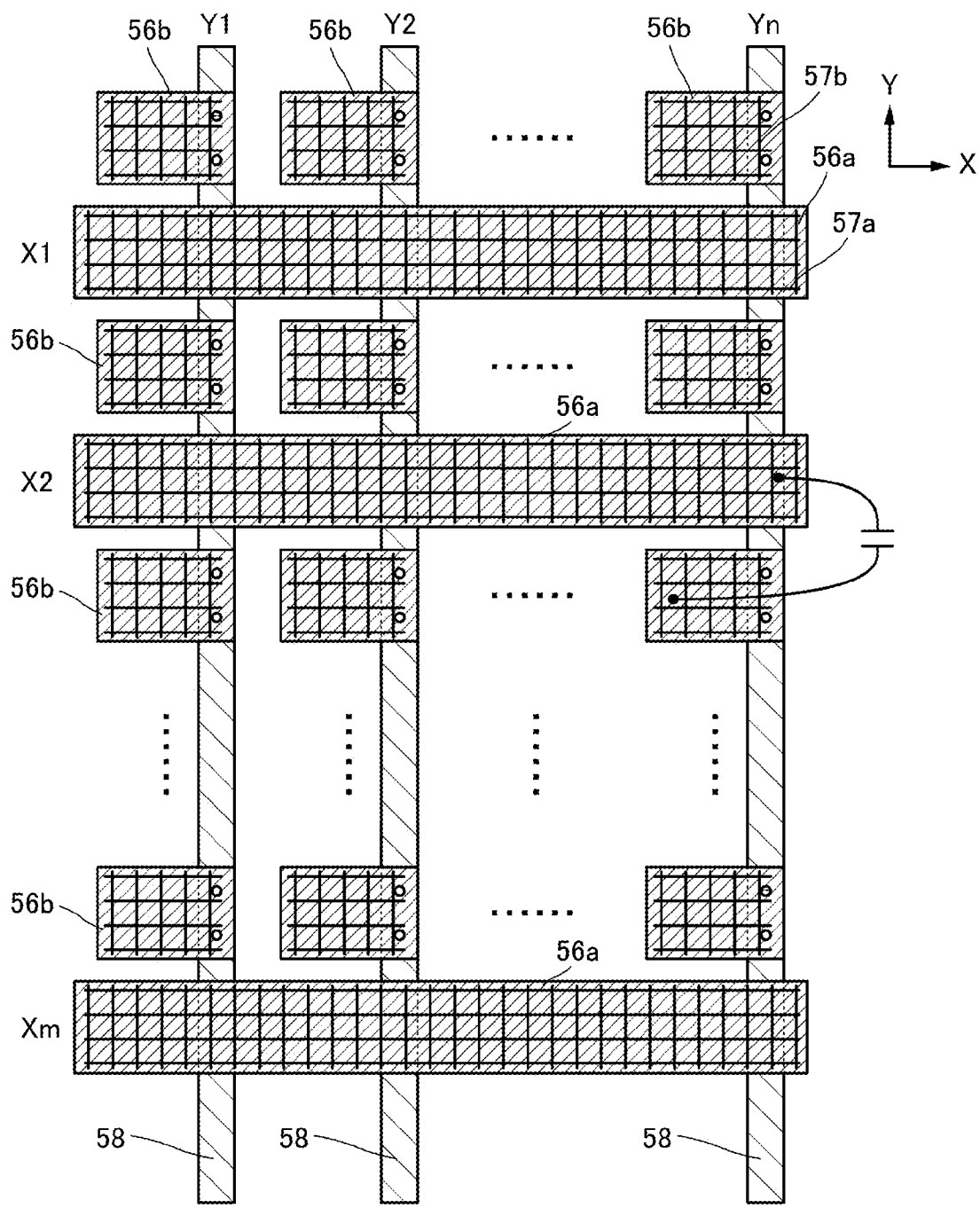
FIG. 10 is a top view illustrating an example of a sensor element.

A pair of electrodes of the sensor element is preferably electrically connected to respective auxiliary wirings. FIG. 10 illustrates an example in which the conductive films 56a and 56b are electrically connected to auxiliary wirings 57a and 57b, respectively. Note that FIG. 10 illustrates an example in which the auxiliary wirings are stacked over the conductive films; however, the conductive films may be stacked over the auxiliary wirings.

The resistivity of the conductive film that transmits visible light is relatively high in some cases. Thus, the resistance of the pair of electrodes of the sensor element is preferably lowered by electrically connecting the pair of electrodes of the sensor element to the auxiliary wiring.

When the resistance of the pair of electrodes of the sensor element is lowered, the time constant of the pair of electrodes can be small. Accordingly, the detection sensitivity of the sensor element can be increased; furthermore, the detection accuracy of the sensor element can be increased.

Figure 11A:
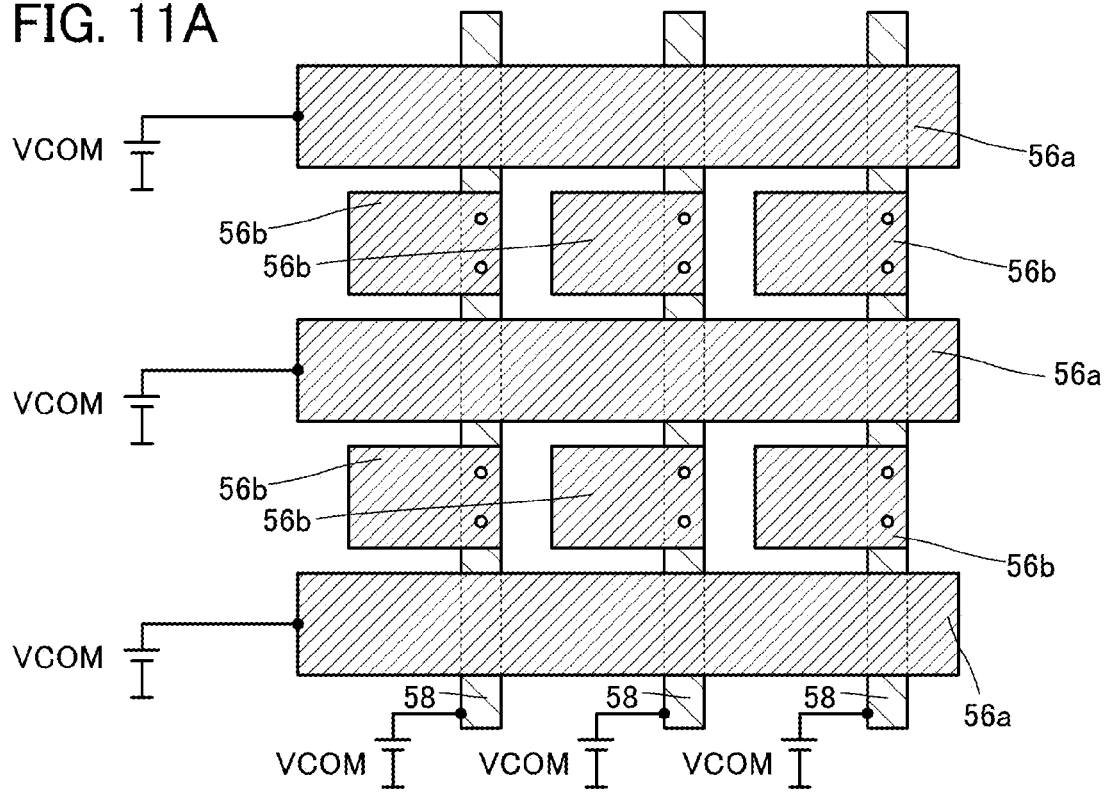
FIGS. 11A and 11B are top views illustrating an example of a sensor element.
Figure 11B:
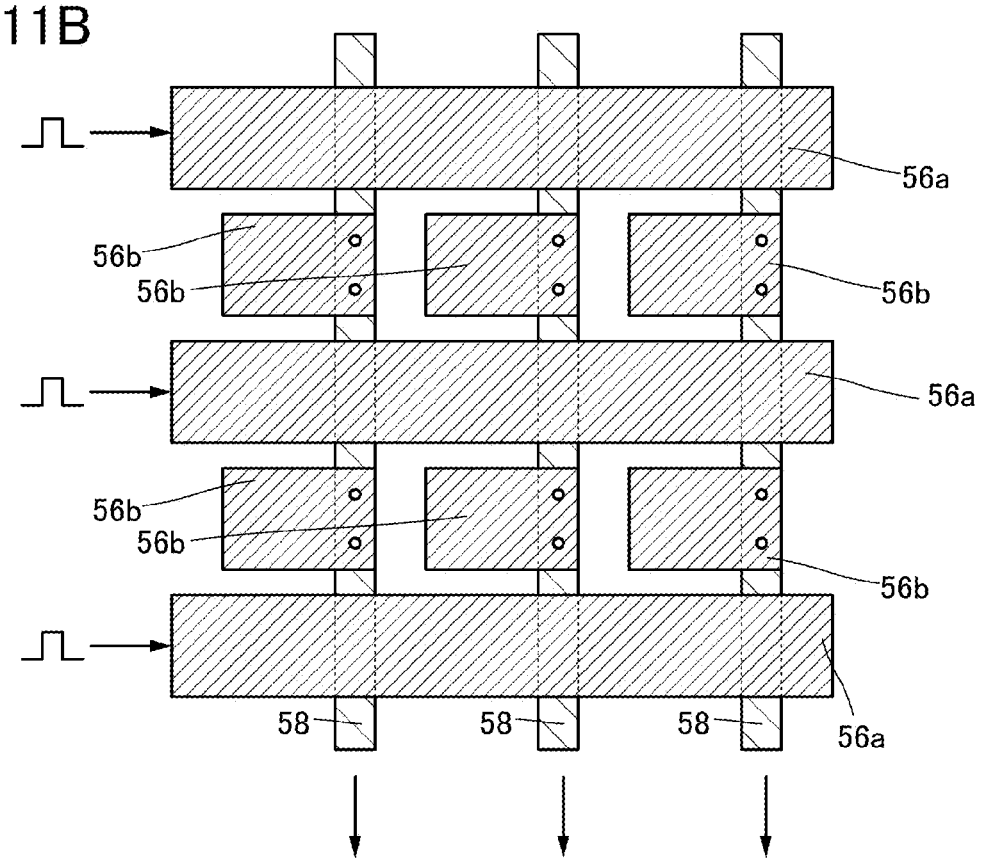

In the writing period, as illustrated in FIG. 11A, a common potential VCOM is input to the conductive films 56a extending in the X direction and the conductive films 58 extending in the Y direction (and the conductive films 56b electrically connected to the conductive film 58). In contrast, in the sensing period, as illustrated in FIG. 11B, each of the conductive films 58 extending in the Y direction (and each of the conductive films 56b electrically connected to the conductive films 58) is electrically connected to a detection circuit. Furthermore, the conductive films 56a extending in the X direction are electrically connected to pulse voltage output circuits and supplied with a pulse voltage.

[Top Structure Example of Pixel]

Next, top structure examples of the pixel of the input/output device of one embodiment of the present invention are described with reference to FIG. 12, FIG. 13, and FIGS. 14A and 14B.

Figure 12:
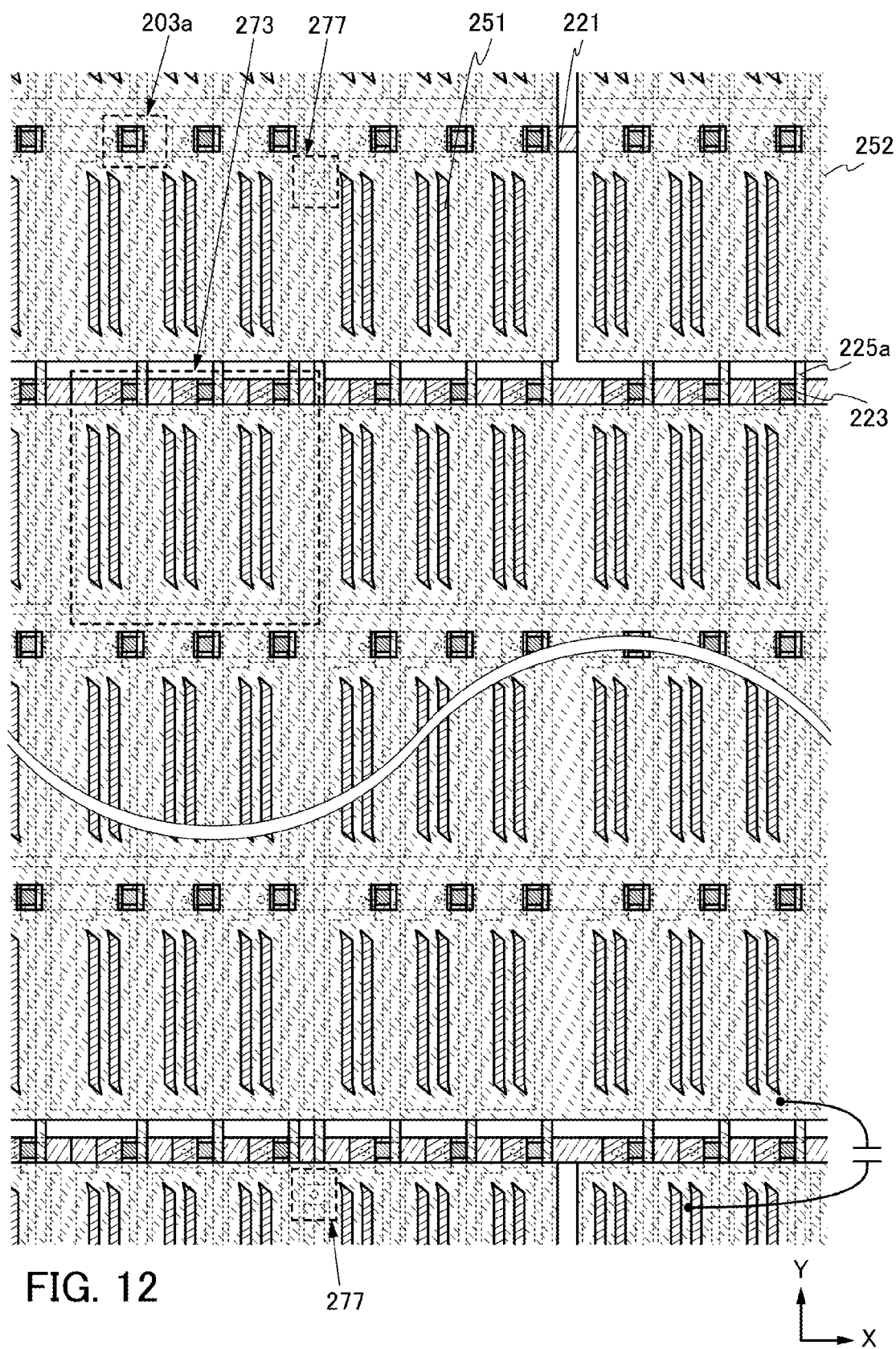
FIG. 12 is a top view illustrating an example of an input/output device.
Figure 13:
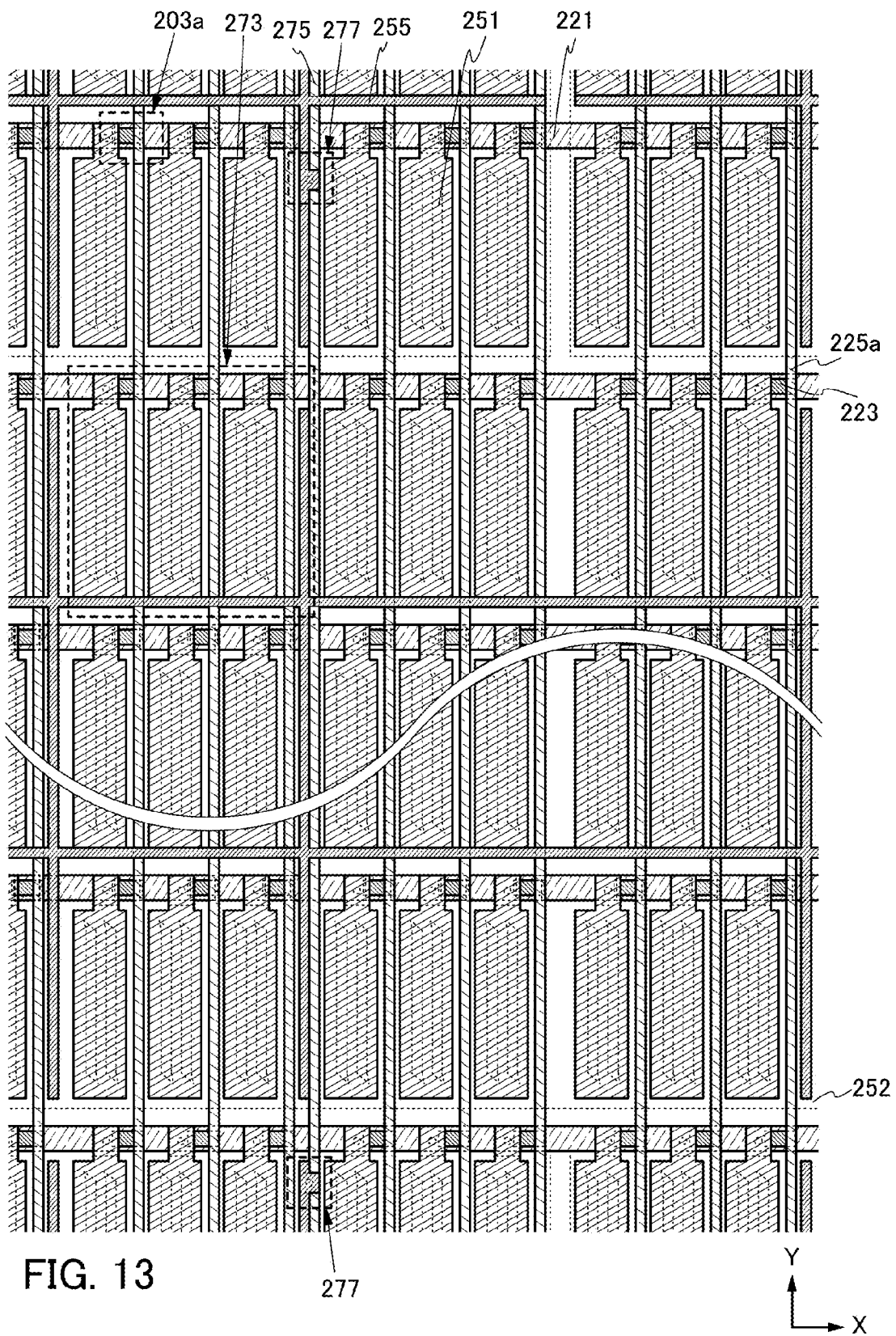
FIG. 13 is a top view illustrating an example of an input/output device.

FIG. 12 is a top view of the pixel. FIG. 13 is a view that differs from FIG. 12 in that the conductive film 252 is indicated by a dotted line. Note that Cross-sectional structure example 1 (FIG. 1A and FIG. 2A) can also be referred to for the stacking order of the layers.

A plurality of the conductive films 251 each have an island-shaped top surface shape and are arranged in a matrix. The conductive film 251 is electrically connected to the source or the drain of the transistor 203a.

The conductive film 252 is provided to overlap with a plurality of the conductive films 251. The conductive film 252 is provided with a slit. Furthermore, the conductive film 252 has an opening in a position overlapping with the transistor 203a.

Here, the conductive film 251 serves as the pixel electrode of the liquid crystal element. The conductive film 252 serves as the common electrode of the liquid crystal element. Note that FIG. 12 and FIG. 13 illustrate examples in which the conductive film 252 on the upper side is a common electrode and the conductive film 251 on the lower side is a pixel electrode; however, a conductive film on the upper side may be a pixel electrode and a conductive film on the lower side may be a common electrode.

The conductive film 252 serves as an electrode of the sensor element.

A conductive film 275 is electrically connected to the conductive film 255 in a region 277 indicated by a dashed line. The conductive film 255 serves as an auxiliary wiring of the conductive film 252 and is electrically connected to the conductive film 252. The conductive film 275 can be formed using the same material and the same step as those of the source and the drain of the transistor 203a.

A plurality of conductive films 252 provided in the Y direction corresponds to the conductive film 56b in FIG. 9A and the like. The conductive film 275 extending in the Y direction corresponds to the conductive film 58 in FIG. 9A and the like. The plurality of conductive films 252 provided in the Y direction are electrically connected to the conductive film 275 via the conductive film 255 extending in the Y direction. At this time, when an oxide conductor film is used as the conductive film 252, it is preferable to connect the conductive film 255 formed using a metal, an alloy, or the like to the conductive film 275 and electrically connect the conductive film 252 to the conductive film 275 via the conductive film 255, in which case the contact resistance can be lower than that in the case where the conductive film 252 is directly in contact with the conductive film 275.

Although FIG. 12 and FIG. 13 illustrate examples in which a pixel 273 includes three subpixels, one embodiment of the present invention is not limited thereto.

Figure 14A:
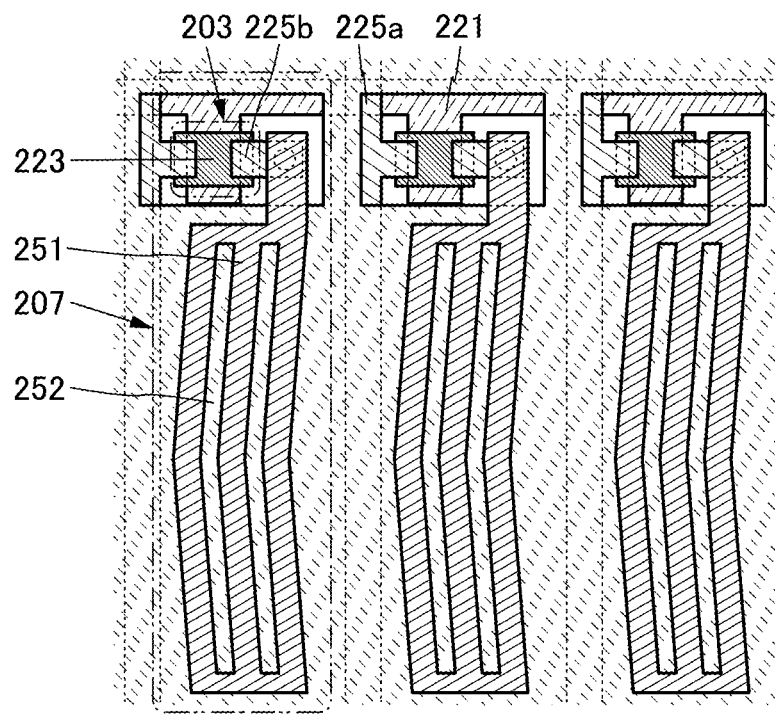
FIGS. 14A and 14B are top views illustrating examples of an input/output device.
Figure 14B:
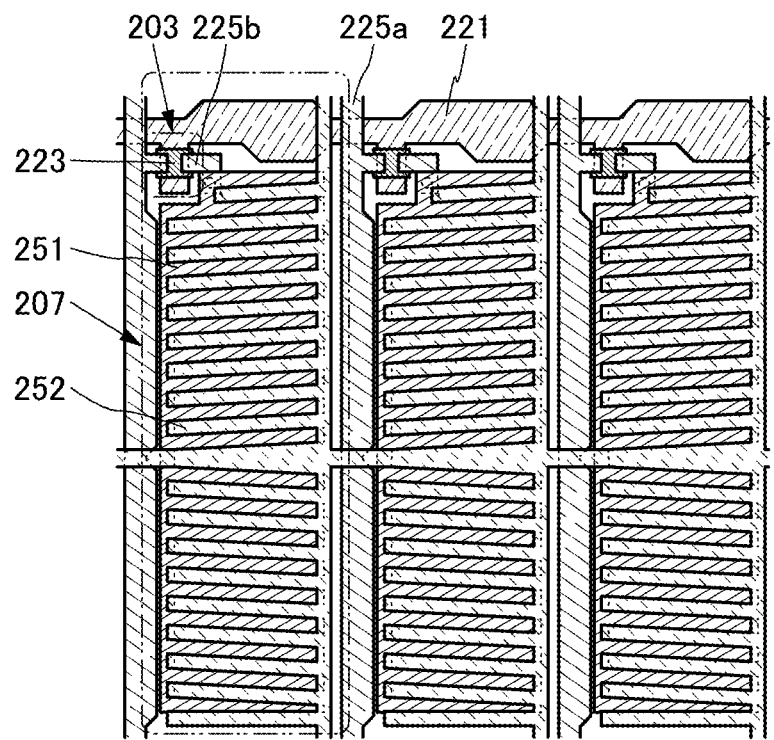

FIGS. 14A and 14B illustrate examples of electrodes of a liquid crystal element.

A pixel electrode and a common electrode included in a liquid crystal element 207 do not necessarily have a flat-plate like shape and may have a variety of opening patterns (also referred to as a slit) or a comb-like shape including a bending portion or a branching portion.

The liquid crystal element 207 in FIGS. 14A and 14B includes the conductive film 251 that can serve as a pixel electrode and the conductive film 252 that can serve as a common electrode.

The transistor 203 in FIGS. 14A and 14B includes the gate electrode 221, the oxide semiconductor film 223, the source electrode 225a, and the drain electrode 225b. The conductive film 251 is electrically connected to the drain electrode 225b.

FIG. 14A illustrates an example in which the conductive film 251 has a slit. FIG. 14B illustrates an example in which the conductive film 251 has a comb-like shape. Note that FIGS. 14A and 14B illustrate examples in which the conductive film 251 is over the conductive film 252; however, the conductive film 252 may be over the conductive film 251.

[Touch Panel Module]

Next, a touch panel module including the input/output device of one embodiment of the present invention and an IC are described with reference to FIG. 15 and FIGS. 16A to 16C.

Figure 15:
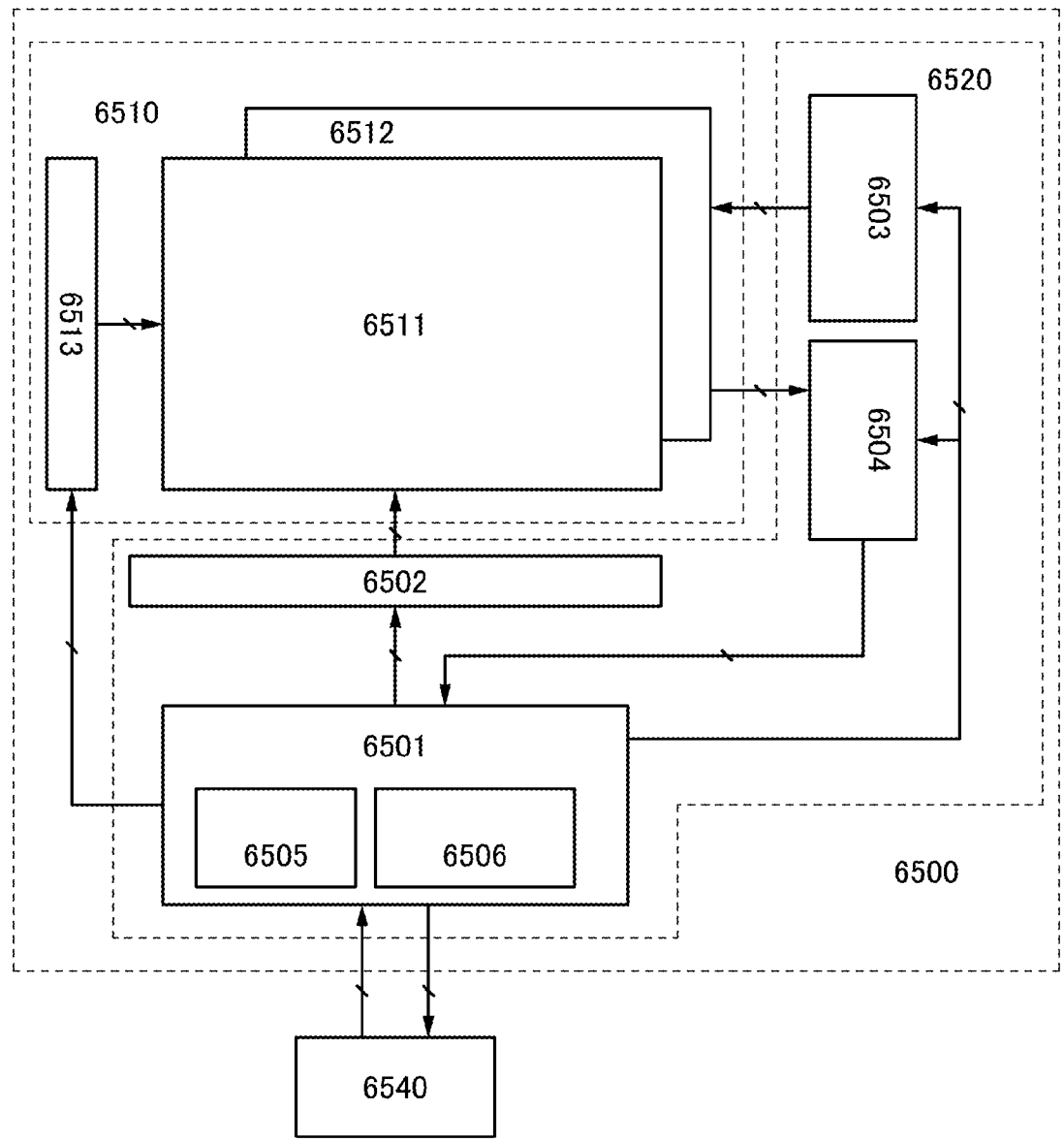
FIG. 15 is a block diagram illustrating an example of a touch panel module.

FIG. 15 shows a block diagram of a touch panel module 6500. The touch panel module 6500 includes a touch panel 6510 and an IC 6520. The input/output device of one embodiment of the present invention can be applied to the touch panel 6510.

The touch panel 6510 includes a display portion 6511, an input portion 6512, and a scan line driver circuit 6513. The display portion 6511 includes a plurality of pixels, a plurality of signal lines, and a plurality of scan lines, and has a function of displaying an image. The input portion 6512 serves as a touch sensor by including a plurality of sensor elements that can sense touch or proximity of a sensing target to the touch panel 6510. A scan line driver circuit 6513 has a function of outputting a scan signal to the scan lines included in the display portion 6511.

Here, the display portion 6511 and the input portion 6512 are separately illustrated as the components of the touch panel 6510 for simplicity; however, what is called an in-cell touch panel having a function of displaying an image and serving as a touch sensor is preferable. The input/output device of one embodiment of the present invention is an in-cell touch panel and is thus favorable.

The resolution of the display portion 6511 is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, resolution of 4K, 8K, or higher is preferable. The pixel density (definition) of the pixels in the display portion 6511 is higher than or equal to 300 ppi, preferably higher than or equal to 500 ppi, more preferably higher than or equal to 800 ppi, more preferably higher than or equal to 1000 ppi, more preferably higher than or equal to 1200 ppi. The display portion 6511 with such high resolution and high definition enables an increase in a realistic sensation, sense of depth, and the like in personal use such as portable use and home use.

The IC 6520 includes a circuit unit 6501, a signal line driver circuit 6502, a sensor driver circuit 6503, and a detection circuit 6504. The circuit unit 6501 includes a timing controller 6505, an image processing circuit 6506, or the like.

The signal line driver circuit 6502 has a function of outputting a video signal that is an analog signal to a signal line included in the display portion 6511. For example, the signal line driver circuit 6502 can include a shift register circuit and a buffer circuit in combination. The touch panel 6510 may include a demultiplexer circuit connected to a signal line.

The sensor driver circuit 6503 has a function of outputting a signal for driving a sensor element included in the input portion 6512. As the sensor driver circuit 6503, a shift register circuit and a buffer circuit can be used in combination, for example.

The detection circuit 6504 has a function of outputting, to the circuit unit 6501, an output signal from the sensor element included in the input portion 6512. The detection circuit 6504 can include an amplifier circuit and an analog-digital converter (ADC), for example. In that case, the detection circuit 6504 converts an analog signal output from the input portion 6512 into a digital signal to be output to the circuit unit 6501.

The image processing circuit 6506 included in the circuit unit 6501 has a function of generating and outputting a signal for driving the display portion 6511 of the touch panel 6510, a function of generating and outputting a signal for driving the input portion 6512, and a function of analyzing a signal output from the input portion 6512 and outputting the signal to a CPU 6540.

As specific examples, the image processing circuit 6506 has the following functions: a function of generating a video signal in accordance with an instruction from the CPU 6540; a function of performing signal processing on a video signal in accordance with the specification of the display portion 6511, converting the signal into an analog video signal, and supplying the converted signal to the signal line driver circuit 6502; a function of generating a driving signal output to the sensor driver circuit 6503 in accordance with an instruction from the CPU 6540; and a function of analyzing a signal input from the detection circuit 6504 and outputting the analyzed signal to the CPU 6540 as positional information.

The timing controller 6505 may have a function of generating a signal (e.g., a clock signal or a start pulse signal) on the basis of a synchronization signal included in a video signal or the like on which the image processing circuit 6506 performs processing and outputting the signal to the scan line driver circuit 6513 and the sensor driver circuit 6503. Furthermore, the timing controller 6505 may have a function of generating and outputting a signal for determining timing when the detection circuit 6504 outputs a signal. Here, the timing controller 6505 preferably outputs a signal synchronized with the signal output to the scan line driver circuit 6513 and a signal synchronized with the signal output to the sensor driver circuit 6503. In particular, it is preferable that a period in which data in a pixel in the display portion 6511 is rewritten and a period in which sensing is performed with the input portion 6512 be separately provided. For example, the touch panel 6510 can be driven by dividing one frame period into a period in which data in a pixel is rewritten and a period in which sensing is performed. Furthermore, detection sensitivity and detection accuracy can be increased, for example, by providing two or more sensing periods in one frame period.

The image processing circuit 6506 can include a processor, for example. A microprocessor such as a digital signal processor (DSP) or a graphics processing unit (GPU) can be used, for example. Furthermore, such a microprocessor may be obtained with a programmable logic device (PLD) such as a field programmable gate array (FPGA) or a field programmable analog array (FPAA). The image processing circuit 6506 interprets and executes instructions from various programs with the processor to process various kinds of data and control programs. The programs executed by the processor may be stored in a memory region included in the processor or a memory device that is additionally provided.

A transistor that includes an oxide semiconductor in a channel formation region and has an extremely low off-state current can be used in the display portion 6511 or the scan line driver circuit 6513 included in the touch panel 6510, the circuit unit 6501, the signal line driver circuit 6502, the sensor driver circuit 6503, or the detection circuit 6504 included in the IC 6520, the CPU 6540 provided outside, or the like. With the use of the transistor having an extremely low off-state current as a switch for holding electric charge (data) that flows into a capacitor serving as a memory element, a long data retention period can be ensured. For example, by utilizing the characteristic for at least one of a register and a cache memory of the image processing circuit 6506, normally off computing is achieved where the image processing circuit 6506 operates only when needed and data on the previous processing is stored in the memory element in the rest of time; thus, power consumption of the touch panel module 6500 and an electronic device on which the touch panel module 6500 is mounted can be reduced.

Although the structure where the circuit unit 6501 includes the timing controller 6505 and the image processing circuit 6506 is used here, the image processing circuit 6506 itself or a circuit having a function of part of the image processing circuit 6506 may be provided outside. Alternatively, the CPU 6540 may have a function of the image processing circuit 6506 or part thereof: For example, the circuit unit 6501 can include the signal line driver circuit 6502, the sensor driver circuit 6503, the detection circuit 6504, and the timing controller 6505.

Although the example where the IC 6520 includes the circuit unit 6501 is shown here, the structure where the circuit unit 6501 is not included in the IC 6520 may be employed. In that case, the IC 6520 can include the signal line driver circuit 6502, the sensor driver circuit 6503, and the detection circuit 6504. For example, in the case where the touch panel module 6500 includes a plurality of ICs, the circuit unit 6501 may be provided outside the touch panel module 6500 and a plurality of ICs 6520 without the circuit unit 6501 may be provided, and alternatively, the IC 6520 and an IC including only the signal line driver circuit 6502 can be provided in combination.

When an IC has a function of driving the display portion 6511 of the touch panel 6510 and a function of driving the input portion 6512 as described above, the number of ICs mounted on the touch panel module 6500 can be reduced; accordingly, cost can be reduced.

Figure 16A:
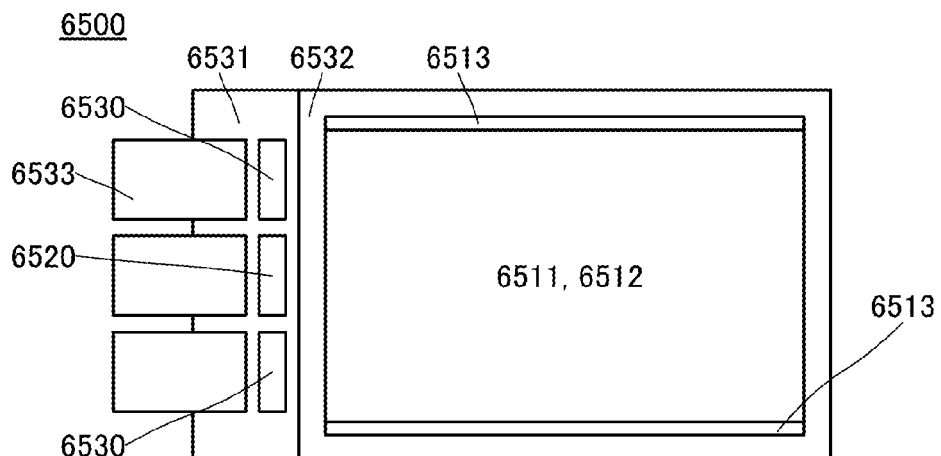
FIGS. 16A to 16C illustrate examples of a touch panel module.
Figure 16B:
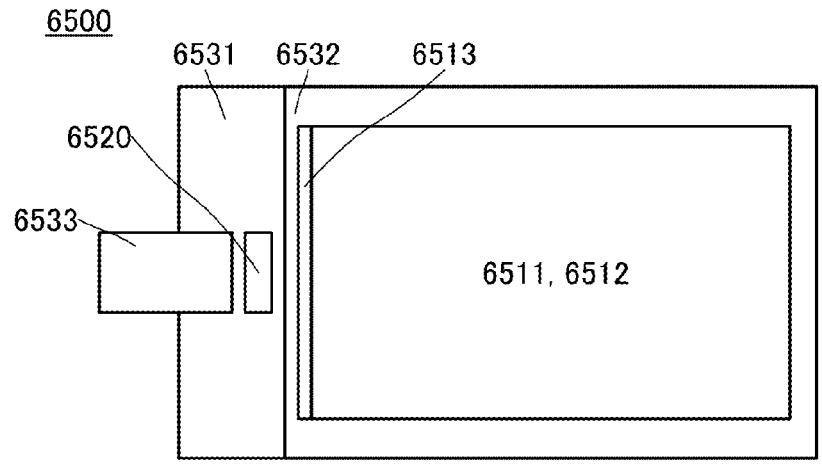
Figure 16C:
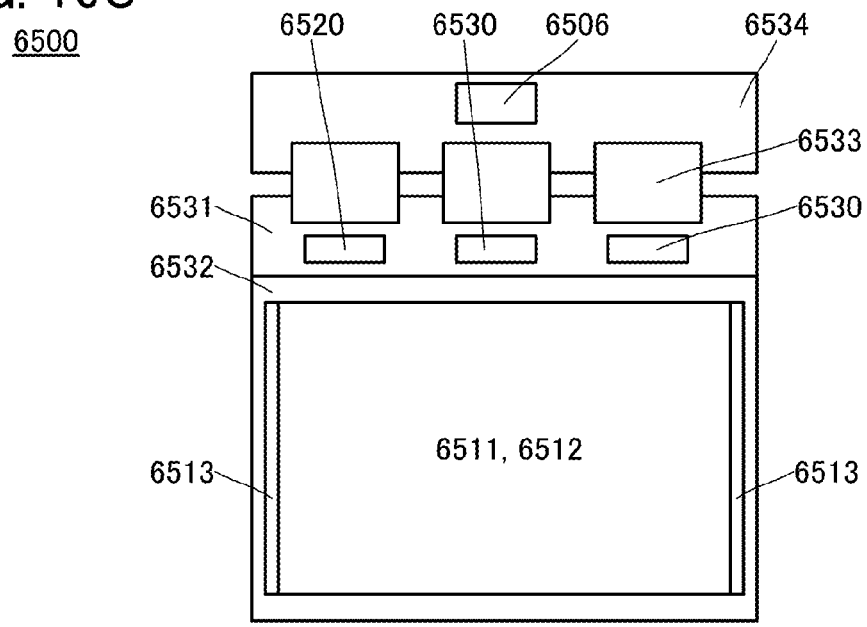

FIGS. 16A to 16C each are a schematic diagram of the touch panel module 6500 on which the IC 6520 is mounted.

In FIG. 16A, the touch panel module 6500 includes a substrate 6531, a counter substrate 6532, a plurality of FPCs 6533, the IC 6520, ICs 6530, and the like. The display portion 6511, the input portion 6512, and the scan line driver circuits 6513 are provided between the substrate 6531 and the counter substrate 6532. The IC 6520 and the ICs 6530 are mounted on the substrate 6531 by a COG method.

The IC 6530 is an IC in which only the signal line driver circuit 6502 is provided in the above-described IC 6520 or an IC in which the signal line driver circuit 6502 and the circuit unit 6501 are provided in the above-described IC 6520. The ICs 6520 and 6530 are supplied with a signal from the outside through the FPCs 6533. Furthermore, a signal can be output to the outside from at least one of the ICs 6520 and 6530 through the FPC 6533.

FIG. 16A illustrates an example where the display portion 6511 is positioned between two scan line driver circuits 6513. The ICs 6530 are provided in addition to the IC 6520. Such a structure is preferable in the case where the display portion 6511 has extremely high resolution.

FIG. 16B illustrates an example where one IC 6520 and one FPC 6533 are provided. It is preferable to bring functions into one IC 6520 in this manner because the number of components can be reduced. In the example in FIG. 16B, the scan line driver circuit 6513 is provided along a side close to the FPC 6533 among two short sides of the display portion 6511.

FIG. 16C illustrates an example where a printed circuit board (PCB) 6534 on which the image processing circuit 6506 and the like are mounted is provided. The ICs 6520 and 6530 over the substrate 6531 are electrically connected to the PCB 6534 through the FPCs 6533. Here, the above-described structure without the image processing circuit 6506 can be applied to the IC 6520.

In each of FIGS. 16A to 16C, the ICs 6520 and 6530 may be mounted on the FPC 6533, not on the substrate 6531. For example, the ICs 6520 and 6530 can be mounted on the FPC 6533 by a COF method, a tape automated bonding (TAB) method, or the like.

A structure where the FPC 6533, the IC 6520 (and the IC 6530), or the like is provided on a short side of the display portion 6511 as illustrated in FIGS. 16A and 16B enables the frame of the display device to be narrowed; thus, the structure is preferably used for electronic devices such as smartphones, mobile phones, and tablet terminals, for example. The structure with the PCB 6534 illustrated in FIG.

16C can be preferably used for television devices, monitors, tablet terminals, or notebook personal computers, for example.

This embodiment can be combined with any of the other embodiments as appropriate.

Embodiment 2

In this embodiment, a manufacturing method of an input/output device of one embodiment of the present invention is described with reference to FIGS. 17A to 17D, FIGS. 18A to 18C, FIGS. 19A to 19C, FIG. 20, and FIG. 21. In this embodiment, a manufacturing method of a transistor is mainly described. Note that the description in Embodiment 1 can be referred to for the material of each layer.

First, the gate electrode 221 is formed over the substrate 211. After that, the insulating film 213 including insulating films 106 and 107 is formed over the substrate 211 and the gate electrode 221 (see FIG. 17A).

In this embodiment, a glass substrate is used as the substrate 211; a tungsten film is used as the gate electrode 221; a silicon nitride film capable of releasing hydrogen is used as the insulating film 106; and a silicon oxide film capable of releasing oxygen is used as the insulating film 107.

The insulating film 106 serves as a blocking film that inhibits penetration of oxygen. For example, in the case where excess oxygen is supplied to at least one of the insulating film 107, the insulating film 215, the insulating film 217, and the oxide semiconductor film 223, the insulating film 106 can inhibit penetration of oxygen.

Note that the insulating film 107 that is in contact with the oxide semiconductor film 223 serving as a channel region of the transistor is preferably an oxide insulating film and preferably includes a region including oxygen in excess of the stoichiometric composition (oxygen-excess region). In other words, the insulating film 107 is an insulating film that is capable of releasing oxygen. In order to provide the oxygen-excess region in the insulating film 107, the insulating film 107 can be formed in an oxygen atmosphere, for example. Alternatively, the oxygen excess region may be formed by introduction of oxygen into the insulating film 107 after the deposition. As a method for introducing oxygen, an ion implantation method, an ion doping method, a plasma immersion ion implantation method, plasma treatment, or the like may be employed.

In the case where hafnium oxide is used for one or both of the insulating films 106 and 107, the following effect is attained. Hafnium oxide has a higher dielectric constant than silicon oxide and silicon oxynitride. Therefore, by using hafnium oxide, the thickness of one or both of the insulating films 106 and 107 can be made large as compared with the case where silicon oxide is used; thus, leakage current due to tunnel current can be low. That is, it is possible to provide a transistor with a low off-state current. Moreover, hafnium oxide with a crystalline structure has higher dielectric constant than hafnium oxide with an amorphous structure. Therefore, it is preferable to use hafnium oxide with a crystalline structure in order to provide a transistor with a low off-state current. Examples of the crystalline structure include a monoclinic crystal structure and a cubic crystal structure. Note that one embodiment of the present invention is not limited to the above examples.

In this embodiment, a silicon nitride film is formed as the insulating film 106, and a silicon oxide film is formed as the insulating film 107. A silicon nitride film has a higher dielectric constant than a silicon oxide film and needs a larger thickness for a capacitance equivalent to that of the silicon oxide film. When a silicon nitride film is included as the insulating film 213 serving as a gate insulating film of the transistor, the physical thickness of the insulating film can be increased. This makes it possible to reduce a decrease in withstand voltage of the transistor and furthermore increase the withstand voltage, thereby reducing electrostatic discharge damage to the transistor.

To form the gate electrode 221, a conductive film is formed over the substrate 211, the conductive film is patterned so that a desired region thereof remains, and unnecessary regions are etched.

Figure 17A:
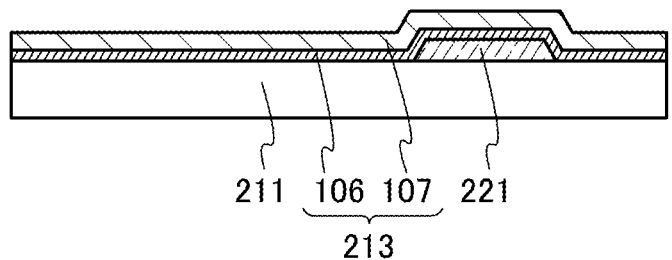
Figure 17B:
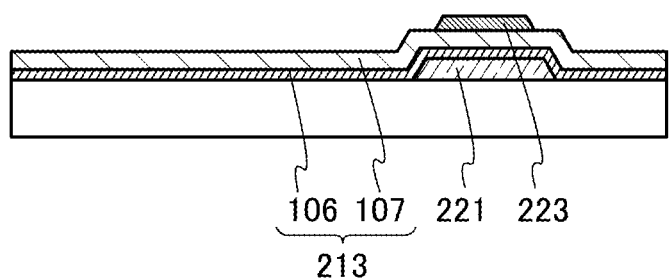

Next, the oxide semiconductor film 223 is formed in a region overlapping with the gate electrode 221 over the insulating film 213 (FIG. 17B).

In this embodiment, as the oxide semiconductor film 223, an In—Ga—Zn oxide film, which is formed using a metal oxide target with In:Ga:Zn=1:1:1.2 [atomic ratio], is used.

The oxide semiconductor film 223 can be formed in such a manner that an oxide semiconductor film is formed over the insulating film 213, the oxide semiconductor film is patterned so that a desired region thereof remains, and then unnecessary regions are etched.

After formation of the oxide semiconductor film 223, heat treatment is preferably performed. The heat treatment is preferably performed at a temperature of higher than or equal to 250° C. and lower than or equal to 650° C., preferably higher than or equal to 300° C. and lower than or equal to 500° C., more preferably higher than or equal to 350° C. and lower than or equal to 450° C., in an inert gas atmosphere, an atmosphere containing an oxidizing gas at 10 ppm or more, or a reduced pressure atmosphere. Alternatively, the heat treatment may be performed first in an inert gas atmosphere, and then another heat treatment is performed in an atmosphere containing an oxidizing gas at 10 ppm or more in order to compensate oxygen released from the oxide semiconductor film 223. By this heat treatment, impurities such as hydrogen and water can be removed from at least one of the insulating film 106, the insulating film 107, and the oxide semiconductor film 223. Note that the above-described heat treatment may be performed before the oxide semiconductor film 223 is processed into an island shape.

Note that stable electrical characteristics can be effectively imparted to the transistor in which the oxide semiconductor film 223 serves as a channel region by reducing the concentration of impurities in the oxide semiconductor film 223 to make the oxide semiconductor film 223 intrinsic or substantially intrinsic.

Figure 17C:
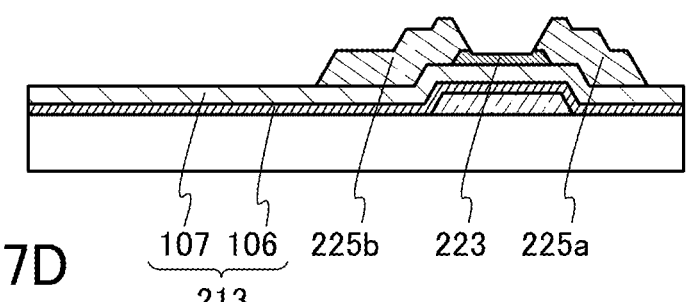
Figure 17D:
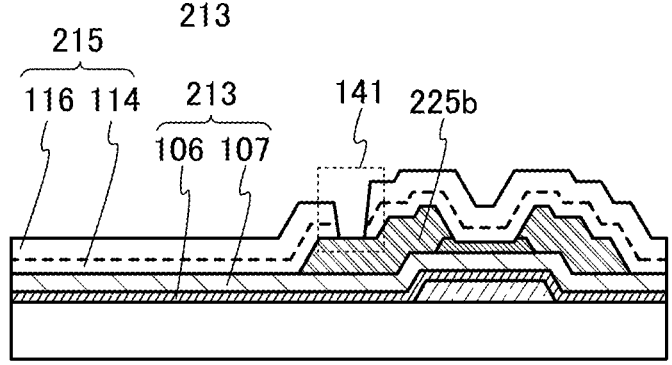

Next, a conductive film is formed over the insulating film 213 and the oxide semiconductor film 223 and is patterned so that a desired region thereof remains and unnecessary regions are etched, whereby the source electrode 225a and the drain electrode 225b are formed over the insulating film 213 and the oxide semiconductor film 223 (see FIG. 17C).

In this embodiment, a three-layered structure including a tungsten film, an aluminum film, and a titanium film can be used for the source electrode 225a and the drain electrode 225b.

After the source electrode 225a and the drain electrode 225b are formed, a surface of the oxide semiconductor film 223 may be cleaned. The cleaning may be performed, for example, using a chemical solution such as phosphoric acid. The cleaning using a chemical solution such as a phosphoric acid can remove impurities (e.g., elements contained in the source electrode 225a and the drain electrode 225b) attached to the surface of the oxide semiconductor film 223. Note that the cleaning is not necessarily performed, and thus the cleaning may be unnecessary.

In addition, in the step of forming the source electrode 225a and the drain electrode 225b and/or the cleaning step, the thickness of a region of the oxide semiconductor film 223 that is not covered by the source electrode 225a and the drain electrode 225b might be reduced.

Next, the insulating film 215 including insulating films 114 and 116 is formed over the insulating film 213, the oxide semiconductor film 223, the source electrode 225a, and the drain electrode 225b. Then, the insulating film 215 is patterned so that a desired region thereof remains and unnecessary regions are etched, whereby an opening 141 is formed (see FIG. 17D).

Note that after the insulating film 114 is formed, the insulating film 116 is preferably formed in succession without exposure to the air. After the insulating film 114 is formed, the insulating film 116 is formed in succession by adjusting at least one of the flow rate of a source gas, pressure, a high-frequency power, and a substrate temperature without exposure to the air, whereby the concentration of impurities attributed to the atmospheric component at the interface between the insulating film 114 and the insulating film 116 can be reduced, and oxygen in the insulating films 114 and 116 can be moved to the oxide semiconductor film 223; accordingly, the number of oxygen vacancies in the oxide semiconductor film 223 can be reduced.

Note that the insulating film 114 serves as a protective film for the oxide semiconductor film 223 in the step of forming the insulating film 116. Consequently, the insulating film 116 can be formed using the high-frequency power having a high power density while damage to the oxide semiconductor film 223 is reduced.

In this embodiment, a silicon oxynitride film capable of releasing oxygen is used as the insulating films 114 and 116.

Note that the insulating film 114 that is in contact with the oxide semiconductor film 223 serving as a channel region of the transistor is preferably an oxide insulating film capable of releasing oxygen. In other words, the insulating film capable of releasing oxygen is an insulating film that includes a region containing oxygen in excess of that in the stoichiometric composition (oxygen-excess region). In order to provide the oxygen-excess region in the insulating film 114, the insulating film 114 can be formed in an oxygen atmosphere, for example. Alternatively, the oxygen-excess region may be formed by supplying oxygen to the formed insulating film 114. As a method for supplying oxygen, an ion implantation method, an ion doping method, a plasma immersion ion implantation method, plasma treatment, or the like can be employed.

The use of the insulating film capable of releasing oxygen as the insulating film 114 can reduce the number of oxygen vacancies in the oxide semiconductor film 223 by transferring oxygen to the oxide semiconductor film 223 serving as the channel region of the transistor. For example, the number of oxygen vacancies in the oxide semiconductor film 223 can be reduced by using an insulating film having the following feature: the number of oxygen molecules released from the insulating film by heat treatment at a temperature higher than or equal to 100° C. and lower than or equal to 700° C., or higher than or equal to 100° C. and lower than or equal to 500° C. is greater than or equal to $1.0 \times 10^{18}$ molecules/cm$^3$ when measured by thermal desorption spectroscopy (TDS) analysis.

It is preferable that the number of defects in the insulating film 114 be small, typically the spin density corresponding to a signal that appears at g=2.001 due to a dangling bond of silicon be lower than or equal to $3 \times 10^{17}$ spins/cm$^3$ by ESR measurement. This is because if the density of defects in the insulating film 114 is high, oxygen is bonded to the defects and the amount of oxygen that permeates the insulating film 114 is decreased. Furthermore, it is preferable that the amount of defects at the interface between the insulating film 114 and the oxide semiconductor film 223 be small and typically, the spin density of a signal that appears at g=1.89 or more and 1.96 or less due to the defect in the oxide semiconductor film 223 be lower than or equal to $1 \times 10^{17}$ spins/cm$^3$, more preferably lower than or equal to the lower limit of detection by ESR measurement.

Note that all oxygen entering the insulating film 114 from the outside moves to the outside of the insulating film 114 in some cases. Alternatively, some oxygen entering the insulating film 114 from the outside remains in the insulating film 114 in some cases. Furthermore, movement of oxygen occurs in the insulating film 114 in some cases in such a manner that oxygen enters the insulating film 114 from the outside and oxygen contained in the insulating film 114 moves to the outside of the insulating film 114. When an oxide insulating film that is permeable to oxygen is formed as the insulating film 114, oxygen released from the insulating film 116 provided over the insulating film 114 can be moved to the oxide semiconductor film 223 through the insulating film 114.

The insulating film 114 can be formed using an oxide insulating film having a low density of states due to nitrogen oxide. Note that the density of states due to nitrogen oxide can be formed between the energy of the valence band maximum ($E_{v\_os}$) and the energy of the conduction band minimum ($E_{c\_os}$) of the oxide semiconductor film. A silicon oxynitride film that releases less nitrogen oxide, an aluminum oxynitride film that releases less nitrogen oxide, or the like can be used as the oxide insulating film.

Note that a silicon oxynitride film that releases a small amount of nitrogen oxide is a film of which the amount of released ammonia is larger than the amount of released nitrogen oxide in TDS analysis; the amount of released ammonia is typically greater than or equal to $1 \times 10^{18}$ molecules/cm$^3$ and less than or equal to $5 \times 10^{19}$ molecules/cm$^3$. The amount of released ammonia corresponds to the released amount caused by heat treatment at a film surface temperature higher than or equal to 50° C. and lower than or equal to 650° C., preferably higher than or equal to 50° C. and lower than or equal to 550° C.

Nitrogen oxide ($NO_x$; x is greater than 0 and less than or equal to 2, preferably greater than or equal to 1 and less than or equal to 2), typically $NO_2$ or NO, forms levels in the insulating film 114, for example. The levels are positioned in the energy gap of the oxide semiconductor film 223. Therefore, when nitrogen oxide is diffused to the interface between the insulating film 114 and the oxide semiconductor film 223, an electron is trapped by the level on the insulating film 114 side. As a result, the trapped electron remains in the vicinity of the interface between the insulating film 114 and the oxide semiconductor film 223; thus, the threshold voltage of the transistor is shifted in the positive direction.

Nitrogen oxide reacts with ammonia and oxygen in heat treatment. Since nitrogen oxide contained in the insulating film 114 reacts with ammonia contained in the insulating film 116 in heat treatment, nitrogen oxide contained in the insulating film 114 is reduced. Therefore, an electron is hardly trapped at the interface between the insulating film 114 and the oxide semiconductor film 223.

In a transistor using the oxide insulating film as the insulating film 114, the shift in threshold voltage can be reduced, which leads to a smaller change in electrical characteristics of the transistor.

Note that in an ESR spectrum obtained at 100 K or lower of the insulating film 114, by heat treatment in a manufacturing process of the transistor, typically heat treatment at a temperature lower than 400° C. or lower than 375° C. (preferably higher than or equal to 340° C. and lower than or equal to 360° C.), a first signal that appears at a g-factor of greater than or equal to 2.037 and less than or equal to 2.039, a second signal that appears at a g-factor of greater than or equal to 2.001 and less than or equal to 2.003, and a third signal that appears at a g-factor of greater than or equal to 1.964 and less than or equal to 1.966 are observed. The split width of the first and second signals and the split width of the second and third signals, which are obtained by ESR measurement using an X-band, are each approximately 5 mT. The sum of the spin densities of the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 is less than $1 \times 10^{18}$ spins/cm$^3$, typically greater than or equal to $1 \times 10^{17}$ spins/cm$^3$ and less than $1 \times 10^{18}$ spins/cm$^3$.

In the ESR spectrum at 100 K or lower, the first signal that appears at a g-factor of greater than or equal to 2.037 and less than or equal to 2.039, the second signal that appears at a g-factor of greater than or equal to 2.001 and less than or equal to 2.003, and the third signal that appears at a g-factor of greater than or equal to 1.964 and less than or equal to 1.966 correspond to signals attributed to nitrogen oxide (NO$_x$; x is greater than 0 and less than or equal to 2, preferably greater than or equal to 1 and less than or equal to 2). Typical examples of nitrogen oxide include nitrogen monoxide and nitrogen dioxide. In other words, the smaller the sum of the spin densities of the first signal that appears at a g-factor greater than or equal to 2.037 and less than or equal to 2.039, the second signal that appears at a g-factor greater than or equal to 2.001 and less than or equal to 2.003, and the third signal that appears at a g-factor greater than or equal to 1.964 and less than or equal to 1.966 is, the lower the content of nitrogen oxide in the oxide insulating film is.

The nitrogen concentration of the oxide insulating film measured by SIMS is lower than or equal to $6 \times 10^{20}$ atoms/cm$^3$.

The oxide insulating film is formed by a PECVD method at a substrate temperature higher than or equal to 220° C. and lower than or equal to 350° C. using silane and dinitrogen monoxide, whereby a dense and hard film can be formed.

The insulating film 116 in contact with the insulating film 114 is formed using an oxide insulating film whose oxygen content is in excess of that in the stoichiometric composition. Part of oxygen is released from the oxide insulating film whose oxygen content is in excess of that in the stoichiometric composition by heating. The oxide insulating film whose oxygen content is in excess of that in the stoichiometric composition is an oxide insulating film of which the amount of released oxygen converted into oxygen atoms is greater than or equal to $1.0 \times 10^1$ atoms/cm$^3$, preferably greater than or equal to $3.0 \times 10^{20}$ atoms/cm$^3$ in TDS analysis. Note that the temperature of the film surface in the TDS analysis is preferably higher than or equal to 100° C. and lower than or equal to 700° C., or higher than or equal to 100° C. and lower than or equal to 500° C.

Furthermore, it is preferable that the amount of defects in the insulating film 116 be small, typically the spin density of a signal that appears at g=2.001 due to a dangling bond of silicon be less than $1.5 \times 10^{18}$ spins/cm$^3$, preferably less than or equal to $1 \times 10^{18}$ spins/cm$^3$ by ESR measurement. Note that the insulating film 116 is provided more apart from the oxide semiconductor film 223 than the insulating film 114 is; thus, the insulating film 116 may have higher defect density than the insulating film 114.

The thickness of the insulating film 114 can be greater than or equal to 5 nm and less than or equal to 150 nm, preferably greater than or equal to 5 nm and less than or equal to 50 nm, more preferably greater than or equal to 10 nm and less than or equal to 30 nm. The thickness of the insulating film 116 can be greater than or equal to 30 nm and less than or equal to 500 nm, preferably greater than or equal to 150 nm and less than or equal to 400 nm.

The insulating films 114 and 116 can be formed using insulating films formed of the same kinds of materials; thus, a boundary between the insulating films 114 and 116 cannot be clearly observed in some cases. Thus, in this embodiment, the boundary between the insulating films 114 and 116 is shown by a dashed line. Although a two-layer structure of the insulating films 114 and 116 is described in this embodiment, the present invention is not limited to this. For example, a single-layer structure of the insulating film 114, a single-layer structure of the insulating film 116, or a stacked-layer structure of three or more layers may be used.

Heat treatment (hereinafter referred to as first heat treatment) is preferably performed after the insulating films 114 and 116 are formed. The first heat treatment can reduce nitrogen oxide included in the insulating films 114 and 116. By the first heat treatment, part of oxygen included in the insulating films 114 and 116 can be moved to the oxide semiconductor film 223, so that the number of oxygen vacancies included in the oxide semiconductor film 223 can be reduced.

The temperature of the first heat treatment is typically lower than 400° C., preferably lower than 375° C., further preferably higher than or equal to 150° C. and lower than or equal to 350° C. The first heat treatment may be performed under an atmosphere of nitrogen, oxygen, ultra-dry air (air with a water content of 20 ppm or less, preferably 1 ppm or less, more preferably 10 ppb or less), or a rare gas (argon, helium, or the like). The atmosphere of nitrogen, oxygen, ultra-dry air, or a rare gas preferably does not contain hydrogen, water, and the like. An electric furnace, a rapid thermal annealing (RTA) apparatus, or the like can be used for the heat treatment.

The opening 141 is formed to expose part of the drain electrode 225b. The opening 141 can be formed by a dry etching method, for example. Alternatively, a wet etching method or a combination of dry etching and wet etching can be employed for formation of the opening 141. Note that the etching step of forming the opening 141 can reduce the thickness of the drain electrode 225b in some cases.

Figure 18A:
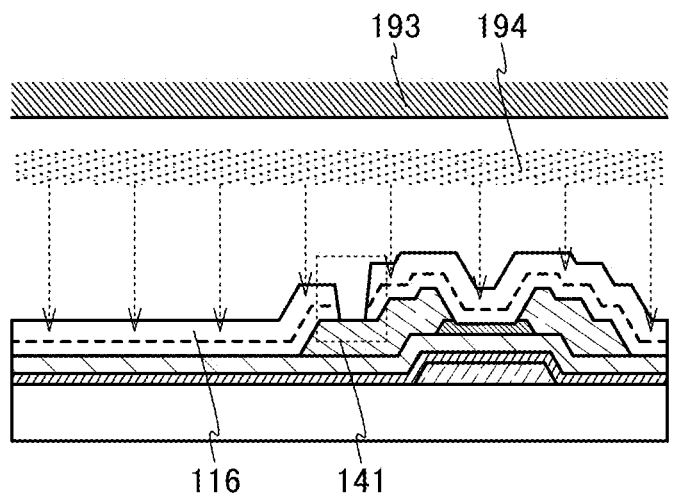
Figure 18B:
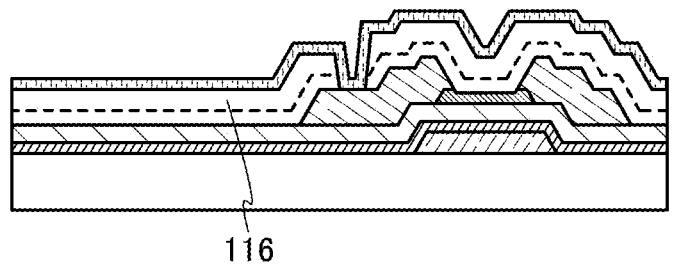

Next, an oxide semiconductor film to be the oxide conductor film 227 is formed over the insulating film 116 to cover the opening 141 (FIGS. 18A and 18B).

Note that FIG. 18A is a schematic cross-sectional view of the inside of a deposition apparatus when the oxide semiconductor film is formed over the insulating film 116. In FIG. 18A, a sputtering apparatus is used as the deposition apparatus, and a target 193 placed inside the sputtering apparatus and plasma 194 formed under the target 193 are schematically shown.

When the oxide semiconductor film is formed, plasma discharge is performed in an atmosphere containing a third oxygen gas. At this time, oxygen is added to the insulating film 116 over which the oxide semiconductor film is to be formed. When the oxide semiconductor film is formed, an inert gas (e.g., a helium gas, an argon gas, or a xenon gas) and the third oxygen gas may be mixed. For example, it is preferable to use the argon gas and the third oxygen gas with the flow rate of the third oxygen gas higher than the flow rate of the argon gas. When the flow rate of the third oxygen gas is set higher, oxygen can be favorably added to the insulating film 116. As an example of the formation conditions of the oxide semiconductor film, the proportion of the third oxygen gas in a whole deposition gas can be higher than or equal to 50% and lower than or equal to 100%, preferably higher than or equal to 80% and lower than or equal to 100%.

In FIG. 18A, oxygen or excess oxygen added to the insulating film 116 is schematically shown by arrows of broken lines.

The oxide semiconductor film is formed at a substrate temperature higher than or equal to room temperature and lower than 340° C., preferably higher than or equal to room temperature and lower than or equal to 300° C., further preferably higher than or equal to 100° C. and lower than or equal to 250° C., still further preferably higher than or equal to 100° C. and lower than or equal to 200° C. The oxide semiconductor film is formed while being heated, so that the crystallinity of the oxide semiconductor film can be increased. On the other hand, in the case where a large-sized glass substrate (e.g., the 6th generation to the 10th generation) is used as the substrate 211 and the oxide semiconductor film is formed at a substrate temperature higher than or equal to 150° C. and lower than 340° C., the substrate 211 might be changed in shape (distorted or warped). In the case where a large-sized glass substrate is used, the change in the shape of the glass substrate can be suppressed by forming the oxide semiconductor film at a substrate temperature higher than or equal to 100° C. and lower than 150° C.

In this embodiment, the oxide semiconductor film is formed by a sputtering method using an In—Ga—Zn metal oxide target (with In:Ga:Zn=1:3:6 [atomic ratio]).

Figure 18C:
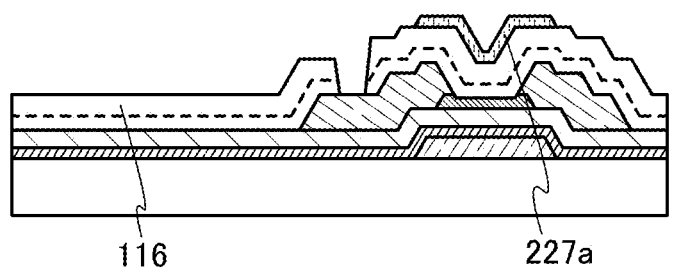

Next, the oxide semiconductor film is processed into a desired shape to form an island-shaped oxide semiconductor film 227a (see FIG. 18C).

The oxide semiconductor film 227a can be formed in such a manner that an oxide semiconductor film is formed over the insulating film 116, the oxide semiconductor film is patterned so that a desired region thereof remains, and then unnecessary regions are etched.

Figure 19A:
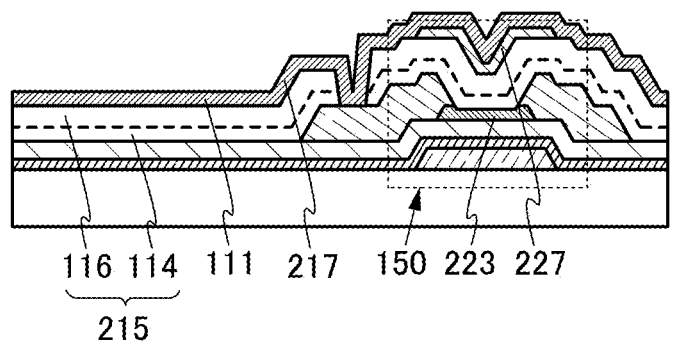

Next, the insulating film 217 is formed over the insulating film 116 and the oxide semiconductor film 227a (see FIG. 19A).

The insulating film 217 has a function of blocking oxygen, hydrogen, water, alkali metal, alkaline earth metal, or the like. With the insulating film 217, diffusion of oxygen from the oxide semiconductor film 223 to the outside, diffusion of oxygen contained in the insulating film 215 to the outside, and entry of hydrogen, water, alkali metal, alkaline earth metal, or the like from the outside into the oxide semiconductor film 223 can be prevented.

The insulating film 217 preferably contains one or both of hydrogen and nitrogen. As the insulating film 217, a silicon nitride film is preferably used, for example. The insulating film 217 can be formed by a sputtering method or a PECVD method, for example. In the case where the insulating film 217 is formed by a PECVD method, for example, the substrate temperature is lower than 400° C., preferably lower than 375° C., further preferably higher than or equal to 180° C. and lower than or equal to 350° C. The substrate temperature at which the insulating film 217 is formed is preferably within the above range because a dense film can be formed. Furthermore, when the substrate temperature at which the insulating film 217 is formed is within the above range, oxygen or excess oxygen in the insulating films 114 and 116 can be moved to the oxide semiconductor film 223.

Note that instead of the nitride insulating film having a blocking effect against oxygen, hydrogen, water, alkali metal, alkaline earth metal, and the like, an oxide insulating film having a blocking effect against oxygen, hydrogen, water, and the like, may be provided. As the oxide insulating film having a blocking effect against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, and a hafnium oxynitride film can be given.

After the insulating film 217 is formed, heat treatment similar to the first heat treatment (hereinafter referred to as second heat treatment) may be performed. Through such heat treatment at lower than 400° C., preferably lower than 375° C., further preferably higher than or equal to 180° C. and lower than or equal to 350° C. after the addition of oxygen to the insulating film 116 when the oxide semiconductor film to be the oxide conductor film 227 is formed, oxygen or excess oxygen in the insulating film 116 can be moved into the oxide semiconductor film 223 and compensate oxygen vacancies in the oxide semiconductor film 223.

Figure 20:
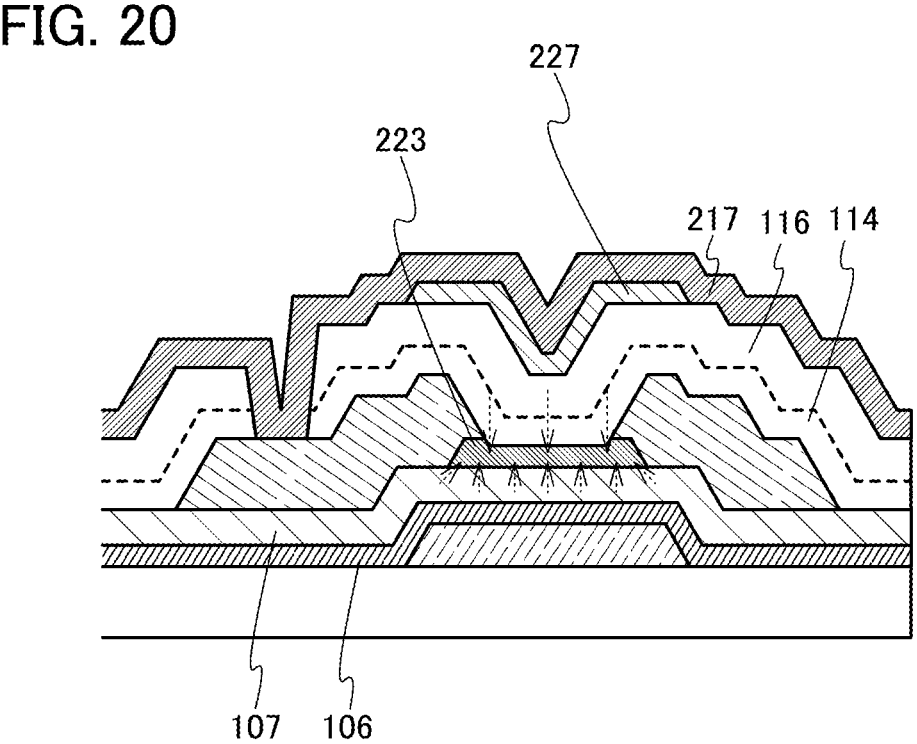

Oxygen moved to the oxide semiconductor film 223 is described with reference to FIG. 20. FIG. 20 are model diagrams illustrating oxygen moved to the oxide semiconductor film 223 due to the substrate temperature at the time of forming the insulating film 217 (typically, lower than 375° C.) or the second heat treatment after the formation of the insulating film 217 (typically, lower than 375° C.). In FIG. 20, oxygen (oxygen radicals, oxygen atoms, or oxygen molecules) moved to the oxide semiconductor film 223 is shown by arrows of broken lines. Note that FIG. 20 is a cross-sectional view of the transistor after the insulating film 217 is formed and its periphery.

In the oxide semiconductor film 223 in FIG. 20, oxygen vacancies are compensated with oxygen moved from films in contact with the oxide semiconductor film 223 (here, the insulating film 107 and the insulating film 114). Specifically, in the input/output device of one embodiment of the present invention, the insulating film 107 includes an excess oxygen region because an oxygen gas is used at the time of forming the oxide semiconductor film to be the oxide semiconductor film 223 by sputtering and oxygen is added to the insulating film 107. Furthermore, the insulating film 116 includes an excess oxygen region because an oxygen gas is used at the time of forming the oxide semiconductor film to be the oxide conductor film 227 by sputtering and oxygen is added to the insulating film 116. In the oxide semiconductor film 223 between the insulating films including the excess oxygen regions, oxygen vacancies can be favorably compensated.

Furthermore, the insulating film 106 is provided under the insulating film 107, and the insulating film 217 is provided over the insulating films 114 and 116. When the insulating films 106 and 217 are formed using a material having low oxygen permeability, e.g., silicon nitride, oxygen contained in the insulating films 107, 114, and 116 can be confined to the oxide semiconductor film 223 side; thus, oxygen can be favorably moved to the oxide semiconductor film 223.

The insulating film 217 preferably has a function of lowering the resistivity of the oxide conductor film 227.

With the insulating film 217 containing one or both of hydrogen and nitrogen, one or both of hydrogen and nitrogen is added to the oxide semiconductor film 227a in contact with the insulating film 217. Accordingly, the carrier density of the oxide semiconductor film 227a is increased, and the oxide semiconductor film 227a can serve as an oxide conductor film.

Note that the oxide semiconductor film 227a with decreased resistivity is illustrated as the oxide conductor film 227 after FIG. 19A.

The resistivity of the oxide conductor film 227 is lower than at least the resistivity of the oxide semiconductor film 223 and is preferably higher than or equal to $1\times10^{-3}$ Ωcm and lower than $1\times10^4$ Ωcm, further preferably higher than or equal to $1\times10^{-3}$ Ωcm and lower than $1\times10^{-1}$ Ωcm.

Figure 19B:
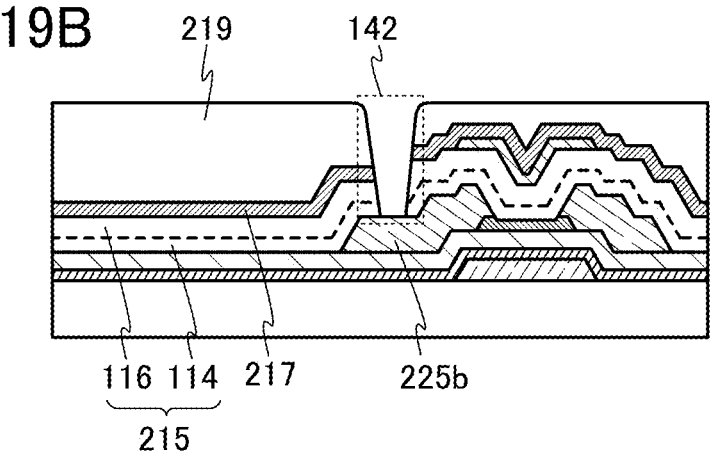

Then, an opening 142 is formed as follows: the insulating film 219 is formed over the insulating film 217, the insulating films 217 and 219 are patterned so that a desired region thereof remains, and unnecessary regions are etched (see FIG. 19B).

In this embodiment, an acrylic resin is used for the insulating film 219.

The opening 142 is formed to expose the drain electrode 225b. The opening 142 can be formed by a dry etching method, for example. Alternatively, a wet etching method or a combination of dry etching and wet etching can be employed for formation of the opening 142. Note that the etching step of forming the opening 142 can reduce the thickness of the drain electrode 225b in some cases.

Note that the opening may be formed in the insulating films 114, 116, 217, and 219 at one time in the step of forming the opening 142 without performing the step of forming the opening 141. In this case, the number of steps of manufacturing the input/output device of one embodiment of the present invention is reduced, resulting in a reduction of the manufacturing cost.

Then, a conductive film is formed over the insulating film 219 to cover the opening 142 and is patterned so that a desired region thereof remains, and unnecessary regions are etched; thus, the conductive film 251 is formed. The insulating film 253 is formed over the conductive film 251. Then, a conductive film is formed over the insulating film 253 and is patterned so that a desired region of the conductive film remains, and an unnecessary region is etched; thus, the conductive film 255 is formed. After that, a conductive film is formed over the insulating film 253 and the conductive film 255 and is patterned so that a desired region of the conductive film remains, and then, an unnecessary region is etched to form the conductive film 252 (see FIG. 19C).

In this embodiment, ITO films are used as the conductive films 251 and 252, a silicon nitride film is used as the insulating film 253, an alloy film of silver, palladium, and copper (also referred to as Ag—Pd—Cu or APC) is used as the conductive film 255.

The formation order of the conductive films 252 and 255 is not limited; however, the conductive film 255 is preferably formed before the conductive film 252. In such a case, damage to the conductive film 252 caused by etching of the conductive film 255 can be reduced, for example.

Note that the conductive film 251 may be formed using an oxide semiconductor film by a method similar to that of the oxide conductor film 227. In this case, the insulating film 253 over the conductive film 251 can be formed using a material that can be used for the insulating film 217. The conductive film 252 may be formed by forming an oxide semiconductor film and performing treatment for lowering the resistivity of the oxide semiconductor film.

Through the above steps, the transistor 203b and the pair of electrodes of the liquid crystal element illustrated in FIG. 4 can be formed.

Figure 19C:
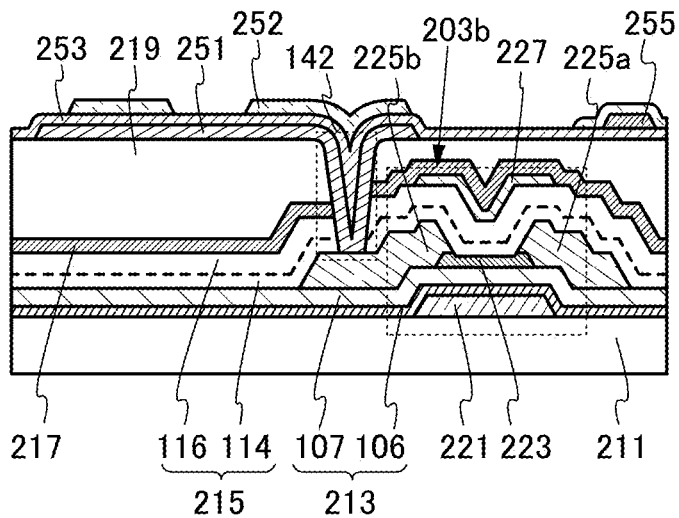
Figure 21:
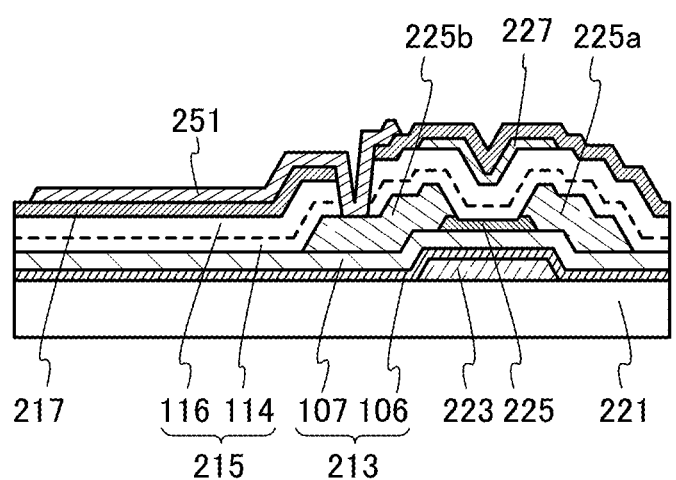
FIG. 21 is a cross-sectional view illustrating an example of a transistor.

Note that although the structure with the insulating film 219 is shown in FIG. 19C, a structure without the insulating film 219 may be employed (see FIG. 21).

This embodiment can be combined with any of the other embodiments as appropriate.

Embodiment 3

In this embodiment, a transistor that can be used for the input/output device of one embodiment of the present invention is described with reference to FIGS. 22A to 22C, FIGS. 23A to 23D, FIGS. 24A and 24B, and FIGS. 25A to 25D. Note that the description in Embodiment 1 can be referred to for the material of each layer.

<Structure Example 1 of Transistor>

Figure 22A:
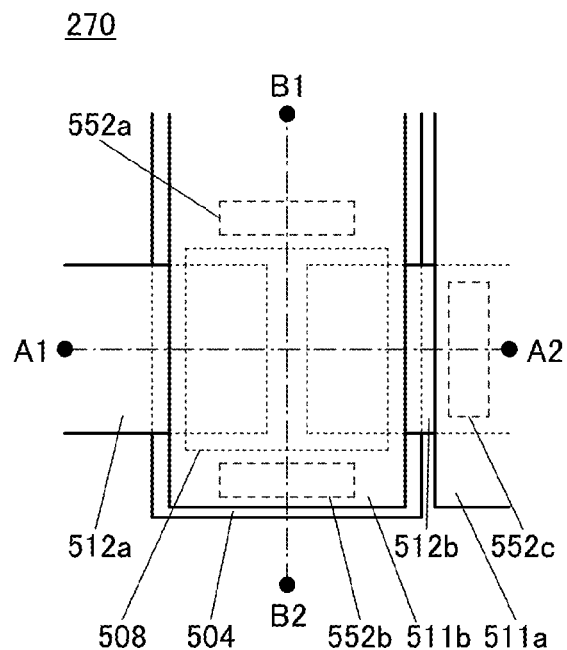
FIGS. 22A to 22C are a top view and cross-sectional views illustrating an example of a transistor.
Figure 22B:
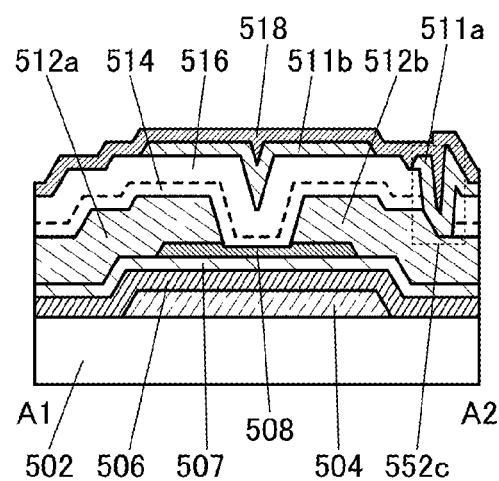
Figure 22C:
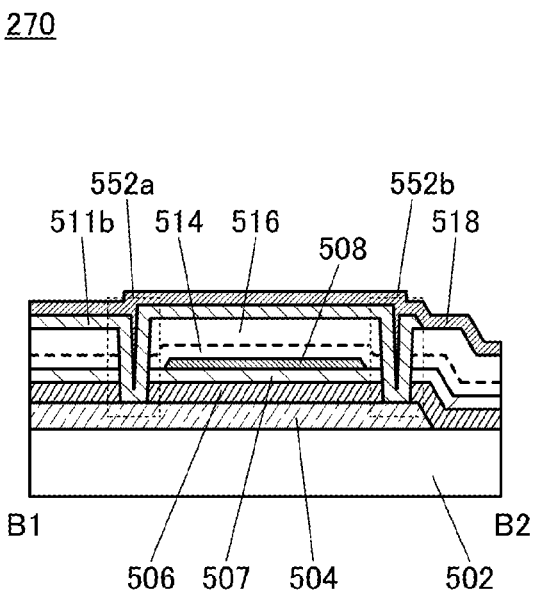

FIG. 22A is a top view of a transistor 270. FIG. 22B is a cross-sectional view taken along the dashed-dotted line A1-A2 in FIG. 22A, and FIG. 22C is a cross-sectional view taken along the dashed-dotted line B1-B2 in FIG. 22A. Note that the direction of the dashed dotted line A1-A2 may be called the channel length direction, and the direction of the dashed dotted line B1-B2 may be called the channel width direction.

The transistor 270 includes a conductive film 504 serving as a first gate electrode over a substrate 502, an insulating film 506 over the substrate 502 and the conductive film 504, an insulating film 507 over the insulating film 506, an oxide semiconductor film 508 over the insulating film 507, a conductive film 512a serving as a source electrode electrically connected to the oxide semiconductor film 508, a conductive film 512b serving as a drain electrode electrically connected to the oxide semiconductor film 508, insulating films 514 and 516 over the oxide semiconductor film 508 and the conductive films 512a and 512b, and an oxide conductor film 511b over the insulating film 516. In addition, an insulating film 518 is provided over the oxide conductor film 511b.

In the transistor 270, the insulating films 514 and 516 serve as a second gate insulating film of the transistor 270. An oxide semiconductor film 511a is connected to the conductive film 512b through an opening 552c provided in the insulating films 514 and 516. The oxide semiconductor film 511a serves as, for example, a pixel electrode of a display element. The oxide conductor film 511b in the transistor 270 serves as a second gate electrode (also referred to as a back gate electrode).

As illustrated in FIG. 22C, the oxide conductor film 511b is connected to the conductive film 504 serving as a first gate electrode through openings 552a and 552b provided in the insulating films 506, 507, 514, and 516. Accordingly, the oxide conductor film 504 and the oxide conductor film 511b are supplied with the same potential.

Note that although the structure in which the openings 552a and 552b are provided so that the oxide conductor film 511b and the conductive film 504 are connected to each other is described in this embodiment, one embodiment of the present invention is not limited thereto. For example, a structure in which only one of the openings 552a and 552b is provided so that the oxide conductor film 511b and the conductive film 504 are connected to each other, or a structure in which the openings 552a and 552b are not provided and the oxide conductor film 511b and the conductive film 504 are not connected to each other may be employed. Note that in the case where the oxide conductor film 511b and the conductive film 504 are not connected to each other, it is possible to apply different potentials to the oxide conductor film 511b and the conductive film 504.

As illustrated in FIG. 22B, the oxide semiconductor film 508 is positioned to face each of the conductive film 504 serving as a first gate electrode and the oxide conductor film 511*b* serving as a second gate electrode, and is sandwiched between the two conductive films serving as gate electrodes. The length in the channel length direction and the length in the channel width direction of the oxide conductor film 511*b* serving as a second gate electrode are longer than that in the channel length direction and that in the channel width direction of the oxide semiconductor film 508, respectively. The whole oxide semiconductor film 508 is covered with the oxide conductor film 511*b* with the insulating films 514 and 516 positioned therebetween. Since the oxide conductor film 511*b* serving as a second gate electrode is connected to the conductive film 504 serving as a first gate electrode through the openings 552*a* and 552*b* provided in the insulating films 506 and 507 and the insulating films 514 and 516, a side surface of the oxide semiconductor film 508 in the channel width direction faces the oxide conductor film 511*b* serving as a second gate electrode with the insulating films 514 and 516 positioned therebetween.

In other words, in the channel width direction of the transistor 270, the conductive film 504 serving as a first gate electrode and the oxide conductor film 511*b* serving as a second gate electrode are connected to each other through the openings provided in the insulating films 506 and 507 serving as gate insulating films and the insulating films 514 and 516 serving as second gate insulating films; and the conductive film 504 and the oxide conductor film 511*b* surround the oxide semiconductor film 508 with the insulating films 506 and 507 serving as the gate insulating films and the insulating films 514 and 516 serving as the second gate insulating films positioned therebetween.

Such a structure enables the oxide semiconductor film 508 included in the transistor 270 to be electrically surrounded by electric fields of the conductive film 504 serving as a first gate electrode and the oxide conductor film 511*b* serving as a second gate electrode. A device structure of a transistor, like that of the transistor 270, in which electric fields of a first gate electrode and a second gate electrode electrically surround an oxide semiconductor film where a channel region is formed, can be referred to as a surrounded channel (s-channel) structure.

Since the transistor 270 has the s-channel structure, an electric field for inducing a channel can be effectively applied to the oxide semiconductor film 508 by the conductive film 504 serving as a first gate electrode; therefore, the current drive capability of the transistor 270 can be improved and high on-state current characteristics can be obtained. Since the on-state current can be increased, it is possible to reduce the size of the transistor 270. In addition, since the transistor 270 is surrounded by the conductive film 504 serving as a first gate electrode and the oxide conductor film 511*b* serving as a second gate electrode, the mechanical strength of the transistor 270 can be increased.

<Structure Example 2 of Transistor>

Figure 23A:
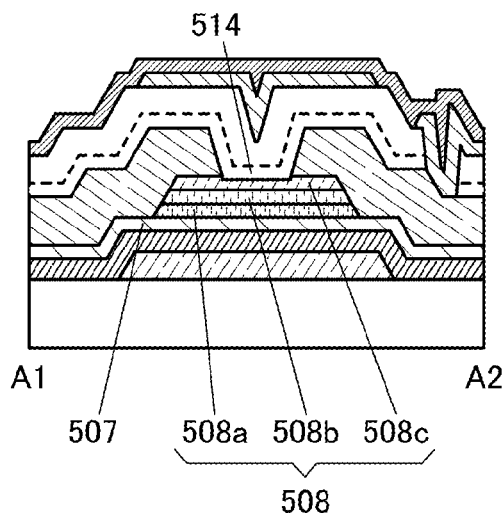
FIGS. 23A to 23D are cross-sectional views illustrating examples of a transistor.
Figure 23B:
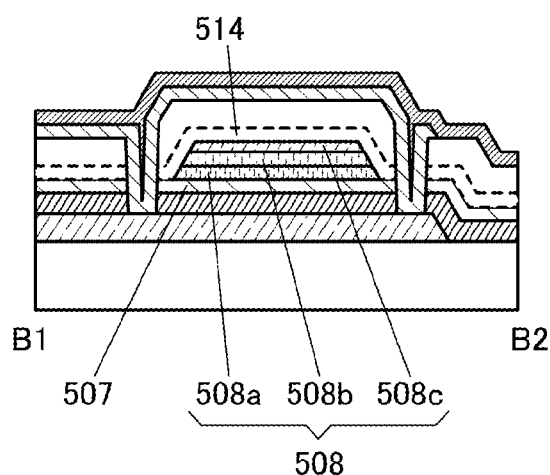
Figure 23C:
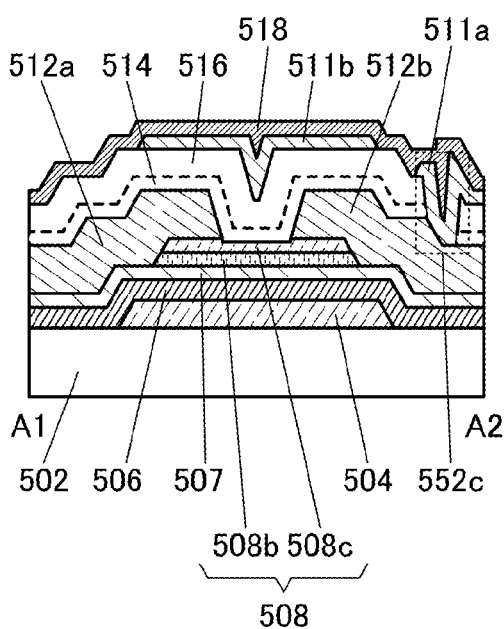
Figure 23D:
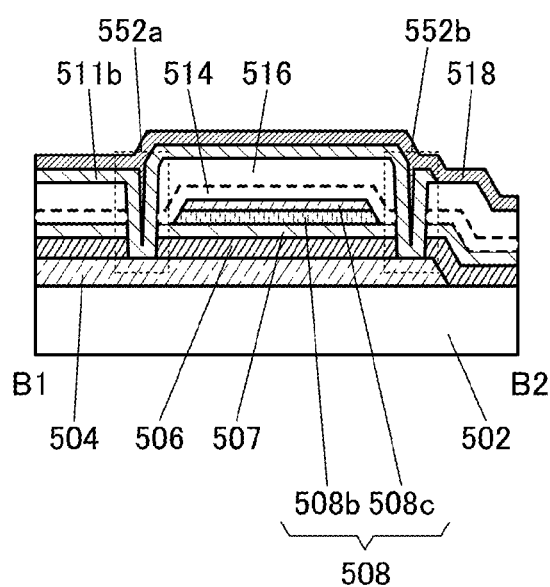

FIGS. 23A and 23B illustrate a cross-sectional view illustrating a modification example of the transistor 270 in FIGS. 22B and 22C. FIGS. 23C and 23D illustrate a cross-sectional view illustrating another modification example of the transistor 270 in FIGS. 22B and 22C.

A transistor 270A in FIGS. 23A and 23B is different from the transistor 270 in FIGS. 22B and 22C in that the oxide semiconductor film 508 has a three-layer structure. Specifically, the oxide semiconductor film 508 of the transistor 270A includes an oxide semiconductor film 508*a*, an oxide semiconductor film 508*b*, and an oxide semiconductor film 508*c*.

A transistor 270B in FIGS. 23C and 23D is different from the transistor 270 in FIGS. 22B and 22C in that the oxide semiconductor film 508 has a two-layer structure. Specifically, the oxide semiconductor film 508 of the transistor 270B includes the oxide semiconductor films 508*b* and 508*c*.

Here, a band structure including the oxide semiconductor film 508 and insulating films in contact with the oxide semiconductor film 508 is described with reference to FIGS. 24A and 24B.

Figure 24A:
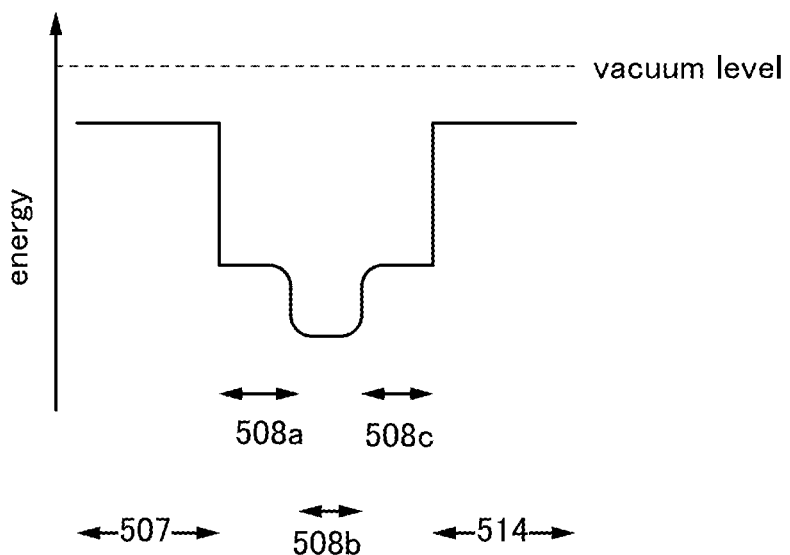
FIGS. 24A and 24B show band structures.

FIG. 24A shows an example of a band structure in the thickness direction of a layered structure including the insulating film 507, the oxide semiconductor films 508*a*, 508*b*, and 508*c*, and the insulating film 514. FIG. 24B shows an example of a band structure in the thickness direction of a layered structure including the insulating film 507, the oxide semiconductor films 508*b* and 508*c*, and the insulating film 514. For easy understanding, the energy level of the conduction band minimum (Ec) of each of the insulating film 507, the oxide semiconductor films 508*a*, 508*b*, and 508*c*, and the insulating film 514 is shown in the band structures.

In the band structure of FIG. 24A, a silicon oxide film is used as each of the insulating film 507 and the insulating film 514, an oxide semiconductor film formed using a metal oxide target having an atomic ratio of metal elements, In:Ga:Zn=1:1:1.2, is used as the oxide semiconductor film 508*a*, an oxide semiconductor film formed using a metal oxide target having an atomic ratio of metal elements, In:Ga:Zn=4:2:4.1, is used as the oxide semiconductor film 508*b*, and an oxide semiconductor film formed using a metal oxide target having an atomic ratio of metal elements, In:Ga:Zn=1:1:1.2, is used as the oxide semiconductor film 508*c*.

Figure 24B:
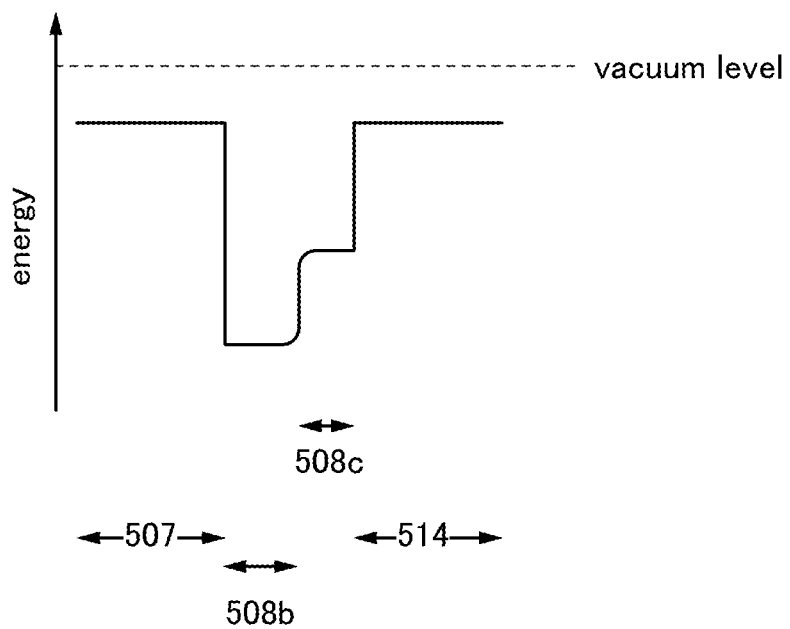

In the band structure of FIG. 24B, a silicon oxide film is used as each of the insulating film 507 and the insulating film 514, an oxide semiconductor film formed using a metal oxide target having an atomic ratio of metal elements, In:Ga:Zn=4:2:4.1, is used as the oxide semiconductor film 508*b*, and an oxide semiconductor film formed using a metal oxide target having an atomic ratio of metal elements, In:Ga:Zn=1:1:1.2, is used as the oxide semiconductor film 508*c*.

As illustrated in FIGS. 24A and 24B, the energy level of the conduction band minimum gradually changes between the oxide semiconductor films 508*a* and 508*b* and between the oxide semiconductor films 508*b* and 508*c*. In other words, the energy level of the conduction band minimum is continuously changed or continuously connected. To obtain such a band structure, there exists no impurity, which forms a defect state such as a trap center or a recombination center, at the interface between the oxide semiconductor films 508*a* and 508*b* or at the interface between the oxide semiconductor films 508*b* and 508*c*.

To form a continuous junction between the oxide semiconductor films 508*a* and 508*b* and between the oxide semiconductor films 508*b* and 508*c*, it is necessary to form the films successively without exposure to the air by using a multi-chamber deposition apparatus (sputtering apparatus) provided with a load lock chamber.

With the band structures of FIGS. 24A and 24B, the oxide semiconductor film 508*b* serves as a well, and a channel region is formed in the oxide semiconductor film 508*b* in the transistor with the layered structure.

By providing the oxide semiconductor films 508a and 508c, the oxide semiconductor film 508b can be distanced away from trap states.

In addition, the trap states might be more distant from the vacuum level than the energy level of the conduction band minimum (Ec) of the oxide semiconductor film 508b serving as a channel region, so that electrons are likely to be accumulated in the trap states. When the electrons are accumulated in the trap states, the electrons become negative fixed electric charge, so that the threshold voltage of the transistor is shifted in the positive direction. Therefore, it is preferable that the trap states be closer to the vacuum level than the energy level of the conduction band minimum (Ec) of the oxide semiconductor film 508b. Such a structure inhibits accumulation of electrons in the trap states. As a result, the on-state current and the field-effect mobility of the transistor can be increased.

The energy level of the conduction band minimum of each of the oxide semiconductor films 508a and 508c is closer to the vacuum level than that of the oxide semiconductor film 508b. Typically, a difference in energy level between the conduction band minimum of the oxide semiconductor film 508b and the conduction band minimum of each of the oxide semiconductor films 508a and 508c is 0.15 eV or more or 0.5 eV or more and 2 eV or less or 1 eV or less. That is, the difference between the electron affinity of each of the oxide semiconductor films 508a and 508c and the electron affinity of the oxide semiconductor film 508b is 0.15 eV or more or 0.5 eV or more and 2 eV or less or 1 eV or less.

In such a structure, the oxide semiconductor film 508b serves as a main path of a current. In other words, the oxide semiconductor film 508b serves as a channel region, and the oxide semiconductor films 508a and 508c serve as oxide insulating films. In addition, since the oxide semiconductor films 508a and 508c each include one or more metal elements included in the oxide semiconductor film 508b in which a channel region is formed, interface scattering is less likely to occur at the interface between the oxide semiconductor films 508a and 508b or at the interface between the oxide semiconductor films 508b and 508c. Thus, the transistor can have high field-effect mobility because the movement of carriers is not hindered at the interface.

To prevent each of the oxide semiconductor films 508a and 508c from serving as part of a channel region, a material having sufficiently low conductivity is used for the oxide semiconductor films 508a and 508c. Thus, the oxide semiconductor films 508a and 508c can be referred to as oxide insulating films for such properties and/or functions. Alternatively, a material that has a smaller electron affinity (a difference in energy level between the vacuum level and the conduction band minimum) than the oxide semiconductor film 508b and has a difference in energy level in the conduction band minimum from the oxide semiconductor film 508b (band offset) is used for the oxide semiconductor films 508a and 508c. Furthermore, to inhibit generation of a difference in threshold voltage due to the value of the drain voltage, the energy level of the conduction band minimum of each of the oxide semiconductor films 508a and 508c is preferably closer to the vacuum level than the energy level of the conduction band minimum of the oxide semiconductor film 508b is. For example, a difference between the energy level of the conduction band minimum of the oxide semiconductor film 508b and the energy level of the conduction band minimum of each of the oxide semiconductor films 508a and 508c is preferably greater than or equal to 0.2 eV, more preferably greater than or equal to 0.5 eV.

It is preferable that the oxide semiconductor films 508a and 508c not have a spinel crystal structure. This is because if the oxide semiconductor films 508a and 508c have a spinel crystal structure, constituent elements of the conductive films 512a and 512b might be diffused to the oxide semiconductor film 508b at the interface between the spinel crystal structure and another region. Note that each of the oxide semiconductor films 508a and 508c is preferably a CAAC-OS film, in which case a higher blocking property against constituent elements of the conductive films 512a and 512b, for example, copper elements, can be obtained.

The thickness of each of the oxide semiconductor films 508a and 508c is greater than or equal to a thickness that is capable of inhibiting diffusion of the constituent elements of the conductive films 512a and 512b to the oxide semiconductor film 508b, and less than a thickness that inhibits supply of oxygen from the insulating film 514 to the oxide semiconductor film 508b. For example, when the thickness of each of the oxide semiconductor films 508a and 508c is greater than or equal to 10 nm, diffusion of the constituent elements of the conductive films 512a and 512b to the oxide semiconductor film 508b can be inhibited. When the thickness of each of the oxide semiconductor films 508a and 508c is less than or equal to 100 nm, oxygen can be effectively supplied from the insulating film 514 to the oxide semiconductor film 508b.

Although the example where an oxide semiconductor film formed using a metal oxide target having an atomic ratio of metal elements, In:Ga:Zn=1:1:1.2, is used as each of the oxide semiconductor films 508a and 508c is described in this embodiment, one embodiment of the present invention is not limited thereto. For example, an oxide semiconductor film formed using a metal oxide target having an atomic ratio of In:Ga:Zn=1:1:1, In:Ga:Zn=1:3:2, In:Ga:Zn=1:3:4, or In:Ga:Zn=1:3:6, may be used as each of the oxide semiconductor films 508a and 508c.

When the oxide semiconductor films 508a and 508c are formed using a metal oxide target having an atomic ratio of In:Ga:Zn=1:1:1, the oxide semiconductor films 508a and 508c have an atomic ratio of In:Ga:Zn=1:$\beta$1 (0<$\beta$1≤2):$\beta$2 (0<$\beta$2≤3) in some cases. When the oxide semiconductor films 508a and 508c are formed using a metal oxide target having an atomic ratio of In:Ga:Zn=1:3:4, the oxide semiconductor films 508a and 508c have an atomic ratio of In:Ga:Zn=1:$\beta$3 (1≤$\beta$3≤5):$\beta$4 (2≤$\beta$4≤6) in some cases. When the oxide semiconductor films 508a and 508c are formed using a metal oxide target having an atomic ratio of In:Ga:Zn=1:3:6, the oxide semiconductor films 508a and 508c have an atomic ratio of In:Ga:Zn=1:$\beta$5 (1≤$\beta$5≤5):$\beta$6 (4≤$\beta$6≤8) in some cases.

Figure 25A:
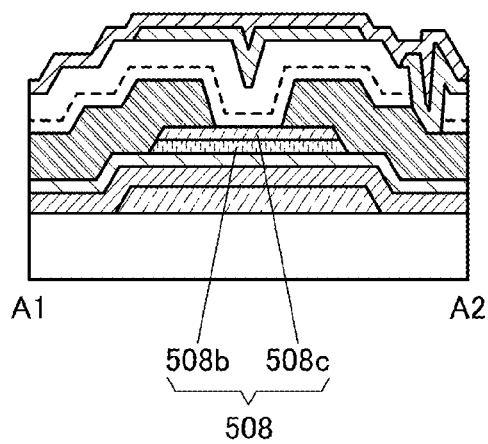
FIGS. 25A to 25D are cross-sectional views illustrating examples of a transistor.
Figure 25B:
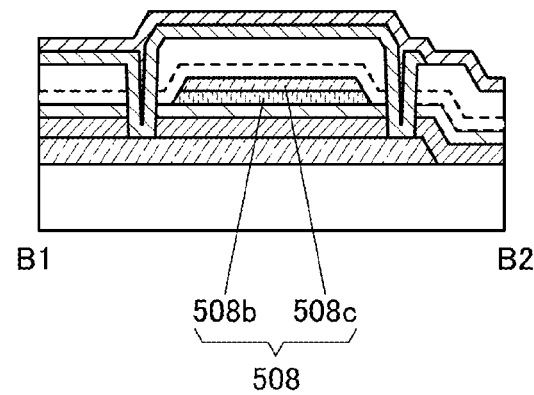

The drawings illustrate an example where the oxide semiconductor film 508 in the transistor 270 and the oxide semiconductor film 508c in the transistors 270A and 270B have a small thickness in a region that does not overlap with the conductive films 512a and 512b, that is, an example where part of the oxide semiconductor film has a depressed portion. However, one embodiment of the present invention is not limited thereto, and the oxide semiconductor film does not necessarily have a depressed region in a region that does not overlap with the conductive films 512a and 512b. FIGS. 25A and 25B illustrate examples in this case. FIGS. 25A and 25B are cross-sectional views illustrating an example of the transistor. FIGS. 25A and 25B illustrate a structure where the oxide semiconductor film 508 in the transistor 270B does not have a depressed portion.

Figure 25C:
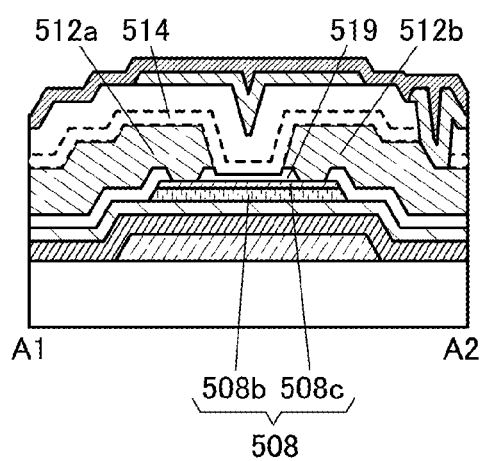
Figure 25D:
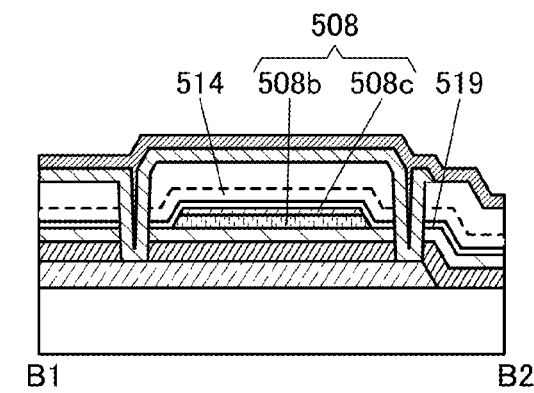

As illustrated in FIGS. 25C and 25D, the oxide semiconductor film 508c may be formed thinner than the oxide semiconductor film 508b in advance, and an insulating film 519 may further be formed over the oxide semiconductor film 508c and the insulating film 507. In that case, openings for connecting the oxide semiconductor film 508c and the conductive films 512a and 512b are formed in the insulating film 519. The insulating film 519 can be formed with the same material and the same forming method as the insulating film 514.

The structures of the transistors of this embodiment can be freely combined with each other.

This embodiment can be combined with any of the other embodiments as appropriate.

Embodiment 4

In this embodiment, an oxide semiconductor is described with reference to FIGS. 26A to 26E, FIGS. 27A to 27E, FIGS. 28A to 28D, FIGS. 29A and 29B, and FIG. 30.
<Structure of Oxide Semiconductor>

The structure of an oxide semiconductor is described below.

An oxide semiconductor is classified into a single crystal oxide semiconductor and a non-single-crystal oxide semiconductor. Examples of a non-single-crystal oxide semiconductor include a c-axis-aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and not have fixed positions of atoms, to have a flexible bond angle, and to have a short-range order but have no long-range order, for example.

This means that a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS is close to an amorphous oxide semiconductor in terms of physical properties.
<CAAC-OS>

First, a CAAC-OS is described.

A CAAC-OS is one of oxide semiconductors having a plurality of c-axis aligned crystal parts (also referred to as pellets).

Figure 26A:
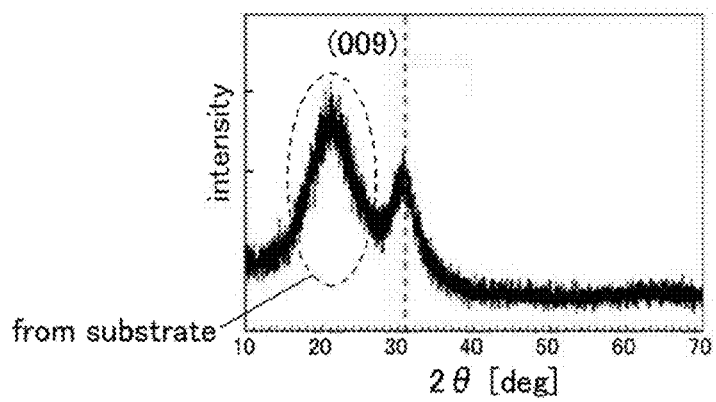
FIGS. 26A to 26E show structural analysis of a CAAC-OS and a single crystal oxide semiconductor by XRD and selected-area electron diffraction patterns of a CAAC-OS.

Analysis of a CAAC-OS by X-ray diffraction (XRD) is described. For example, when the structure of a CAAC-OS including an InGaZnO$_4$ crystal that is classified into the space group R-3m is analyzed by an out-of-plane method, a peak appears at a diffraction angle (2θ) of around 310 as shown in FIG. 26A. This peak is derived from the (009) plane of the InGaZnO$_4$ crystal, which indicates that crystals in the CAAC-OS have c-axis alignment, and that the c-axes are aligned in a direction substantially perpendicular to a surface over which the CAAC-OS film is formed (also referred to as a formation surface) or the top surface of the CAAC-OS film. Note that a peak sometimes appears at a 2θ of around 36° in addition to the peak at a 2θ of around 31°. The peak at a 2θ of around 36° is derived from a crystal structure that is classified into the space group Fd-3m; thus, it is preferable that this peak not appear in a CAAC-OS.

Figure 26B:
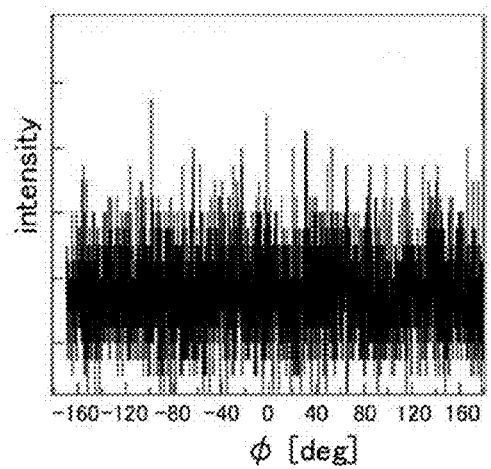
Figure 26C:
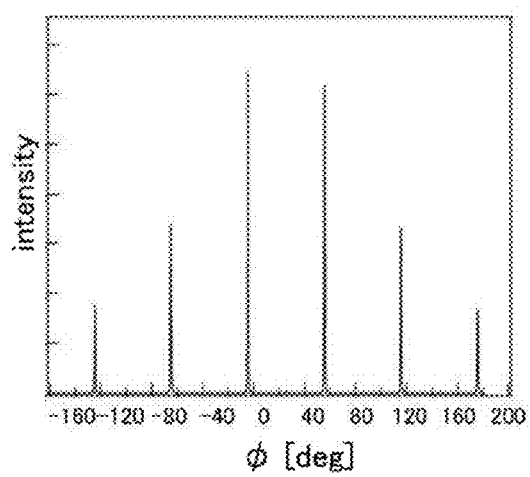
Figure 26D:
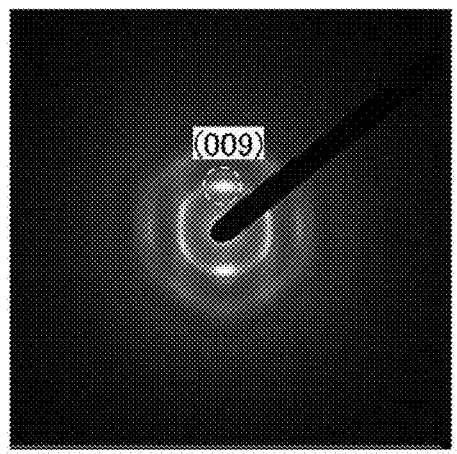

On the other hand, in structural analysis of the CAAC-OS by an in-plane method in which an X-ray is incident on the CAAC-OS in a direction parallel to the formation surface, a peak appears at a 2θ of around 56°. This peak is attributed to the (110) plane of the InGaZnO$_4$ crystal. When analysis (φ scan) is performed with 2θ fixed at around 56° and with the sample rotated using a normal vector to the sample surface as an axis (φ axis), as shown in FIG. 26B, a peak is not clearly observed. In contrast, in the case where single crystal InGaZnO$_4$ is subjected to φ scan with 2θ fixed at around 56°, as shown in FIG. 26C, six peaks that are derived from crystal planes equivalent to the (110) plane are observed. Accordingly, the structural analysis using XRD shows that the directions of a-axes and b-axes are irregularly oriented in the CAAC-OS.

Figure 26E:
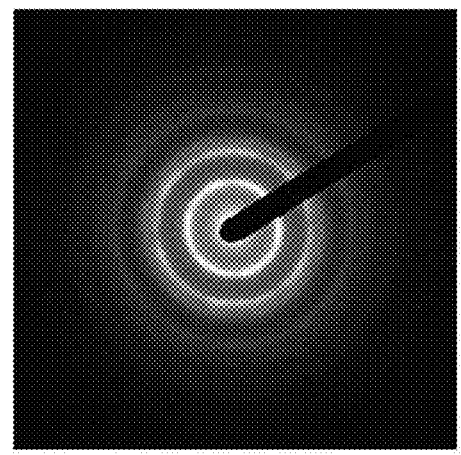

Next, a CAAC-OS analyzed by electron diffraction is described. For example, when an electron beam with a probe diameter of 300 nm is incident on a CAAC-OS including an InGaZnO$_4$ crystal in a direction parallel to the formation surface of the CAAC-OS, a diffraction pattern (also referred to as a selected-area electron diffraction pattern) shown in FIG. 26D can be obtained. In this diffraction pattern, spots derived from the (009) plane of an InGaZnO$_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 26E shows a diffraction pattern obtained in such a manner that an electron beam with a probe diameter of 300 nm is incident on the same sample in a direction perpendicular to the sample surface. As shown in FIG. 26E, a ring-like diffraction pattern is observed. Thus, the electron diffraction using an electron beam with a probe diameter of 300 nm also indicates that the a-axes and b-axes of the pellets included in the CAAC-OS do not have regular orientation. The first ring in FIG. 26E is considered to be derived from the (010) plane, the (100) plane, and the like of the InGaZnO$_4$ crystal. The second ring in FIG. 26E is considered to be derived from the (110) plane and the like.

In a combined analysis image (also referred to as a high-resolution TEM image) of a bright-field image and a diffraction pattern of a CAAC-OS, which is obtained using a transmission electron microscope (TEM), a plurality of pellets can be observed. However, even in the high-resolution TEM image, a boundary between pellets, that is, a grain boundary is not clearly observed in some cases. Thus, in the CAAC-OS, a reduction in electron mobility due to the grain boundary is less likely to occur.

Figure 27A:
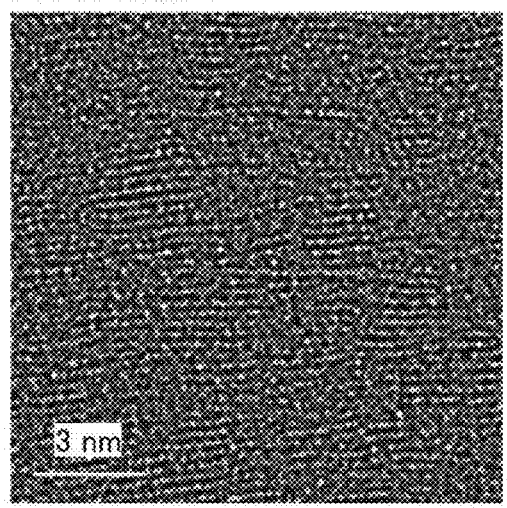
FIGS. 27A to 27E show a cross-sectional TEM image and plan-view TEM images of a CAAC-OS and images obtained through analysis thereof.

FIG. 27A shows a high-resolution TEM image of a cross section of the CAAC-OS that is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be observed with, for example, an atomic resolution analytical electron microscope JEM-ARM200F manufactured by JEOL Ltd.

FIG. 27A shows pellets in which metal atoms are arranged in a layered manner. FIG. 27A proves that the size of a pellet is greater than or equal to 1 nm or greater than or equal to 3 nm. Therefore, the pellet can also be referred to as a nanocrystal (nc). Furthermore, the CAAC-OS can also be referred to as an oxide semiconductor including c-axis aligned nanocrystals (CANC). A pellet reflects unevenness of a formation surface or a top surface of the CAAC-OS, and is parallel to the formation surface or the top surface of the CAAC-OS.

Figure 27B:
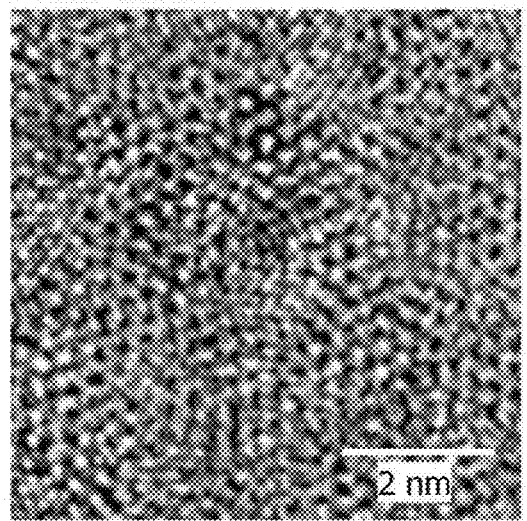
Figure 27C:
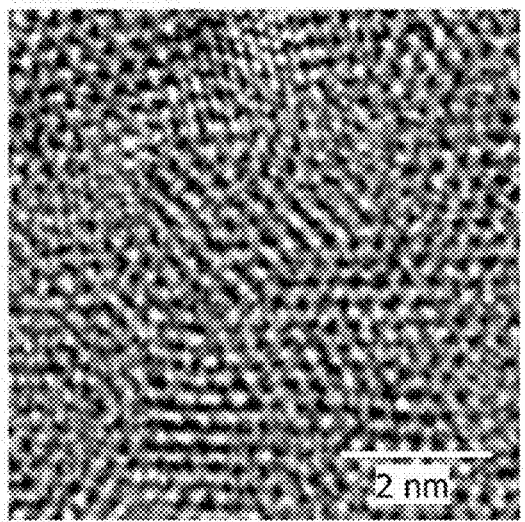
Figure 27D:
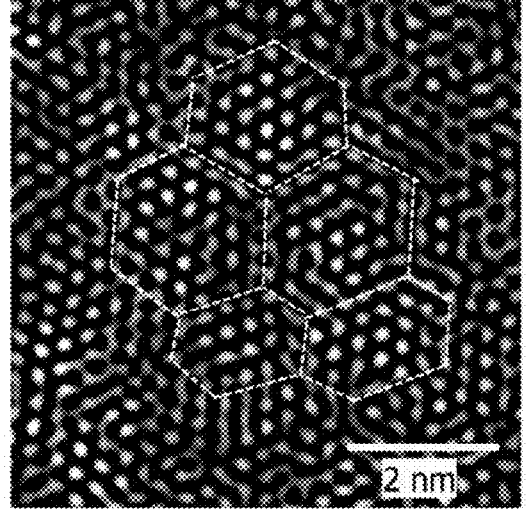
Figure 27E:
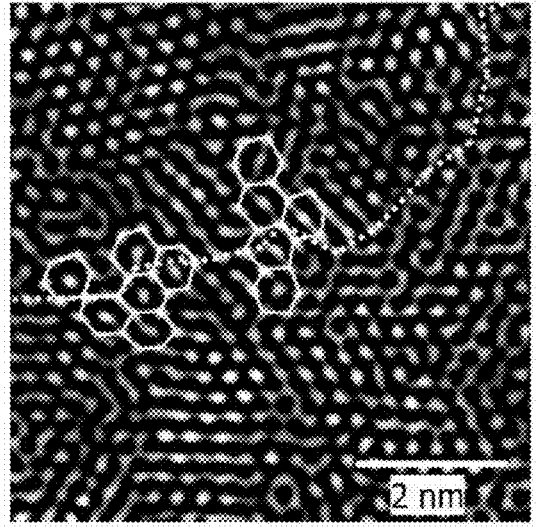

FIGS. 27B and 27C show Cs-corrected high-resolution TEM images of a plane of the CAAC-OS observed from a direction substantially perpendicular to the sample surface. FIGS. 27D and 27E are images obtained through image processing of FIGS. 27B and 27C. The method of image processing is as follows. The image in FIG. 27B is subjected to fast Fourier transform (FFT), so that an FFT image is obtained. Then, mask processing is performed such that a range of from 2.8 nm$^{-1}$ to 5.0 nm$^{-1}$ from the origin in the obtained FFT image remains. After the mask processing, the FFT image is processed by inverse fast Fourier transform (IFFT) to obtain a processed image. The image obtained in this manner is called an FFT filtering image. The FFT filtering image is a Cs-corrected high-resolution TEM image from which a periodic component is extracted, and shows a lattice arrangement.

In FIG. 27D, a portion where a lattice arrangement is broken is denoted with a dashed line. A region surrounded by a dashed line is one pellet. The portion denoted with the dashed line is a junction of pellets. The dashed line draws a hexagon, which means that the pellet has a hexagonal shape. Note that the shape of the pellet is not always a regular hexagon but is a non-regular hexagon in many cases.

In FIG. 27E, a dotted line denotes a portion between a region where a lattice arrangement is well aligned and another region where a lattice arrangement is well aligned. A clear crystal grain boundary cannot be observed even in the vicinity of the dotted line. When a lattice point in the vicinity of the dotted line is regarded as a center and surrounding lattice points are joined, a distorted hexagon, pentagon, and/or heptagon can be formed, for example. That is, a lattice arrangement is distorted so that formation of a crystal grain boundary is inhibited. This is probably because the CAAC-OS can tolerate distortion owing to a low density of the atomic arrangement in an a-b plane direction, the interatomic bond distance changed by substitution of a metal element, and the like.

As described above, the CAAC-OS has c-axis alignment, its pellets (nanocrystals) are connected in an a-b plane direction, and the crystal structure has distortion. For this reason, the CAAC-OS can also be referred to as an oxide semiconductor including a c-axis-aligned a-b-plane-anchored (CAA) crystal.

The CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities included in the oxide semiconductor might serve as carrier traps or carrier generation sources, for example. For example, an oxygen vacancy in the oxide semiconductor might serve as a carrier trap or serve as a carrier generation source when hydrogen is captured therein.

The CAAC-OS having small amounts of impurities and oxygen vacancies is an oxide semiconductor film with a low carrier density (specifically, lower than $8\times10^{11}/cm^3$, preferably lower than $1\times10^{11}/cm^3$, and further preferably lower than $1\times10^{10}/cm^3$ and higher than or equal to $1\times10^{-9}/cm^3$). Such an oxide semiconductor is referred to as a highly purified intrinsic or substantially highly purified intrinsic oxide semiconductor. A CAAC-OS has a low impurity concentration and a low density of defect states. Thus, the CAAC-OS can be referred to as an oxide semiconductor having stable characteristics.

<nc-OS>

Next, an nc-OS is described.

Analysis of an nc-OS by XRD is described. For example, when the structure of an nc-OS is analyzed by an out-of-plane method, a peak indicating orientation does not appear. That is, a crystal of an nc-OS does not have orientation.

Figure 28A:
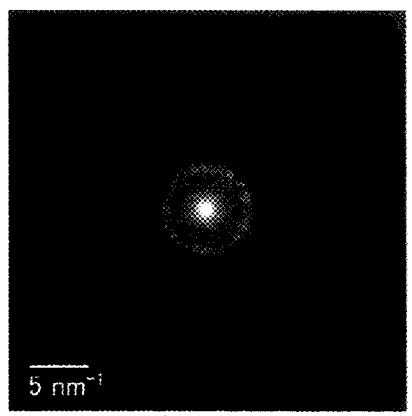
FIGS. 28A to 28D show electron diffraction patterns and a cross-sectional TEM image of an nc-OS.
Figure 28B:
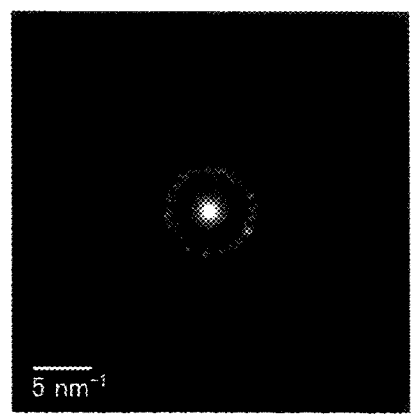

For example, when an electron beam with a probe diameter of 50 nm is incident on a 34-nm-thick region of thinned nc-OS including an InGaZnO$_4$ crystal in a direction parallel to the formation surface, a ring-shaped diffraction pattern (nanobeam electron diffraction pattern) shown in FIG. 28A is observed. FIG. 28B shows a diffraction pattern (nanobeam electron diffraction pattern) obtained when an electron beam with a probe diameter of 1 nm is incident on the same sample. As shown in FIG. 28B, a plurality of spots are observed in a ring-like region. In other words, ordering in an nc-OS is not observed with an electron beam with a probe diameter of 50 nm but is observed with an electron beam with a probe diameter of 1 nm.

Figure 28C:
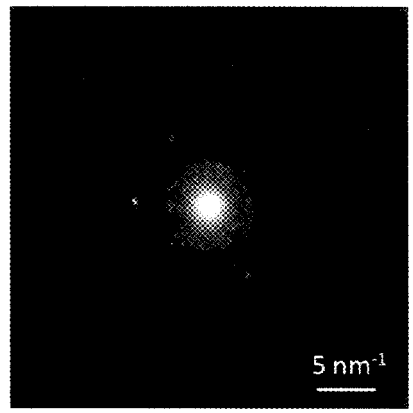

Furthermore, an electron diffraction pattern in which spots are arranged in an approximately hexagonal shape is observed in some cases as shown in FIG. 28C when an electron beam having a probe diameter of 1 nm is incident on a region with a thickness of less than 10 nm. This means that an nc-OS has a well-ordered region, i.e., a crystal, in the range of less than 10 nm in thickness. Note that an electron diffraction pattern having regularity is not observed in some regions because crystals are aligned in various directions.

Figure 28D:
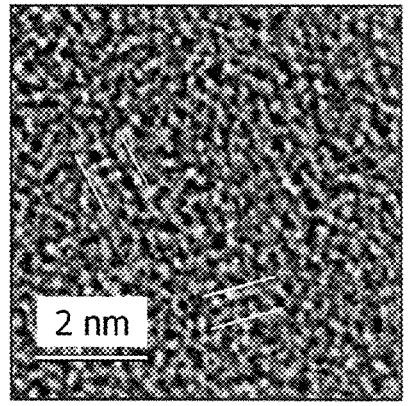

FIG. 28D shows a Cs-corrected high-resolution TEM image of a cross section of an nc-OS observed from the direction substantially parallel to the formation surface. In a high-resolution TEM image, an nc-OS has a region in which a crystal part is observed, such as the part indicated by additional lines in FIG. 28D, and a region in which a crystal part is not clearly observed. In most cases, the size of a crystal part included in the nc-OS is greater than or equal to 1 nm and less than or equal to 10 nm, or specifically, greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

As described above, in the nc-OS, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not ordered. Accordingly, the nc-OS cannot be distinguished from an a-like OS or an amorphous oxide semiconductor, depending on an analysis method.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

<a-like OS>

An a-like OS has a structure between those of the nc-OS and the amorphous oxide semiconductor.

FIGS. 29A and 29B are high-resolution cross-sectional TEM images of an a-like OS. FIG. 29A is the high-resolution cross-sectional TEM image of the a-like OS at the start of the electron irradiation. FIG. 29B is the high-resolution cross-sectional TEM image of a-like OS after the electron ($e^-$) irradiation at $4.3 \times 10^8$ $e^-/nm^2$. FIGS. 29A and 29B show that stripe-like bright regions extending vertically are observed in the a-like OS from the start of the electron irradiation. It can be also found that the shape of the bright region changes after the electron irradiation. Note that the bright region is presumably a void or a low-density region.

The a-like OS has an unstable structure because it contains a void. To verify that an a-like OS has an unstable structure as compared with a CAAC-OS and an nc-OS, a change in structure caused by electron irradiation is described below.

An a-like OS, an nc-OS, and a CAAC-OS are prepared as samples. Each of the samples is an In—Ga—Zn oxide.

First, a high-resolution cross-sectional TEM image of each sample is obtained. The high-resolution cross-sectional TEM images show that all the samples have crystal parts.

It is known that a unit cell of an $InGaZnO_4$ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the spacing between lattice fringes is greater than or equal to 0.28 nm and less than or equal to 0.30 nm is regarded as a crystal part of $InGaZnO_4$ in the following description. Each of lattice fringes corresponds to the a-b plane of the $InGaZnO_4$ crystal.

Figure 30:
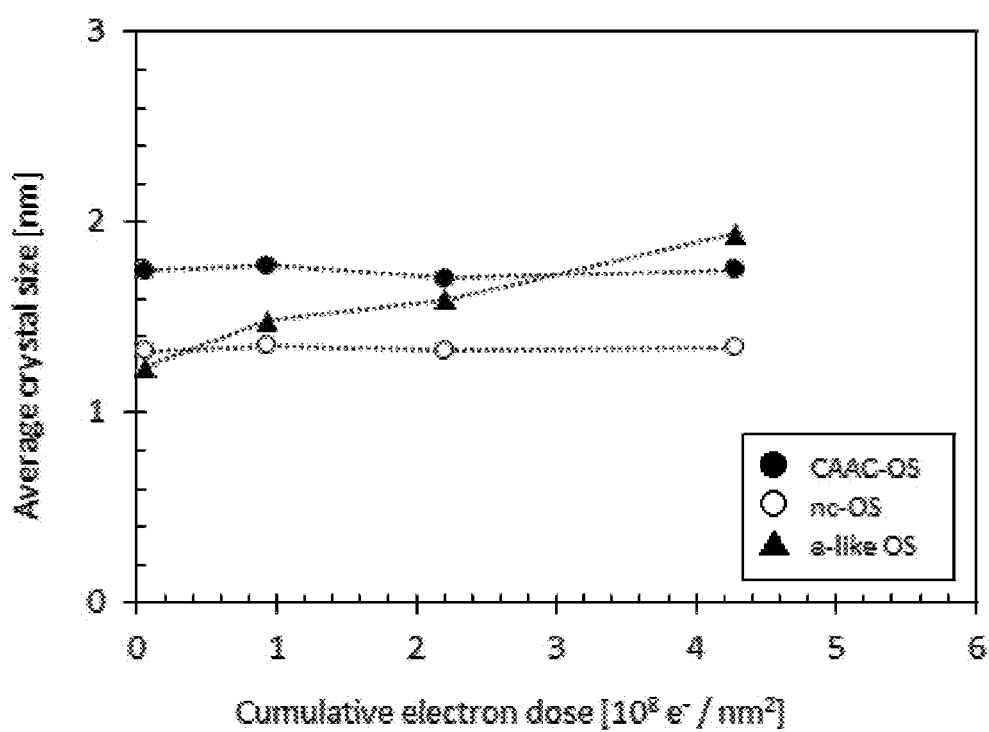
FIG. 30 shows a change in crystal part of an In—Ga—Zn oxide induced by electron irradiation.

FIG. 30 shows the average size of crystal parts (at 22 points to 30 points) in each sample. Note that the crystal part size corresponds to the length of a lattice fringe. FIG. 30 indicates that the crystal part size in the a-like OS increases with an increase in the cumulative electron dose in obtaining TEM images, for example. As shown in FIG. 30, a crystal part of approximately 1.2 nm (also referred to as an initial nucleus) at the start of TEM observation grows to a size of approximately 1.9 nm at a cumulative electron ($e^-$) dose of $4.2 \times 10^8$ $e^-/nm^2$. In contrast, the crystal part size in the nc-OS and the CAAC-OS shows little change from the start of electron irradiation to a cumulative electron dose of $4.2 \times 10^8$ $e^-/nm^2$. As shown in FIG. 30, the crystal part sizes in an nc-OS and a CAAC-OS are approximately 1.3 nm and approximately 1.8 nm, respectively, regardless of the cumulative electron dose. For the electron beam irradiation and TEM observation, a Hitachi H-9000NAR transmission electron microscope was used. The conditions of electron beam irradiation were as follows: the accelerating voltage was 300 kV; the current density was $6.7 \times 10^5$ $e^-/(nm^2 \cdot s)$; and the diameter of irradiation region was 230 nm.

In this manner, growth of the crystal part in the a-like OS is sometimes induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor having an atomic ratio of In:Ga:Zn=1:1:1, the density of the a-like OS is higher than or equal to 5.0 $g/cm^3$ and lower than 5.9 $g/cm^3$. For example, in the case of the oxide semiconductor having an atomic ratio of In:Ga:Zn=1:1:1, the density of each of the nc-OS and the CAAC-OS is higher than or equal to 5.9 $g/cm^3$ and lower than 6.3 $g/cm^3$.

Note that in the case where an oxide semiconductor having a certain composition does not exist in a single crystal structure, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

As described above, oxide semiconductors have various structures and various properties. Note that an oxide semiconductor may be a stacked layer including two or more films of an amorphous oxide semiconductor, an a-like OS, an nc-OS, and a CAAC-OS, for example.

This embodiment can be combined with any of the other embodiments as appropriate.

Embodiment 5

In this embodiment, a touch panel module and electronic devices that include the input/output device of one embodiment of the present invention are described with reference to FIG. 31, FIGS. 32A to 32H, and FIGS. 33A and 33B.

Figure 31:
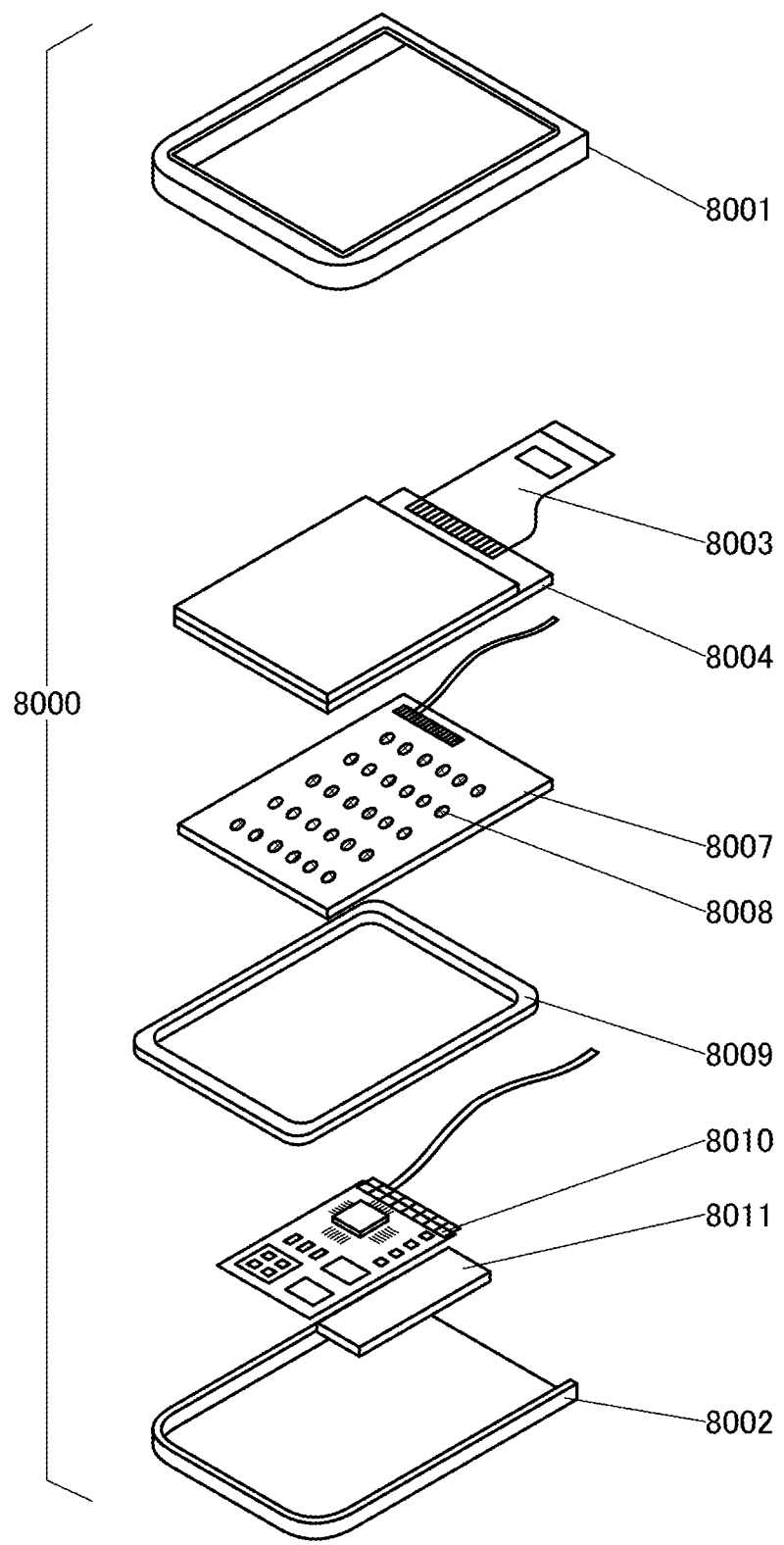
FIG. 31 shows an example of a touch panel module.

In a touch panel module 8000 illustrated in FIG. 31, a touch panel 8004 connected to an FPC 8003, a frame 8009, a printed board 8010, and a battery 8011 are provided between an upper cover 8001 and a lower cover 8002.

The input/output device of one embodiment of the present invention can be used for the touch panel 8004, for example.

The shapes and sizes of the upper cover 8001 and the lower cover 8002 can be changed as appropriate in accordance with the size of the touch panel 8004.

In the case of a transmissive liquid crystal element, a backlight 8007 may be provided as illustrated in FIG. 31. The backlight 8007 includes a light source 8008. Note that although a structure in which the light source 8008 is provided over the backlight 8007 is illustrated in FIG. 31, one embodiment of the present invention is not limited to this structure. For example, a structure in which the light source 8008 is provided at an end portion of the backlight 8007 and a light diffusion plate is further provided may be employed. Note that the backlight 8007 needs not be provided in the case where a self-luminous light-emitting element such as an organic EL element is used or in the case where a reflective panel or the like is employed.

The frame 8009 protects the touch panel 8004 and serves as an electromagnetic shield for blocking electromagnetic waves generated by the operation of the printed board 8010. The frame 8009 can also serve as a radiator plate.

The printed board 8010 is provided with a power supply circuit and a signal processing circuit for outputting a video signal and a clock signal. As a power source for supplying electric power to the power supply circuit, an external commercial power source or a power source using the battery 8011 provided separately may be used. The battery 8011 can be omitted in the case of using a commercial power source.

The touch panel 8004 can be additionally provided with a component such as a polarizing plate, a retardation plate, or a prism sheet.

FIGS. 32A to 32H and FIGS. 33A and 33B illustrate electronic devices. These electronic devices can each include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 32A:
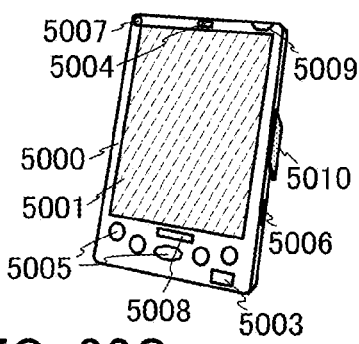
FIGS. 32A to 32H illustrate examples of electronic devices.
Figure 32B:
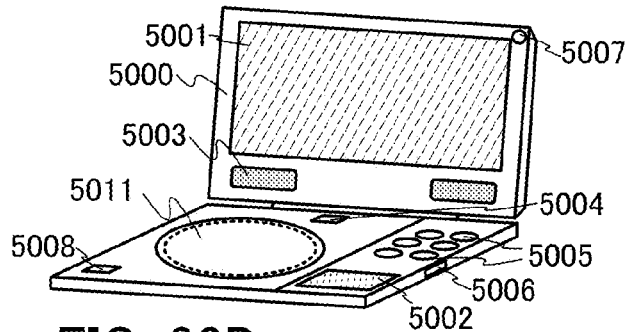
Figure 32C:
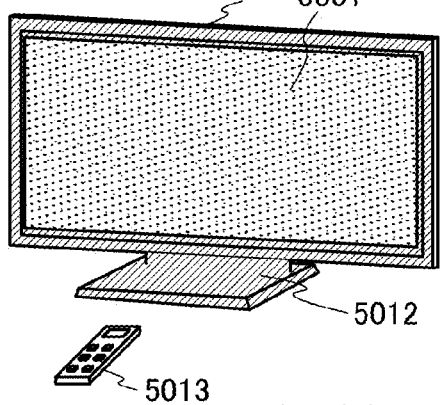
Figure 32D:
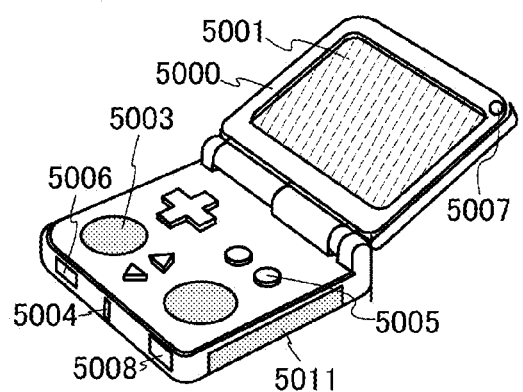
Figure 32E:
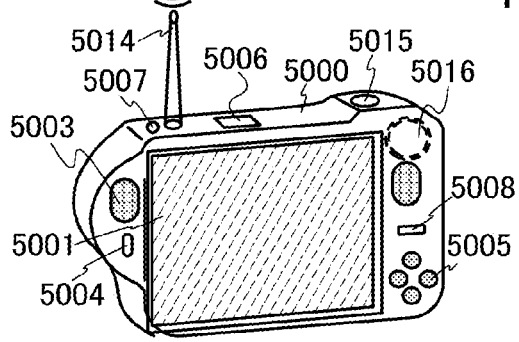
Figure 32F:
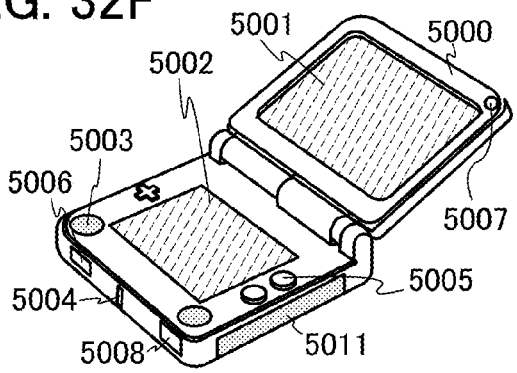
Figure 32G:
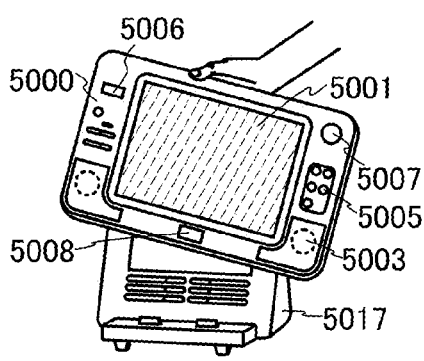
Figure 32H:
Figure 33A:
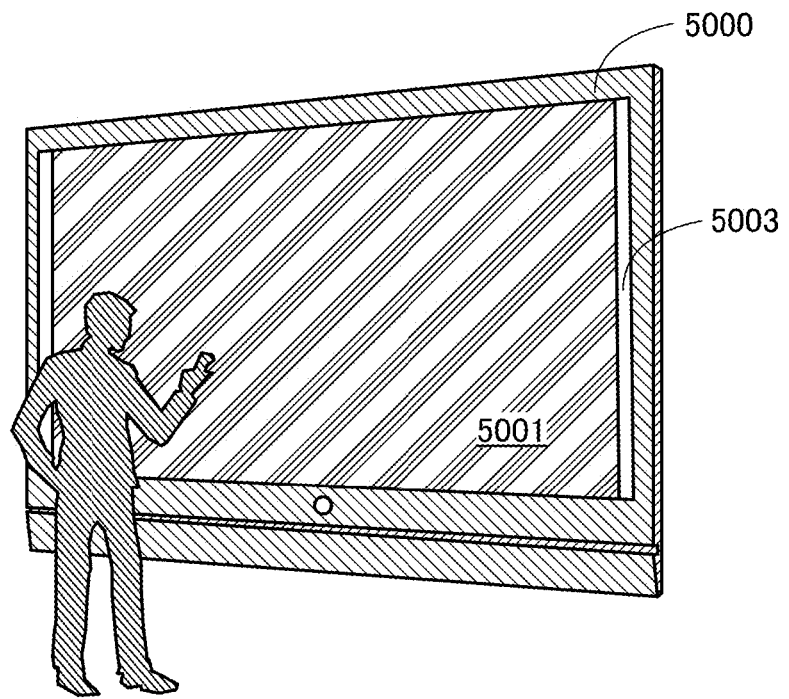
FIGS. 33A and 33B illustrate examples of electronic devices.
Figure 33B:
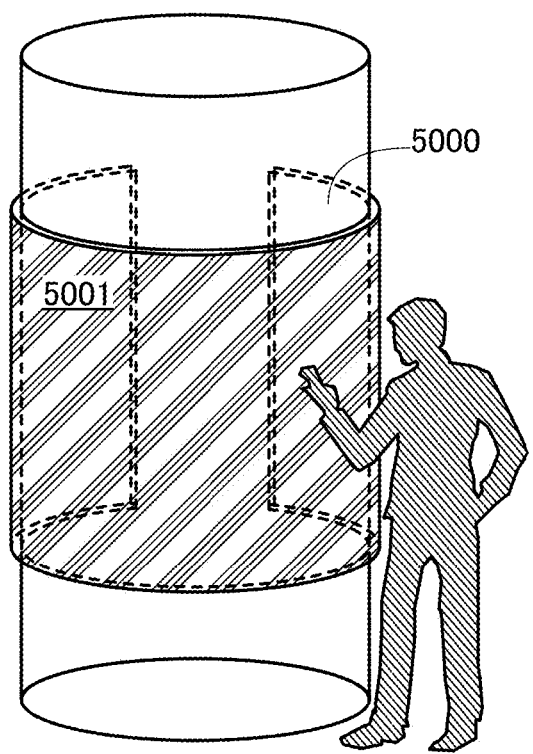

FIG. 32A illustrates a mobile computer, which can include a switch 5009, an infrared port 5010, and the like in addition to the above components. FIG. 32B illustrates a portable image reproducing device provided with a recording medium (e.g., a DVD reproducing device), which can include a second display portion 5002, a recording medium reading portion 5011, and the like in addition to the above components. FIG. 32C illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013. FIG. 32D illustrates a portable game machine, which can include the recording medium reading portion 5011 and the like in addition to the above components. FIG. 32E illustrates a digital camera that has a television reception function and can include an antenna 5014, a shutter button 5015, an image receiving portion 5016, and the like in addition to the above components. FIG. 32F illustrates a portable game machine, which can include the second display portion 5002, the recording medium reading portion 5011, and the like in addition to the above components. FIG. 32G illustrates a portable television receiver, which can include a charger 5017 capable of transmitting and receiving signals, and the like in addition to the above components. FIG. 32H illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like. FIG. 33A illustrates a digital signage. FIG. 33B illustrates a digital signage mounted on a cylindrical pillar.

The electronic devices illustrated in FIGS. 32A to 32H and FIGS. 33A and 33B can have a variety of functions, for example, a function of displaying a variety of information (e.g., a still image, a moving image, and a text image) on a display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading a program or data stored in a recording medium and displaying the program or data on a display portion. Furthermore, the electronic device including a plurality of display portions can have a function of displaying image information mainly on one display portion while displaying text information mainly on another display portion, a function of displaying a three-dimensional image by displaying images where parallax is considered on a plurality of display portions, or the like. Furthermore, the electronic device including an image receiving portion can have a function of photographing a still image, a function of photographing a moving image, a function of automatically or manually correcting a photographed image, a function of storing a photographed image in a recording medium (an external recording medium or a recording medium incorporated in the camera), a function of displaying a photographed image on a display portion, or the like. Note that the functions of the electronic devices illustrated in FIGS. 32A to 32H and FIGS. 33A and 33B are not limited thereto, and the electronic devices can have a variety of functions.

The electronic devices in this embodiment each include a display portion for displaying some kind of information. The input/output device of one embodiment of the present invention can be used for the display portion.

This embodiment can be combined with any of the other embodiments as appropriate.

EXAMPLE

In this example, an input/output device of one embodiment of the present invention is described.

First, the specifications of the input/output device of this example are described. The size was 4.3 inch (diagonal). The number of effective pixels was 1080 (H)×1920 (V) corresponding to full high definition (FAHD). The pixel size was 49.5 µm (H)×49.5 µm (V). The external panel size was 69.76 mm (H)×141.4 mm (V). The size of each of the display region and the sensor region was 53.46 mm (H)×95.04 mm (V). The resolution was 513 ppi. A channel-etched (CE) transistor including an oxide semiconductor in a channel formation region was used.

The input/output device of this example can serve as a transmissive liquid crystal display device. A liquid crystal element using an FFS mode was used as the display element. A color filter (CF) method was used as the coloring method. The aperture ratio was 48.0%. The drive frequency was 60 Hz. An analog line sequential video signal format was used as the video signal format.

The gate driver was incorporated. A COF was used for the source driver.

A projected capacitive (mutual capacitive) sensor element was used as the sensor element. A common electrode of the liquid crystal element also serves as an electrode of the sensor element. The number of sensor units was 18 (H)×32 (V). Specifically, 32 conductive films 56a in FIG. 9A and 18 conductive films 58 in FIG. 9A were prepared. The size of one sensor unit was 2.970 mm×2.970 mm. The size of one conductive film 56b in FIG. 9A corresponded to 30×60 pixels. The size of one conductive film 56a in FIG. 9A corresponded to 30×1080 pixels.

The one frame period shown in FIG. 8E was 16.667 ms, the writing period was 8.333 ms, and the two sensing periods were each 4.167 ms.

A schematic cross-sectional view of the input/output device of this embodiment corresponds to FIG. 1B, and Embodiment 1 can be referred to for the detail.

As the substrate 211, an approximately 0.7-mm-thick glass substrate was used. As the substrate 261, a glass substrate with a thickness of approximately 0.1 mm, approximately 0.2 mm, or approximately 0.3 mm was used. As the gate electrode 221, a stacked-layer structure of a tungsten nitride film and a copper film was used. As the insulating film 213, a stacked-layer structure of a silicon nitride film and a silicon oxynitride was used. For the oxide semiconductor film 223, a CAAC-IGZO that was one of CAAC-OSs was used. The oxide semiconductor film 223 had a two-layer structure in which two layers were formed using sputtering targets having different atomic ratios of metal elements. The total thickness of the two layers was approximately 25 nm. The oxide semiconductor film 223 and the oxide conductor film 227 were formed using an In—Ga—Zn oxide. The oxide conductor film 227 had a single-layer structure and had a thickness of approximately 100 nm. The source electrode 225a and the drain electrode 225b had a stacked-layer structure of a tungsten film, an aluminum film, and a titanium film. As the insulating film 215, a silicon oxynitride film was used. As the insulating film 217, a silicon nitride film was used. As the insulating film 219, an acrylic film was used. As each of the conductive films 251 and 252, an approximately 100-nm-thick indium tin oxide film containing silicon was used. As the insulating film 253, a silicon nitride film was used. As the liquid crystal 249, a negative liquid crystal was used. An approximately 200-μm-thick polarizing film was attached to a surface of the substrate 261. In this example, two input/output devices were fabricated: an input/output device in which an approximately 100-nm-thick APC film was used as the conductive film 255 and an input/output device in which an approximately 200-nm-thick Ti film was used as the conductive film 255.

Figure 35:
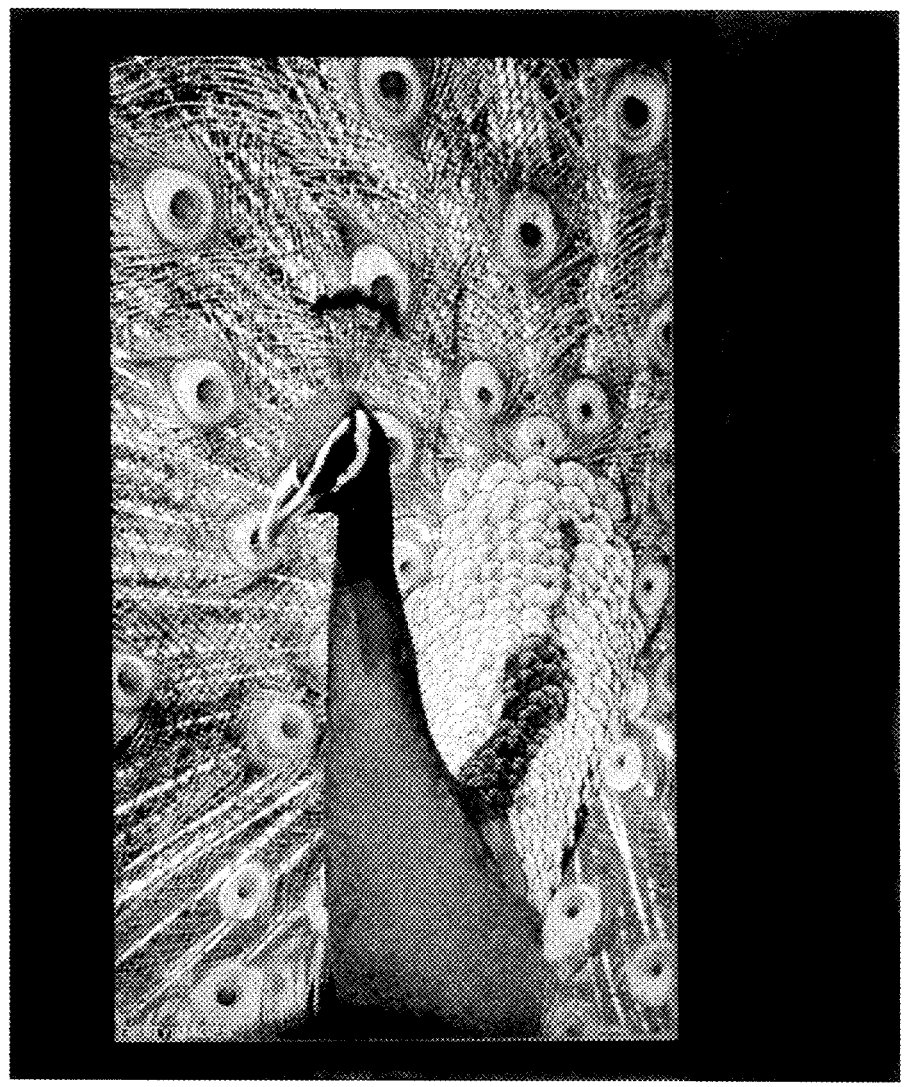
FIG. 35 is a photograph of an input/output device of an example.

FIG. 35 is a photograph showing the display state of the input/output device in this example. In FIG. 35, FPCs were connected to a right side and a top side (not shown) of the display region. For the input/output device in FIG. 35, an approximately 0.3-mm-thick glass substrate was used as the substrate 261. As the conductive film 255, an approximately 100-nm-thick APC film was used. As shown in FIG. 35, with one embodiment of the present invention, an input/output device capable of favorable display was able to be fabricated. Furthermore, the input/output device in FIG. 35 had a touch sensor having a favorable detection sensitivity and was able to sense multiple points simultaneously.

Stripe-like display unevenness was observed in some images. The width of the stripe was almost the same as the width of the conductive film 56a (a length in the Y direction in FIG. 9A). Thus, to make the parasitic capacitance of the conductive films 56a and 56b even, the widths of the conductive films 56a and 56b were changed. The size of one conductive film 56b after the change corresponded to 21×60 pixels. The size of one conductive film 56a after the change corresponded to 39×1080 pixels. Accordingly, the resistivity of the conductive film 56b was changed from 1.66 kΩ to 1.19 kΩ, and the capacitance of the conductive film 56b was changed from 534 pF to 674 pF. The resistivity of the conductive film 56a was changed from 0.86 kΩ to 1.35 kΩ, and the capacitance of the conductive film 56b was changed from 930 pF to 684 pF. By making the parasitic capacitance of the conductive films 56a and 56b even, the display unevenness was reduced, so that a favorable display was able to be performed. As compared to the case where a signal for touch sensing is input to the conductive film 56b, the display unevenness was reduced and thus a favorable display was able to be performed in the case where a signal for touch sensing is input to the conductive film 56a and the conductive film 56b alternately.

This application is based on Japanese Patent Application serial no. 2015-110612 filed with Japan Patent Office on May 29, 2015, the entire contents of which are hereby incorporated by reference.

What is claimed is:
1. An input/output device comprising:
a first pixel electrode;
a second pixel electrode;
a first common electrode;
a second common electrode;
a liquid crystal;
a first insulating film;
a second insulating film; and
a transistor,
wherein the first common electrode serves as one electrode of a sensor element,
wherein the second common electrode serves as the other electrode of the sensor element,
wherein the transistor comprises a first gate, a semiconductor layer over the first gate, and a second gate over the semiconductor layer,
wherein the semiconductor layer comprises a channel formation region that comprises an oxide semiconductor,
wherein the second gate comprises an oxide conductor,
wherein the oxide conductor comprises one or more kinds of metal elements comprised in the oxide semiconductor,
wherein the first insulating film is positioned over the second gate,
wherein the first pixel electrode, the second pixel electrode, the first common electrode, and the second common electrode are positioned over the first insulating film, wherein the first pixel electrode overlaps with the first common electrode with the second insulating film positioned between the first pixel electrode and the first common electrode, wherein the second pixel electrode overlaps with the second common electrode with the second insulating film positioned between the second pixel electrode and the second common electrode, wherein the liquid crystal is positioned over the first pixel electrode, the second pixel electrode, the first common electrode, and the second common electrode, wherein the first pixel electrode and the second pixel electrode are apart from each other and are positioned on a same plane, wherein the first common electrode and the second common electrode are apart from each other and are positioned on a same plane, wherein the first common electrode is located under the first pixel electrode, and wherein the second common electrode is located under the second pixel electrode.

2. The input/output device according to claim 1, further comprising a second transistor,
wherein a source or a drain of one of the transistor and the second transistor is electrically connected to the first pixel electrode, and
wherein a source or a drain of the other of the transistor and the second transistor is electrically connected to the second pixel electrode.

3. The input/output device according to claim 1, wherein the transistor is positioned in a driver circuit portion.

4. The input/output device according to claim 1, wherein the second gate is electrically connected to the first gate.

5. The input/output device according to claim 1, wherein the first pixel electrode, the second pixel electrode, the first common electrode, and the second common electrode each comprise one or more kinds of metal elements comprised in the oxide semiconductor.

6. The input/output device according to claim 1, wherein the oxide semiconductor, the oxide conductor, the first pixel electrode, the second pixel electrode, the first common electrode, and the second common electrode each comprise an oxide comprising indium.

7. The input/output device according to claim 1, wherein the first pixel electrode, the second pixel electrode, the first common electrode, and the second common electrode each have a function of transmitting visible light.

8. The input/output device according to claim 1,
wherein the oxide semiconductor and the oxide conductor each comprise an In-$M_1$-Zn oxide, and
wherein the $M_1$ is Al, Ti, Ga, Y, Zr, La, Ce, Nd, Sn, or Hf.

9. The input/output device according to claim 1,
further comprising a first conductive film between the first insulating film and the first common electrode,
wherein the first conductive film has a lower resistivity than the first common electrode, and
wherein the first conductive film is electrically connected to the first common electrode.

10. The input/output device according to claim 9,
further comprising a second conductive film between the first insulating film and the second common electrode,
wherein the second conductive film has a lower resistivity than the second common electrode,
wherein the second conductive film is electrically connected to the second common electrode, and
wherein the first conductive film and the second conductive film are apart from each other and are positioned on a same plane.

11. The input/output device according to claim 10,
further comprising a light-blocking film,
wherein the light-blocking film overlaps with one of the first conductive film and the second conductive film with the liquid crystal positioned between the light-blocking film and the one of the first conductive film and the second conductive film.

12. An electronic device comprising:
the input/output device according to claim 1; and
an antenna, a battery, a housing, a speaker, a microphone, an operation switch, or an operation button.

13. A device comprising:
a first transistor;
a second transistor;
a first insulating film over the first transistor and the second transistor;
a first pixel electrode over the first insulating film;
a second pixel electrode over the first insulating film;
a first common electrode over the first insulating film;
a second common electrode over the first insulating film;
a second insulating film between the first pixel electrode and the first common electrode and between the second pixel electrode and the second common electrode;
a liquid crystal over the first pixel electrode, the second pixel electrode, the first common electrode, and the second common electrode; and
an auxiliary wiring in contact with the first common electrode,
wherein the auxiliary wiring has a lower resistivity than the first common electrode,
wherein the first common electrode is located under the first pixel electrode,
wherein the second common electrode is located under the second pixel electrode,
wherein the first common electrode serves as one electrode of a sensor element, and
wherein the second common electrode serves as the other electrode of the sensor element.

14. The device according to claim 13, further comprising:
a signal line under the first insulating film.

15. The device according to claim 13, wherein each of the first transistor and the second transistor comprises a channel formation region that comprises an oxide semiconductor.

16. The device according to claim 13, wherein each of the first transistor and the second transistor comprises a channel formation region that comprises indium, gallium and zinc.

17. A device comprising:
a first transistor;
a second transistor;
a first insulating film over the first transistor and the second transistor;
a second insulating film over the first insulating film, the second insulating film being configured to reduce surface unevenness due to the first transistor and the second transistor;
a first pixel electrode over the second insulating film, the first pixel electrode being electrically connected to one of a source electrode and a drain electrode of the first transistor;
a second pixel electrode over the second insulating film, the second pixel electrode being electrically connected to one of a source electrode and a drain electrode of the second transistor;
a first common electrode over the second insulating film;

a second common electrode over the second insulating film;

a third insulating film between the first pixel electrode and the first common electrode and between the second pixel electrode and the second common electrode; and a liquid crystal over the first pixel electrode, the second pixel electrode, the first common electrode, and the second common electrode, wherein the first common electrode serves as one electrode of a sensor element, wherein the second common electrode serves as the other electrode of the sensor element, and wherein the first insulating film and the second insulating film are located between the other of the source electrode and the drain electrode of the first transistor and the first common electrode and are located between the other of the source electrode and the drain electrode of the second transistor and the second common electrode.

18. The device according to claim 17, wherein the first common electrode is located under the first pixel electrode, and wherein the second common electrode is located under the second pixel electrode.

19. The device according to claim 17, further comprising:

an auxiliary wiring in contact with the first common electrode, wherein the auxiliary wiring has a lower resistivity than the first common electrode.

* * * * *